(12) United States Patent
Hunt, III

(10) Patent No.: US 12,020,320 B1
(45) Date of Patent: *Jun. 25, 2024

(54) SYSTEM AND METHODS FOR CREDIT DISPUTE PROCESSING, RESOLUTION, AND REPORTING

(71) Applicant: CONSUMERINFO.COM, INC., Costa Mesa, CA (US)

(72) Inventor: Herbert Harris Hunt, III, Irvine, CA (US)

(73) Assignee: ConsumerInfo.com, Inc., Costa Mesa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/048,592

(22) Filed: Oct. 21, 2022

Related U.S. Application Data

(63) Continuation of application No. 17/151,013, filed on Jan. 15, 2021, now Pat. No. 11,514,519, which is a
(Continued)

(51) Int. Cl.
*G06Q 40/00* (2023.01)
*G06Q 40/03* (2023.01)
(Continued)

(52) U.S. Cl.
CPC ........... *G06Q 40/03* (2023.01); *G06Q 50/182* (2013.01); *G06Q 40/00* (2013.01); *G06Q 40/04* (2013.01); *G06Q 40/06* (2013.01); *G06Q 40/08* (2013.01)

(58) Field of Classification Search
CPC .... G06Q 40/025; G06Q 50/182; G06Q 40/00; G06Q 40/04; G06Q 40/06; G06Q 40/08
(Continued)

(56) References Cited

U.S. PATENT DOCUMENTS

| 3,405,457 A | 10/1968 | Bitzer |
| 4,346,442 A | 8/1982 | Musmanno |

(Continued)

FOREIGN PATENT DOCUMENTS

| CA | 2 509 842 | 12/2005 |
| EP | 0 542 298 | 5/1993 |

(Continued)

OTHER PUBLICATIONS

An analysis of online customer complaints: implications for Web complaint management; Proceedings of the 35th Annual Hawaii International Conference on System Sciences (pp. 2308-2317); Yooncheong Cho, II Im, R. Hiltz, J. Fjermestad; Jan. 1, 2002. (Year: 2002).*

(Continued)

*Primary Examiner* — Tien C Nguyen
(74) *Attorney, Agent, or Firm* — Knobbe, Martens, Olson & Bear, LLP

(57) ABSTRACT

Systems and methods are provided for credit dispute processing, resolution, and reporting. Credit dispute resolution requests may be received, processed, and sent to a credit bureau for submission to creditors. Status of credit dispute resolutions may be reported to consumers. If a creditor's response time is longer than its average response time or if a creditor does not respond to a credit dispute resolution request within a regulatory response period, alerts and reports may be sent to consumers to provide consumers with further options.

19 Claims, 9 Drawing Sheets

Related U.S. Application Data continuation of application No. 16/025,334, filed on Jul. 2, 2018, now Pat. No. 10,929,925, which is a continuation of application No. 15/610,913, filed on Jun. 1, 2017, now Pat. No. 10,043,214, which is a continuation of application No. 15/195,823, filed on Jun. 28, 2016, now Pat. No. 9,697,568, which is a continuation of application No. 13/831,341, filed on Mar. 14, 2013, now Pat. No. 9,406,085.

(51) Int. Cl.
   *G06Q 50/18* (2012.01)
   *G06Q 40/04* (2012.01)
   *G06Q 40/06* (2012.01)
   *G06Q 40/08* (2012.01)

(58) Field of Classification Search
   USPC .......... 705/39, 38, 40, 37, 44; 726/9, 6; 709/226; 715/704; 706/25, 45; 700/245
   See application file for complete search history.

(56) References Cited

U.S. PATENT DOCUMENTS

| | | |
|---|---|---|
| 4,734,858 A | 3/1988 | Schlafly |
| 4,755,940 A | 7/1988 | Brachtl et al. |
| 4,774,664 A | 9/1988 | Campbell et al. |
| 4,827,508 A | 5/1989 | Shear |
| 4,891,503 A | 1/1990 | Jewell |
| 4,977,595 A | 12/1990 | Ohta et al. |
| 4,989,141 A | 1/1991 | Lyons et al. |
| 5,126,936 A | 6/1992 | Champion et al. |
| 5,148,365 A | 9/1992 | Dembo |
| 5,220,501 A | 6/1993 | Lawlor et al. |
| 5,262,941 A | 11/1993 | Saladin |
| 5,274,547 A | 12/1993 | Zoffel et al. |
| 5,336,870 A | 8/1994 | Hughes et al. |
| 5,351,186 A | 9/1994 | Bullock et al. |
| 5,361,201 A | 11/1994 | Jost et al. |
| 5,383,113 A | 1/1995 | Kight et al. |
| 5,404,518 A | 4/1995 | Gilbertson et al. |
| 5,423,033 A | 6/1995 | Yuen |
| 5,500,513 A | 3/1996 | Langhans et al. |
| 5,563,783 A | 10/1996 | Stolfo et al. |
| 5,590,038 A | 12/1996 | Pitroda |
| 5,592,560 A | 1/1997 | Deaton et al. |
| 5,621,201 A | 4/1997 | Langhans et al. |
| 5,640,577 A | 6/1997 | Scharmer |
| 5,649,115 A | 7/1997 | Schrader et al. |
| 5,659,725 A | 8/1997 | Levy et al. |
| 5,659,731 A | 8/1997 | Gustafson |
| 5,689,651 A | 11/1997 | Lozman |
| 5,719,941 A | 2/1998 | Swift et al. |
| 5,729,735 A | 3/1998 | Meyering |
| 5,739,512 A | 4/1998 | Tognazzini |
| 5,742,769 A | 4/1998 | Lee et al. |
| 5,754,632 A | 5/1998 | Smith |
| 5,774,870 A | 6/1998 | Storey |
| 5,809,322 A | 9/1998 | Akerib |
| 5,813,006 A | 9/1998 | Polnerow et al. |
| 5,819,234 A | 10/1998 | Slavin et al. |
| 5,832,068 A | 11/1998 | Smith |
| 5,842,211 A | 11/1998 | Horadan et al. |
| 5,844,218 A | 12/1998 | Kawan et al. |
| 5,857,174 A | 1/1999 | Dugan |
| 5,864,620 A | 1/1999 | Pettitt |
| 5,870,721 A | 2/1999 | Norris |
| 5,878,403 A | 3/1999 | DeFrancesco |
| 5,881,131 A | 3/1999 | Farris et al. |
| 5,884,302 A | 3/1999 | Ho |
| 5,903,830 A | 5/1999 | Joao et al. |
| 5,903,881 A | 5/1999 | Schrader et al. |
| 5,918,227 A | 6/1999 | Polnerow et al. |
| 5,930,776 A | 7/1999 | Dykstra et al. |
| 5,933,837 A | 8/1999 | Kung |
| 5,937,392 A | 8/1999 | Alberts |
| 5,953,710 A | 9/1999 | Fleming |
| 5,956,693 A | 9/1999 | Geerlings |
| 5,963,939 A | 10/1999 | McCann et al. |
| 5,966,695 A | 10/1999 | Melchione et al. |
| 5,974,521 A | 10/1999 | Akerib |
| 5,978,780 A | 11/1999 | Watson |
| 5,995,947 A | 11/1999 | Fraser et al. |
| 5,999,596 A | 12/1999 | Walker et al. |
| 6,006,333 A | 12/1999 | Nielsen |
| 6,009,412 A | 12/1999 | Storey |
| 6,009,415 A | 12/1999 | Shurling et al. |
| 6,014,645 A | 1/2000 | Cunningham |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,035,288 A | 3/2000 | Solomon |
| 6,038,551 A | 3/2000 | Barlow et al. |
| 6,043,815 A | 3/2000 | Simonoff et al. |
| 6,055,570 A | 4/2000 | Nielsen |
| 6,064,990 A | 5/2000 | Goldsmith |
| 6,072,894 A | 6/2000 | Payne |
| 6,073,140 A | 6/2000 | Morgan et al. |
| 6,076,070 A | 6/2000 | Stack |
| 6,085,242 A | 7/2000 | Chandra |
| 6,088,686 A | 7/2000 | Walker et al. |
| 6,108,691 A | 8/2000 | Lee et al. |
| 6,112,190 A | 8/2000 | Fletcher et al. |
| 6,115,694 A | 9/2000 | Cheetham et al. |
| 6,119,103 A | 9/2000 | Basch et al. |
| 6,128,602 A | 10/2000 | Northington et al. |
| 6,145,088 A | 11/2000 | Stevens |
| 6,149,441 A | 11/2000 | Pellegrino et al. |
| 6,157,707 A | 12/2000 | Baulier et al. |
| 6,161,139 A | 12/2000 | Win et al. |
| 6,173,272 B1 | 1/2001 | Thomas et al. |
| 6,178,420 B1 | 1/2001 | Sassano |
| 6,182,068 B1 | 1/2001 | Culliss |
| 6,182,229 B1 | 1/2001 | Nielsen |
| 6,195,660 B1 | 2/2001 | Polnerow et al. |
| 6,195,738 B1 | 2/2001 | Akerib |
| 6,199,077 B1 | 3/2001 | Inala et al. |
| 6,202,053 B1 | 3/2001 | Christiansen et al. |
| 6,202,067 B1 | 3/2001 | Blood et al. |
| 6,208,998 B1 | 3/2001 | Marcus |
| 6,230,188 B1 | 5/2001 | Marcus |
| 6,233,566 B1 | 5/2001 | Levine et al. |
| 6,233,588 B1 | 5/2001 | Marchoili et al. |
| 6,247,000 B1 | 6/2001 | Hawkins et al. |
| 6,254,000 B1 | 7/2001 | Degen et al. |
| 6,263,447 B1 | 7/2001 | French et al. |
| 6,278,993 B1 | 8/2001 | Kumar et al. |
| 6,282,658 B2 | 8/2001 | French et al. |
| 6,289,452 B1 | 9/2001 | Arnold et al. |
| 6,295,528 B1 | 9/2001 | Marcus et al. |
| 6,295,541 B1 | 9/2001 | Bodnar et al. |
| 6,304,850 B1 | 10/2001 | Keller et al. |
| 6,304,860 B1 | 10/2001 | Martin et al. |
| 6,311,169 B2 | 10/2001 | Duhon |
| 6,317,783 B1 | 11/2001 | Freishtat et al. |
| 6,321,339 B1 | 11/2001 | French et al. |
| 6,327,578 B1 | 12/2001 | Linehan |
| 6,330,551 B1 * | 12/2001 | Burchetta ............ G06Q 50/188 705/37 |
| 6,343,279 B1 | 1/2002 | Bissonette et al. |
| 6,347,375 B1 | 2/2002 | Reinert et al. |
| 6,353,778 B1 | 3/2002 | Brown |
| 6,353,795 B1 | 3/2002 | Ranjan |
| 6,356,937 B1 | 3/2002 | Montville et al. |
| 6,374,262 B1 | 4/2002 | Kodama |
| 6,384,844 B1 | 5/2002 | Stewart et al. |
| 6,386,444 B1 | 5/2002 | Sullivan |
| 6,397,197 B1 | 5/2002 | Gindlesperger |
| 6,397,212 B1 | 5/2002 | Biffar |
| 6,401,118 B1 | 6/2002 | Thomas |
| 6,405,181 B2 | 6/2002 | Lent et al. |
| 6,405,245 B1 | 6/2002 | Burson et al. |

(56) References Cited

U.S. PATENT DOCUMENTS

| | | |
|---|---|---|
| 6,408,282 B1 | 6/2002 | Buist |
| 6,412,073 B1 | 6/2002 | Rangan |
| 6,421,675 B1 | 7/2002 | Ryan et al. |
| 6,421,729 B1 | 7/2002 | Paltenghe et al. |
| 6,422,462 B1 | 7/2002 | Cohen |
| 6,442,590 B1 | 8/2002 | Inala et al. |
| 6,453,353 B1 | 9/2002 | Win et al. |
| 6,457,012 B1 | 9/2002 | Jatkowski |
| 6,460,127 B1 | 10/2002 | Akerib |
| 6,473,740 B2 | 10/2002 | Cockril et al. |
| 6,477,565 B1 | 11/2002 | Daswani et al. |
| 6,487,540 B1 | 11/2002 | Smith et al. |
| 6,496,936 B1 | 12/2002 | French et al. |
| 6,505,168 B1 | 1/2003 | Rothman et al. |
| 6,510,451 B2 | 1/2003 | Wu et al. |
| 6,517,587 B2 | 2/2003 | Satyavolu et al. |
| 6,523,021 B1 | 2/2003 | Monberg et al. |
| 6,523,041 B1 | 2/2003 | Morgan et al. |
| 6,539,377 B1 | 3/2003 | Culliss |
| 6,539,392 B1 | 3/2003 | Rebane |
| 6,543,683 B2 | 4/2003 | Hoffman |
| 6,549,904 B1 | 4/2003 | Ortega et al. |
| 6,552,670 B2 | 4/2003 | Sundaravel et al. |
| 6,564,210 B1 | 5/2003 | Korda et al. |
| 6,567,791 B2 | 5/2003 | Lent et al. |
| 6,567,850 B1 | 5/2003 | Freishtat et al. |
| 6,571,236 B1 | 5/2003 | Ruppelt |
| 6,574,736 B1 | 6/2003 | Andrews |
| 6,578,012 B1 | 6/2003 | Storey |
| 6,581,025 B2 | 6/2003 | Lehman |
| 6,587,841 B1 | 7/2003 | DeFrancesco |
| 6,594,766 B2 | 7/2003 | Rangan et al. |
| 6,611,816 B2 | 8/2003 | Lebda et al. |
| 6,615,193 B1 | 9/2003 | Kingdon et al. |
| 6,622,131 B1 | 9/2003 | Brown et al. |
| 6,629,245 B1 | 9/2003 | Stone et al. |
| 6,633,910 B1 | 10/2003 | Rajan et al. |
| 6,647,383 B1 | 11/2003 | August et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,694,353 B2 | 2/2004 | Sommerer |
| 6,701,348 B2 | 3/2004 | Sommerer |
| 6,703,930 B2 | 3/2004 | Skinner |
| 6,711,665 B1 | 3/2004 | Akerib et al. |
| 6,714,944 B1 | 3/2004 | Shapiro et al. |
| 6,718,313 B1 | 4/2004 | Lent et al. |
| 6,725,381 B1 | 4/2004 | Smith et al. |
| 6,725,425 B1 | 4/2004 | Rajan et al. |
| 6,738,804 B1 | 5/2004 | Lo |
| 6,745,196 B1 | 6/2004 | Colyer et al. |
| 6,745,938 B2 | 6/2004 | Sullivan |
| 6,748,426 B1 | 6/2004 | Shaffer et al. |
| 6,750,985 B2 | 6/2004 | Rhoads |
| 6,766,304 B2 | 7/2004 | Kemp et al. |
| 6,766,327 B2 | 7/2004 | Morgan, Jr. et al. |
| 6,772,132 B1 | 8/2004 | Kemp et al. |
| 6,781,608 B1 | 8/2004 | Crawford |
| 6,782,370 B1 | 8/2004 | Stack |
| 6,782,379 B2 | 8/2004 | Lee |
| 6,792,088 B2 | 9/2004 | Takeuchi |
| 6,792,263 B1 | 9/2004 | Kite |
| 6,795,812 B1 | 9/2004 | Lent et al. |
| 6,796,497 B2 | 9/2004 | Benkert et al. |
| 6,802,042 B2 | 10/2004 | Rangan et al. |
| 6,804,346 B1 | 10/2004 | Mewhinney |
| 6,805,287 B2 | 10/2004 | Bishop et al. |
| 6,807,533 B1 | 10/2004 | Land et al. |
| 6,810,323 B1 | 10/2004 | Bullock et al. |
| 6,816,850 B2 | 11/2004 | Culliss |
| 6,816,871 B2 | 11/2004 | Lee |
| 6,823,319 B1 | 11/2004 | Lynch et al. |
| 6,826,707 B1 | 11/2004 | Stevens |
| 6,829,639 B1 | 12/2004 | Lawson et al. |
| 6,842,782 B1 | 1/2005 | Malik et al. |
| 6,845,448 B1 | 1/2005 | Chaganti et al. |
| 6,847,966 B1 | 1/2005 | Sommer et al. |
| 6,847,974 B2 | 1/2005 | Wachtel |
| 6,850,918 B1 | 2/2005 | Burchetta et al. |
| 6,857,073 B2 | 2/2005 | French et al. |
| 6,859,212 B2 | 2/2005 | Kumar et al. |
| 6,865,680 B1 | 3/2005 | Wu et al. |
| 6,871,220 B1 | 3/2005 | Rajan et al. |
| 6,871,287 B1 | 3/2005 | Ellingson |
| 6,871,789 B2 | 3/2005 | Hilton et al. |
| 6,892,307 B1 | 5/2005 | Wood et al. |
| 6,898,574 B1 | 5/2005 | Regan |
| 6,900,731 B2 | 5/2005 | Kreiner et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,938,011 B1 | 8/2005 | Kemp et al. |
| 6,941,323 B1 | 9/2005 | Galperin |
| 6,947,989 B2 | 9/2005 | Gullotta et al. |
| 6,950,807 B2 | 9/2005 | Brock |
| 6,954,741 B1 | 10/2005 | Burchetta et al. |
| 6,954,757 B2 | 10/2005 | Zargham et al. |
| 6,957,336 B2 | 10/2005 | Wheeler et al. |
| 6,962,336 B2 | 11/2005 | Glass |
| 6,963,857 B1 | 11/2005 | Johnson |
| 6,965,881 B1 | 11/2005 | Brickell et al. |
| 6,968,319 B1 | 11/2005 | Remington et al. |
| 6,970,864 B2 | 11/2005 | Marcus et al. |
| 6,973,462 B2 | 12/2005 | Dattero et al. |
| 6,983,320 B1 | 1/2006 | Thomas et al. |
| 6,985,183 B2 | 1/2006 | Jan et al. |
| 6,985,887 B1 | 1/2006 | Sunstein et al. |
| 6,988,082 B1 | 1/2006 | Williams et al. |
| 6,988,085 B2 | 1/2006 | Hedy |
| 6,990,591 B1 | 1/2006 | Pearson |
| 6,993,504 B1 | 1/2006 | Friesen et al. |
| 6,993,510 B2 | 1/2006 | Guy et al. |
| 6,993,572 B2 | 1/2006 | Ross, Jr. et al. |
| 6,993,596 B2 | 1/2006 | Hinton et al. |
| 6,996,542 B1 | 2/2006 | Landry |
| 6,999,941 B1 | 2/2006 | Agarwal |
| 7,013,310 B2 | 3/2006 | Messing et al. |
| 7,013,315 B1 | 3/2006 | Boothby |
| 7,013,323 B1 | 3/2006 | Thomas et al. |
| 7,016,907 B2 | 3/2006 | Boreham et al. |
| 7,024,548 B1 | 4/2006 | O'Toole, Jr. |
| 7,024,689 B2 | 4/2006 | O'Donnell et al. |
| 7,028,013 B2 | 4/2006 | Saeki |
| 7,028,052 B2 | 4/2006 | Chapman et al. |
| 7,039,607 B2 | 5/2006 | Watarai et al. |
| 7,039,656 B1 | 5/2006 | Tsai et al. |
| 7,043,476 B2 | 5/2006 | Robson |
| 7,046,139 B2 | 5/2006 | Kuhn et al. |
| 7,047,258 B2 | 5/2006 | Balogh et al. |
| 7,050,989 B1 | 5/2006 | Hurt et al. |
| 7,058,386 B2 | 6/2006 | McGregor et al. |
| 7,058,817 B1 | 6/2006 | Ellmore |
| 7,062,475 B1 | 6/2006 | Szabo et al. |
| 7,065,526 B2 | 6/2006 | Wissner et al. |
| 7,065,566 B2 | 6/2006 | Menard et al. |
| 7,069,240 B2 | 6/2006 | Spero et al. |
| 7,072,909 B2 | 7/2006 | Polk |
| 7,076,462 B1 | 7/2006 | Nelson et al. |
| 7,085,727 B2 | 8/2006 | VanOrman |
| 7,085,997 B1 | 8/2006 | Wu et al. |
| 7,086,586 B1 | 8/2006 | Sullivan |
| 7,089,594 B2 | 8/2006 | Lal et al. |
| 7,103,473 B2 | 9/2006 | Ranjan |
| 7,103,602 B2 | 9/2006 | Black et al. |
| 7,107,241 B1 | 9/2006 | Pinto |
| 7,107,285 B2 | 9/2006 | Von Kaenel et al. |
| 7,110,978 B1 | 9/2006 | Chin |
| 7,117,172 B1 | 10/2006 | Black |
| 7,117,529 B1 | 10/2006 | O'Donnell et al. |
| 7,124,144 B2 | 10/2006 | Christianson et al. |
| 7,127,068 B2 | 10/2006 | Sundaravel et al. |
| 7,127,424 B2 | 10/2006 | Kemp et al. |
| 7,139,728 B2 | 11/2006 | Rigole |
| 7,143,063 B2 | 11/2006 | Lent |

(56) References Cited

U.S. PATENT DOCUMENTS

| | | |
|---|---|---|
| 7,149,782 B2 | 12/2006 | Sommerer |
| 7,155,508 B2 | 12/2006 | Sankuratripati et al. |
| 7,155,725 B1 | 12/2006 | Kister et al. |
| 7,155,739 B2 | 12/2006 | Bari et al. |
| 7,174,455 B1 | 2/2007 | Arnold et al. |
| 7,178,096 B2 | 2/2007 | Rangan et al. |
| 7,181,418 B1 | 2/2007 | Zucker et al. |
| 7,181,427 B1 | 2/2007 | DeFrancesco |
| 7,194,416 B1 | 3/2007 | Provost et al. |
| 7,200,602 B2 | 4/2007 | Jonas |
| 7,200,804 B1 | 4/2007 | Khavari et al. |
| 7,206,768 B1 | 4/2007 | deGroeve et al. |
| 7,209,895 B2 | 4/2007 | Kundtz et al. |
| 7,209,911 B2 | 4/2007 | Boothby et al. |
| 7,212,995 B2 | 5/2007 | Schulkins |
| 7,212,999 B2 | 5/2007 | Friesen et al. |
| 7,213,064 B2 | 5/2007 | Smith et al. |
| 7,218,912 B2 | 5/2007 | Erskine et al. |
| 7,219,107 B2 | 5/2007 | Beringer |
| 7,222,085 B2 | 5/2007 | Stack |
| 7,222,369 B2 | 5/2007 | Vering et al. |
| 7,225,464 B2 | 5/2007 | Satyavolu et al. |
| 7,228,289 B2 | 6/2007 | Brumfield et al. |
| 7,228,335 B2 | 6/2007 | Caughey |
| 7,229,006 B2 | 6/2007 | Babbi et al. |
| 7,234,156 B2 | 6/2007 | French et al. |
| 7,236,950 B2 | 6/2007 | Savage et al. |
| 7,240,363 B1 | 7/2007 | Ellingson |
| 7,243,369 B2 | 7/2007 | Bhat et al. |
| 7,246,361 B1 | 7/2007 | Scalora et al. |
| 7,246,740 B2 | 7/2007 | Swift et al. |
| 7,249,076 B1 | 7/2007 | Pendleton et al. |
| 7,249,080 B1 | 7/2007 | Hoffman et al. |
| 7,249,096 B1 | 7/2007 | Lasater et al. |
| 7,249,113 B1 | 7/2007 | Continelli et al. |
| 7,263,497 B1 | 8/2007 | Wiser et al. |
| 7,263,548 B2 | 8/2007 | Daswani et al. |
| 7,280,980 B1 | 10/2007 | Hoadley et al. |
| 7,281,652 B2 | 10/2007 | Foss |
| 7,289,971 B1 | 10/2007 | O'Neil et al. |
| 7,296,734 B2 | 11/2007 | Pliha |
| 7,302,272 B2 | 11/2007 | Ackley |
| 7,305,233 B2 | 12/2007 | Paul et al. |
| 7,310,611 B2 | 12/2007 | Shibuya et al. |
| 7,310,617 B1 | 12/2007 | Cunningham |
| 7,310,618 B2 | 12/2007 | Libman |
| 7,313,813 B2 | 12/2007 | Rangan et al. |
| 7,314,167 B1 | 1/2008 | Kiliccote |
| 7,315,837 B2 | 1/2008 | Sloan et al. |
| 7,328,233 B2 | 2/2008 | Salim et al. |
| 7,328,435 B2 | 2/2008 | Trifon |
| 7,330,717 B2 | 2/2008 | Gidron et al. |
| 7,330,831 B2 | 2/2008 | Biondi et al. |
| 7,330,835 B2 | 2/2008 | Deggendorf |
| 7,333,635 B2 | 2/2008 | Tsantes et al. |
| 7,334,020 B2 | 2/2008 | Caughey |
| 7,340,042 B2 | 3/2008 | Cluff et al. |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,356,503 B1 | 4/2008 | Johnson et al. |
| 7,356,506 B2 | 4/2008 | Watson et al. |
| 7,356,516 B2 * | 4/2008 | Richey ............... G06Q 30/0253 705/16 |
| 7,366,495 B1 | 4/2008 | Magnotta et al. |
| 7,366,694 B2 | 4/2008 | Lazerson |
| 7,366,759 B2 | 4/2008 | Trevithick |
| 7,370,014 B1 | 5/2008 | Vasavada et al. |
| 7,370,044 B2 | 5/2008 | Mulhern et al. |
| 7,373,324 B1 | 5/2008 | Engin et al. |
| 7,379,978 B2 | 5/2008 | Anderson et al. |
| 7,383,988 B2 | 6/2008 | Slonecker, Jr. |
| 7,386,511 B2 | 6/2008 | Buchanan et al. |
| 7,386,786 B2 | 6/2008 | Davis et al. |
| 7,389,913 B2 | 6/2008 | Starrs |
| 7,395,241 B1 | 7/2008 | Cook et al. |
| 7,395,243 B1 | 7/2008 | Zielke et al. |
| 7,395,273 B2 | 7/2008 | Khan et al. |
| 7,400,883 B2 | 7/2008 | Rivers et al. |
| 7,401,050 B2 | 7/2008 | O'Neill |
| 7,403,923 B2 | 7/2008 | Elliott et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,412,487 B2 | 8/2008 | Caughey |
| 7,413,113 B1 | 8/2008 | Zhu |
| 7,424,520 B2 | 9/2008 | Daswani et al. |
| 7,430,520 B1 | 9/2008 | Haugen et al. |
| 7,433,864 B2 | 10/2008 | Malik |
| 7,437,679 B2 | 10/2008 | Uemura et al. |
| 7,444,518 B1 | 10/2008 | Dharmarajan et al. |
| 7,447,663 B1 | 11/2008 | Barker et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,475,032 B1 | 1/2009 | Patnode et al. |
| 7,479,949 B2 | 1/2009 | Jobs et al. |
| 7,480,631 B1 | 1/2009 | Merced et al. |
| 7,483,892 B1 | 1/2009 | Sommer et al. |
| 7,490,356 B2 | 2/2009 | Lieblich et al. |
| RE40,692 E | 3/2009 | Rose, Jr. |
| 7,503,489 B2 | 3/2009 | Heffez |
| 7,505,931 B2 | 3/2009 | Silva |
| 7,509,117 B2 | 3/2009 | Yum |
| 7,509,278 B2 | 3/2009 | Jones |
| 7,512,221 B2 | 3/2009 | Toms |
| 7,529,698 B2 | 5/2009 | Joao |
| 7,530,097 B2 | 5/2009 | Casco-Arias et al. |
| 7,536,329 B2 | 5/2009 | Goldberg et al. |
| 7,536,348 B2 | 5/2009 | Shao et al. |
| 7,536,354 B1 | 5/2009 | deGroeve et al. |
| 7,542,468 B1 | 6/2009 | Begley et al. |
| 7,542,922 B2 | 6/2009 | Bennett et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,080 B1 | 6/2009 | Willard et al. |
| 7,552,086 B1 | 6/2009 | Rajasekar et al. |
| 7,552,089 B2 | 6/2009 | Bruer et al. |
| 7,552,190 B1 | 6/2009 | Freishtat et al. |
| 7,552,467 B2 | 6/2009 | Lindsay |
| 7,555,459 B2 | 6/2009 | Dhar et al. |
| 7,558,748 B2 | 7/2009 | Ehring et al. |
| 7,558,777 B1 | 7/2009 | Santos |
| 7,558,795 B2 | 7/2009 | Malik et al. |
| 7,559,217 B2 | 7/2009 | Bass |
| 7,562,184 B2 | 7/2009 | Henmi et al. |
| 7,562,382 B2 | 7/2009 | Hinton et al. |
| 7,562,814 B1 | 7/2009 | Shao et al. |
| 7,571,138 B2 | 8/2009 | Miri et al. |
| 7,571,322 B2 | 8/2009 | Karoubi |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,583,682 B2 | 9/2009 | Hopkins |
| 7,584,126 B1 | 9/2009 | White |
| 7,584,146 B1 | 9/2009 | Duhon |
| 7,587,368 B2 | 9/2009 | Felsher |
| 7,593,891 B2 | 9/2009 | Kornegay et al. |
| 7,594,019 B2 | 9/2009 | Clapper |
| 7,596,716 B2 | 9/2009 | Frost et al. |
| 7,606,752 B2 | 10/2009 | Hazlehurst et al. |
| 7,610,216 B1 | 10/2009 | May et al. |
| 7,610,229 B1 | 10/2009 | Kornegay |
| 7,613,600 B2 | 11/2009 | Krane |
| 7,620,596 B2 | 11/2009 | Knudson et al. |
| 7,620,602 B2 | 11/2009 | Jakstadt et al. |
| 7,620,653 B1 | 11/2009 | Swartz |

(56) References Cited

U.S. PATENT DOCUMENTS

| | | | |
|---|---|---|---|
| 7,623,844 B2 | 11/2009 | Herrmann et al. | |
| 7,624,433 B1 | 11/2009 | Clark et al. | |
| 7,630,903 B1* | 12/2009 | Vaidyanathan | G06Q 10/10 |
| | | | 705/1.1 |
| 7,630,932 B2 | 12/2009 | Danaher et al. | |
| 7,630,933 B2 | 12/2009 | Peterson et al. | |
| 7,631,803 B2 | 12/2009 | Peyret et al. | |
| 7,634,651 B1 | 12/2009 | Gerde et al. | |
| 7,634,737 B2 | 12/2009 | Beringer et al. | |
| 7,636,686 B2 | 12/2009 | Pierdinock et al. | |
| 7,640,200 B2 | 12/2009 | Gardner et al. | |
| 7,640,209 B1 | 12/2009 | Brooks et al. | |
| 7,644,023 B2 | 1/2010 | Kumar et al. | |
| 7,644,035 B1* | 1/2010 | Biffle | G06Q 20/4016 |
| | | | 705/39 |
| 7,644,285 B1 | 1/2010 | Murray et al. | |
| 7,647,274 B2 | 1/2010 | Peterson et al. | |
| 7,647,344 B2 | 1/2010 | Skurtovich, Jr. et al. | |
| 7,653,592 B1 | 1/2010 | Flaxman et al. | |
| 7,653,600 B2 | 1/2010 | Gustin | |
| 7,653,613 B1 | 1/2010 | DeGraaff et al. | |
| 7,653,688 B2 | 1/2010 | Bittner | |
| 7,664,725 B2 | 2/2010 | Murray et al. | |
| 7,665,657 B2 | 2/2010 | Huh | |
| 7,672,833 B2 | 3/2010 | Blume et al. | |
| 7,672,865 B2 | 3/2010 | Kumar et al. | |
| 7,672,879 B1 | 3/2010 | Kumar et al. | |
| 7,672,944 B1 | 3/2010 | Holladay et al. | |
| 7,676,410 B2 | 3/2010 | Petralia | |
| 7,676,463 B2 | 3/2010 | Thompson et al. | |
| 7,680,772 B2 | 3/2010 | Kronberg | |
| 7,685,209 B1 | 3/2010 | Norton et al. | |
| 7,685,525 B2 | 3/2010 | Kumar et al. | |
| 7,686,214 B1 | 3/2010 | Shao et al. | |
| 7,688,813 B2 | 3/2010 | Shin et al. | |
| 7,689,487 B1 | 3/2010 | Britto et al. | |
| 7,689,505 B2 | 3/2010 | Kasower | |
| 7,689,563 B1 | 3/2010 | Jacobson | |
| 7,690,032 B1 | 3/2010 | Peirce | |
| 7,693,787 B2 | 4/2010 | Provinse | |
| 7,697,520 B2 | 4/2010 | Hopkins | |
| 7,698,214 B1 | 4/2010 | Lindgren | |
| 7,698,217 B1 | 4/2010 | Phillips et al. | |
| 7,702,576 B2 | 4/2010 | Fahner et al. | |
| 7,707,117 B1 | 4/2010 | Jimenez et al. | |
| 7,707,122 B2 | 4/2010 | Hull et al. | |
| 7,707,271 B2 | 4/2010 | Rudkin et al. | |
| 7,708,190 B2 | 5/2010 | Brandt et al. | |
| 7,711,626 B2 | 5/2010 | Nanjundamoorthy et al. | |
| 7,711,635 B2 | 5/2010 | Steele et al. | |
| 7,711,707 B2 | 5/2010 | Kelley | |
| 7,715,832 B2 | 5/2010 | Zhou | |
| 7,720,705 B2 | 5/2010 | Stein | |
| 7,720,750 B2 | 5/2010 | Brody | |
| 7,720,846 B1 | 5/2010 | Bayliss | |
| 7,725,385 B2 | 5/2010 | Royer et al. | |
| 7,729,283 B2 | 6/2010 | Ferguson et al. | |
| 7,729,959 B1 | 6/2010 | Wells et al. | |
| 7,729,969 B1 | 6/2010 | Smith, III et al. | |
| 7,730,078 B2 | 6/2010 | Schwabe et al. | |
| 7,734,522 B2 | 6/2010 | Johnson et al. | |
| 7,734,541 B2 | 6/2010 | Kumar et al. | |
| 7,734,637 B2 | 6/2010 | Greifeneder et al. | |
| 7,739,193 B2 | 6/2010 | Zimmer et al. | |
| 7,739,707 B2 | 6/2010 | Sie et al. | |
| 7,747,520 B2 | 6/2010 | Livermore et al. | |
| 7,747,521 B2 | 6/2010 | Serio | |
| 7,752,179 B1 | 7/2010 | Brown | |
| 7,752,286 B2 | 7/2010 | Anderson et al. | |
| 7,756,789 B2 | 7/2010 | Welker et al. | |
| 7,757,944 B2 | 7/2010 | Cline et al. | |
| 7,761,373 B2 | 7/2010 | Metz | |
| 7,761,384 B2 | 7/2010 | Madhogarhia | |
| 7,761,569 B2 | 7/2010 | Hopkins | |
| 7,765,148 B2 | 7/2010 | German et al. | |
| 7,765,166 B2 | 7/2010 | Beringer et al. | |
| 7,765,279 B1 | 7/2010 | Kaib et al. | |
| 7,765,525 B1 | 7/2010 | Davidson et al. | |
| 7,769,697 B2 | 8/2010 | Fieschi et al. | |
| 7,769,998 B2 | 8/2010 | Lynch et al. | |
| 7,770,002 B2 | 8/2010 | Weber | |
| 7,774,257 B2 | 8/2010 | Maggioncalda et al. | |
| 7,774,270 B1 | 8/2010 | MacCloskey | |
| 7,778,868 B2 | 8/2010 | Haugen et al. | |
| 7,783,515 B1 | 8/2010 | Kumar et al. | |
| 7,783,749 B2 | 8/2010 | Hopkins | |
| 7,787,869 B2 | 8/2010 | Rice et al. | |
| 7,788,040 B2 | 8/2010 | Haskell et al. | |
| 7,792,715 B1 | 9/2010 | Kasower | |
| 7,792,725 B2 | 9/2010 | Booraem et al. | |
| 7,792,747 B2 | 9/2010 | Chin | |
| 7,792,903 B2 | 9/2010 | Fischer et al. | |
| 7,793,835 B1 | 9/2010 | Coggeshall et al. | |
| 7,797,224 B2 | 9/2010 | Barone et al. | |
| 7,797,252 B2 | 9/2010 | Rosskamm et al. | |
| 7,797,644 B2 | 9/2010 | Bhojan | |
| 7,797,734 B2 | 9/2010 | Babi et al. | |
| 7,801,807 B2 | 9/2010 | DeFrancesco et al. | |
| 7,801,811 B1 | 9/2010 | Merrell et al. | |
| 7,801,828 B2 | 9/2010 | Candella et al. | |
| 7,801,896 B2 | 9/2010 | Szabo | |
| 7,801,956 B1 | 9/2010 | Cumberbatch et al. | |
| 7,802,104 B2 | 9/2010 | Dickinson | |
| 7,805,348 B2 | 9/2010 | Nanjundamoorthy et al. | |
| 7,805,362 B1 | 9/2010 | Merrell et al. | |
| 7,805,439 B2 | 9/2010 | Elliott et al. | |
| 7,809,398 B2 | 10/2010 | Pearson | |
| 7,809,624 B1 | 10/2010 | Smith, III et al. | |
| 7,809,797 B2 | 10/2010 | Cooley et al. | |
| 7,810,036 B2 | 10/2010 | Bales et al. | |
| 7,814,002 B2 | 10/2010 | DeFrancesco et al. | |
| 7,814,005 B2 | 10/2010 | Imrey et al. | |
| 7,814,431 B1 | 10/2010 | Quinn et al. | |
| 7,818,228 B1 | 10/2010 | Coulter | |
| 7,818,229 B2 | 10/2010 | Imrey et al. | |
| 7,818,382 B2 | 10/2010 | Sommerer | |
| 7,822,624 B2 | 10/2010 | Erdmann et al. | |
| 7,822,667 B1 | 10/2010 | Smith, III et al. | |
| 7,827,108 B2 | 11/2010 | Perlman et al. | |
| 7,827,115 B2 | 11/2010 | Weller et al. | |
| 7,831,609 B1 | 11/2010 | Alexander | |
| 7,832,006 B2 | 11/2010 | Chen et al. | |
| 7,835,983 B2 | 11/2010 | Lefner et al. | |
| 7,835,990 B2 | 11/2010 | Coleman | |
| 7,840,484 B2 | 11/2010 | Haggerty et al. | |
| 7,840,597 B2 | 11/2010 | Showalter et al. | |
| 7,840,674 B1 | 11/2010 | Sterling | |
| 7,841,004 B1 | 11/2010 | Balducci et al. | |
| 7,841,008 B1 | 11/2010 | Cole et al. | |
| 7,844,520 B1 | 11/2010 | Franklin | |
| 7,844,604 B2 | 11/2010 | Baio et al. | |
| 7,848,972 B1 | 12/2010 | Sharma | |
| 7,848,978 B2 | 12/2010 | Imrey et al. | |
| 7,849,014 B2 | 12/2010 | Erikson | |
| 7,849,397 B1 | 12/2010 | Ahmed | |
| 7,853,493 B2 | 12/2010 | DeBie et al. | |
| 7,853,522 B2 | 12/2010 | Chin | |
| 7,856,203 B2 | 12/2010 | Lipovski | |
| 7,856,376 B2 | 12/2010 | Storey | |
| 7,856,386 B2 | 12/2010 | Hazlehurst et al. | |
| 7,856,453 B2 | 12/2010 | Malik et al. | |
| 7,860,769 B2 | 12/2010 | Benson | |
| 7,860,790 B2 | 12/2010 | Monk | |
| 7,865,412 B1 | 1/2011 | Weiss et al. | |
| 7,866,548 B2 | 1/2011 | Reed et al. | |
| 7,870,066 B2* | 1/2011 | Lin | G06Q 20/10 |
| | | | 705/40 |
| 7,870,068 B2 | 1/2011 | Chin | |
| 7,870,078 B2 | 1/2011 | Clark et al. | |
| 7,870,485 B2 | 1/2011 | Seliutin et al. | |
| 7,870,491 B1 | 1/2011 | Henderson et al. | |
| 7,873,563 B2 | 1/2011 | Barone et al. | |
| 7,873,573 B2 | 1/2011 | Realini | |
| 7,873,677 B2 | 1/2011 | Messing et al. | |

(56) References Cited

U.S. PATENT DOCUMENTS

| | | |
|---|---|---|
| 7,877,304 B1 | 1/2011 | Coulter |
| 7,877,402 B1 | 1/2011 | Weiss et al. |
| 7,877,784 B2 | 1/2011 | Chow et al. |
| 7,880,728 B2 | 2/2011 | de los Reyes et al. |
| 7,890,403 B1 | 2/2011 | Smith |
| 7,895,227 B1 | 2/2011 | Henderson |
| 7,899,750 B1 | 3/2011 | Klieman et al. |
| 7,899,757 B1 | 3/2011 | Talan et al. |
| 7,904,447 B1 | 3/2011 | Russell et al. |
| 7,904,899 B2 | 3/2011 | Robalewski et al. |
| 7,908,242 B1 | 3/2011 | Achanta |
| 7,909,246 B2 | 3/2011 | Hogg et al. |
| 7,911,673 B1 | 3/2011 | Yap |
| 7,912,778 B2 | 3/2011 | Nanjundamoorthy |
| 7,912,842 B1 | 3/2011 | Bayliss et al. |
| 7,912,865 B2 | 3/2011 | Akerman et al. |
| 7,913,173 B2 | 3/2011 | Hebard et al. |
| 7,917,412 B1 | 3/2011 | Wang et al. |
| 7,917,754 B1 | 3/2011 | Harrison et al. |
| 7,925,285 B2 | 4/2011 | Indirabhai |
| 7,925,582 B1 | 4/2011 | Kornegay et al. |
| 7,925,982 B1 | 4/2011 | Parker |
| 7,930,239 B2 | 4/2011 | Pierdinock et al. |
| 7,930,285 B2 | 4/2011 | Abraham et al. |
| 7,930,302 B2 | 4/2011 | Bandaru et al. |
| 7,930,411 B1 | 4/2011 | Hayward |
| 7,933,834 B2 | 4/2011 | Kumar et al. |
| 7,937,325 B2 | 5/2011 | Kumar et al. |
| 7,941,560 B1 | 5/2011 | Friesen et al. |
| 7,953,213 B2 | 5/2011 | Babi et al. |
| 7,954,698 B1 | 6/2011 | Pliha |
| 7,958,046 B2 | 6/2011 | Doerner et al. |
| 7,962,361 B2 | 6/2011 | Ramchandani et al. |
| 7,965,275 B1 | 6/2011 | Lew |
| 7,966,192 B2 | 6/2011 | Pagliari et al. |
| 7,966,325 B2 | 6/2011 | Singh |
| 7,970,676 B2 | 6/2011 | Feinstein |
| 7,970,679 B2 | 6/2011 | Kasower |
| 7,970,698 B2 | 6/2011 | Gupta et al. |
| 7,970,701 B2 | 6/2011 | Lewis et al. |
| 7,970,796 B2 | 6/2011 | Narayanan |
| 7,971,141 B1 | 6/2011 | Quinn et al. |
| 7,975,299 B1 | 7/2011 | Balducci et al. |
| 7,979,908 B2 | 7/2011 | Millwee |
| 7,983,932 B2 | 7/2011 | Kane |
| 7,983,979 B2 | 7/2011 | Holland, IV |
| 7,984,436 B1 | 7/2011 | Murray |
| 7,987,173 B2 | 7/2011 | Alexander |
| 7,987,501 B2 | 7/2011 | Miller et al. |
| 7,990,895 B2 | 8/2011 | Ferguson et al. |
| 7,991,673 B2 | 8/2011 | Kumar et al. |
| 7,991,688 B2 | 8/2011 | Phelan et al. |
| 8,001,041 B2 | 8/2011 | Hoadley et al. |
| 8,001,153 B2 | 8/2011 | Skurtovich, Jr. et al. |
| 8,001,235 B2 | 8/2011 | Russ et al. |
| 8,001,582 B2 | 8/2011 | Hulten et al. |
| 8,005,755 B2 | 8/2011 | Freishtat et al. |
| 8,006,261 B1 | 8/2011 | Haberman et al. |
| 8,010,422 B1 | 8/2011 | Lascelles et al. |
| 8,010,674 B2 | 8/2011 | Fong |
| 8,014,756 B1 | 9/2011 | Henderson |
| 8,015,083 B1 | 9/2011 | Sterling et al. |
| 8,015,107 B2 | 9/2011 | Kornegay et al. |
| 8,019,066 B1 | 9/2011 | Efrati et al. |
| 8,024,660 B1 | 9/2011 | Quinn et al. |
| 8,027,975 B2 | 9/2011 | Gabriel et al. |
| 8,032,822 B1 | 10/2011 | Artamonov et al. |
| 8,032,930 B2 | 10/2011 | Hicks |
| 8,032,932 B2 | 10/2011 | Speyer et al. |
| 8,036,941 B2 | 10/2011 | Bennett et al. |
| 8,037,097 B2 | 10/2011 | Guo et al. |
| 8,037,115 B1 | 10/2011 | Scalora et al. |
| 8,037,176 B2 | 10/2011 | Hopkins |
| 8,041,127 B2 | 10/2011 | Whitelaw |
| 8,051,074 B2 | 11/2011 | Eom et al. |
| 8,055,904 B1 | 11/2011 | Cato et al. |
| 8,060,404 B2 | 11/2011 | Storey |
| 8,060,424 B2 | 11/2011 | Kasower |
| 8,060,438 B2 | 11/2011 | Dhar et al. |
| 8,060,508 B2 | 11/2011 | Gabriel et al. |
| 8,060,532 B2 | 11/2011 | White et al. |
| 8,060,916 B2 | 11/2011 | Bajaj et al. |
| 8,065,175 B1 | 11/2011 | Lewis |
| 8,065,233 B2 | 11/2011 | Lee et al. |
| 8,065,367 B1 | 11/2011 | Stanley |
| 8,069,213 B2 | 11/2011 | Bloch et al. |
| 8,069,407 B1 | 11/2011 | Armandpour et al. |
| 8,073,785 B1 | 12/2011 | Candella et al. |
| 8,078,453 B2 | 12/2011 | Shaw |
| 8,078,516 B1 | 12/2011 | Weiss et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,078,986 B2 | 12/2011 | Rhyne et al. |
| 8,086,508 B2 | 12/2011 | Dheer et al. |
| 8,086,525 B2 | 12/2011 | Atwood et al. |
| 8,090,794 B1 | 1/2012 | Kilat et al. |
| 8,095,443 B2 | 1/2012 | DeBie |
| 8,095,458 B2 | 1/2012 | Peterson et al. |
| 8,095,534 B1 | 1/2012 | Alexander |
| 8,095,614 B2 | 1/2012 | Hopkins |
| 8,098,239 B1 | 1/2012 | Moore |
| 8,099,309 B1 | 1/2012 | Bober |
| 8,099,341 B2 | 1/2012 | Varghese |
| 8,099,356 B2 | 1/2012 | Feinstein et al. |
| 8,099,376 B2 | 1/2012 | Serrano-Morales et al. |
| 8,103,587 B2 | 1/2012 | Kumar et al. |
| 8,104,671 B2 | 1/2012 | Besecker et al. |
| 8,104,679 B2 | 1/2012 | Brown |
| 8,108,301 B2 | 1/2012 | Gupta et al. |
| 8,117,648 B2 | 2/2012 | Slaton et al. |
| 8,122,133 B2 | 2/2012 | Hopkins |
| 8,126,456 B2 | 2/2012 | Lotter et al. |
| 8,126,820 B1 | 2/2012 | Talan et al. |
| 8,127,982 B1 | 3/2012 | Casey et al. |
| 8,127,986 B1 | 3/2012 | Taylor et al. |
| 8,130,075 B1 | 3/2012 | Hingole |
| 8,131,598 B2 | 3/2012 | Goolkasian et al. |
| 8,131,685 B1 | 3/2012 | Gedalius et al. |
| 8,131,777 B2 | 3/2012 | McCullouch |
| 8,131,846 B1 | 3/2012 | Hernacki et al. |
| 8,140,847 B1 | 3/2012 | Wu |
| 8,145,189 B2 | 3/2012 | Power et al. |
| 8,145,554 B2 | 3/2012 | Kumar et al. |
| 8,150,161 B2 | 4/2012 | Laaser et al. |
| 8,151,343 B1 | 4/2012 | Wang et al. |
| 8,151,344 B1 | 4/2012 | Channakeshava |
| 8,155,950 B1 | 4/2012 | Bickerstaff |
| 8,156,175 B2 | 4/2012 | Hopkins |
| 8,160,624 B2 | 4/2012 | Kumar et al. |
| 8,160,960 B2 | 4/2012 | Fei et al. |
| 8,171,471 B1 | 5/2012 | Daly |
| 8,175,889 B1 | 5/2012 | Girulat et al. |
| 8,194,956 B2 | 6/2012 | Chandler |
| 8,195,549 B2 | 6/2012 | Kasower |
| 8,196,113 B2 | 6/2012 | Miller et al. |
| 8,200,966 B2 | 6/2012 | Grinberg et al. |
| 8,201,257 B1 | 6/2012 | Andres et al. |
| 8,204,812 B2 | 6/2012 | Stewart et al. |
| 8,209,659 B2 | 6/2012 | Mathew |
| 8,219,473 B2 | 7/2012 | Gardner et al. |
| 8,219,771 B2 | 7/2012 | Le Neel |
| 8,224,723 B2 | 7/2012 | Bosch et al. |
| 8,224,747 B2 | 7/2012 | Kumar et al. |
| 8,224,974 B1 | 7/2012 | Flora et al. |
| 8,225,270 B2 | 7/2012 | Frasher et al. |
| 8,225,288 B2 | 7/2012 | Miller et al. |
| 8,225,383 B1 | 7/2012 | Channakeshava et al. |
| 8,225,395 B2 | 7/2012 | Atwood et al. |
| 8,229,850 B2 | 7/2012 | Dilip et al. |
| 8,229,911 B2 | 7/2012 | Bennett |
| 8,234,498 B2 | 7/2012 | Britti et al. |
| 8,244,635 B2 | 8/2012 | Freishtat et al. |

(56) References Cited

U.S. PATENT DOCUMENTS

| | | |
|---|---|---|
| 8,244,646 B2 | 8/2012 | Johnston et al. |
| 8,244,848 B1 | 8/2012 | Narayanan et al. |
| 8,249,965 B2 | 8/2012 | Tumminaro |
| 8,249,968 B1 | 8/2012 | Oldham et al. |
| 8,255,298 B1 | 8/2012 | Nesladek |
| 8,255,868 B1 | 8/2012 | Robalewski |
| 8,255,978 B2 | 8/2012 | Dick |
| 8,256,013 B1 | 8/2012 | Hernacki et al. |
| 8,260,649 B2 | 9/2012 | Ramanujan et al. |
| 8,260,699 B2 | 9/2012 | Smith et al. |
| 8,260,805 B1 | 9/2012 | Venu et al. |
| 8,261,204 B1 | 9/2012 | Huynh et al. |
| 8,261,334 B2 | 9/2012 | Hazlehurst et al. |
| 8,261,974 B2 | 9/2012 | Hull |
| 8,266,065 B2 | 9/2012 | Dilip et al. |
| 8,266,515 B2 | 9/2012 | Satyavolu |
| 8,271,362 B2 | 9/2012 | Fasching |
| 8,271,393 B2 | 9/2012 | Twining et al. |
| 8,271,650 B2 | 9/2012 | Alexander |
| 8,271,894 B1 | 9/2012 | Mayers |
| 8,271,899 B1 | 9/2012 | Blackburn et al. |
| 8,271,906 B1 | 9/2012 | Fong |
| 8,271,961 B1 | 9/2012 | Chithambaram |
| 8,275,683 B2 | 9/2012 | Wolfson et al. |
| 8,280,723 B1 | 10/2012 | Laaser |
| 8,280,879 B2 | 10/2012 | Alexander |
| 8,281,372 B1 | 10/2012 | Vidal |
| 8,285,613 B1 | 10/2012 | Coulter |
| 8,285,640 B2 | 10/2012 | Scipioni |
| 8,285,641 B2 | 10/2012 | Cataline et al. |
| 8,285,656 B1 | 10/2012 | Chang et al. |
| 8,290,835 B2 | 10/2012 | Homer et al. |
| 8,290,840 B2 | 10/2012 | Kasower |
| 8,290,845 B2 | 10/2012 | Leibon et al. |
| 8,290,856 B1 | 10/2012 | Kasower |
| 8,290,941 B2 | 10/2012 | Alexander |
| 8,296,206 B1 | 10/2012 | Del Favero et al. |
| 8,296,229 B1 | 10/2012 | Yellin et al. |
| 8,306,255 B1 | 11/2012 | Degnan |
| 8,306,889 B2 | 11/2012 | Leibon et al. |
| 8,311,792 B1 | 11/2012 | Podgorny et al. |
| 8,312,033 B1 | 11/2012 | McMillan |
| 8,320,944 B1 | 11/2012 | Gibson et al. |
| 8,321,339 B2 | 11/2012 | Imrey et al. |
| 8,321,413 B2 | 11/2012 | Gabriel et al. |
| 8,324,080 B2 | 12/2012 | Yang et al. |
| 8,326,725 B2 | 12/2012 | Elwell et al. |
| 8,327,429 B2 | 12/2012 | Speyer et al. |
| 8,335,741 B2 | 12/2012 | Kornegay et al. |
| 8,341,545 B2 | 12/2012 | Hebard |
| 8,346,226 B2 | 1/2013 | Gibson et al. |
| 8,346,615 B2 | 1/2013 | Connors et al. |
| 8,347,364 B2 | 1/2013 | Babi et al. |
| 8,352,564 B1 | 1/2013 | Campise et al. |
| 8,353,027 B2 | 1/2013 | Dennis et al. |
| 8,353,029 B2 | 1/2013 | Morgan et al. |
| 8,355,935 B2 | 1/2013 | Hellman et al. |
| 8,355,967 B2 | 1/2013 | Debie et al. |
| 8,359,278 B2 | 1/2013 | Domenikos et al. |
| 8,364,662 B1 | 1/2013 | Moyer et al. |
| 8,364,969 B2 | 1/2013 | King |
| 8,370,340 B1 | 2/2013 | Yu et al. |
| 8,374,885 B2 | 2/2013 | Stibel et al. |
| 8,374,973 B2 | 2/2013 | Herbrich et al. |
| 8,375,331 B1 | 2/2013 | Mayers |
| 8,380,803 B1 | 2/2013 | Stibel et al. |
| 8,381,120 B2 | 2/2013 | Stibel et al. |
| 8,386,966 B1 | 2/2013 | Attinasi et al. |
| 8,392,230 B2 | 3/2013 | Stibel et al. |
| 8,392,969 B1 | 3/2013 | Park et al. |
| 8,396,743 B2 | 3/2013 | Alvin |
| 8,396,747 B2 | 3/2013 | Bachenheimer |
| 8,400,970 B2 | 3/2013 | Bajar et al. |
| 8,401,875 B2 | 3/2013 | Fish et al. |
| 8,402,526 B2 | 3/2013 | Ahn |
| 8,407,141 B2 | 3/2013 | Mullen et al. |
| 8,407,194 B1 | 3/2013 | Chaput et al. |
| 8,412,593 B1 | 4/2013 | Song et al. |
| 8,413,239 B2 | 4/2013 | Sutton et al. |
| 8,417,644 B2 | 4/2013 | Ferguson et al. |
| 8,423,285 B2 | 4/2013 | Paterson et al. |
| 8,429,073 B2 | 4/2013 | Ferguson et al. |
| 8,432,275 B2 | 4/2013 | Patel et al. |
| 8,433,654 B2 | 4/2013 | Subbarao et al. |
| 8,443,202 B2 | 5/2013 | White et al. |
| 8,453,068 B2 | 5/2013 | Stibel et al. |
| 8,453,218 B2 | 5/2013 | Lan et al. |
| 8,456,293 B1 | 6/2013 | Trundle et al. |
| 8,458,062 B2 | 6/2013 | Dutt et al. |
| 8,463,595 B1 | 6/2013 | Rehling et al. |
| 8,463,939 B1 | 6/2013 | Galvin |
| 8,464,939 B1 | 6/2013 | Taylor et al. |
| 8,468,028 B2 | 6/2013 | Stibel et al. |
| 8,473,318 B2 | 6/2013 | Nielson et al. |
| 8,478,674 B1 | 7/2013 | Kapczynski et al. |
| 8,484,186 B1 | 7/2013 | Kapczynski et al. |
| 8,489,480 B2 | 7/2013 | Kassir |
| 8,490,197 B2 | 7/2013 | Herz |
| 8,494,973 B1 | 7/2013 | Dignan et al. |
| 8,498,914 B2 | 7/2013 | Hazelhurst |
| 8,498,944 B2 | 7/2013 | Solomon |
| 8,499,348 B1 | 7/2013 | Rubin |
| 8,504,470 B1 | 8/2013 | Chirehdast |
| 8,515,828 B1 | 8/2013 | Wolf et al. |
| 8,515,844 B2 | 8/2013 | Kasower |
| 8,527,357 B1 | 9/2013 | Ganesan |
| 8,527,596 B2 | 9/2013 | Long et al. |
| 8,533,118 B2 | 9/2013 | Weller et al. |
| 8,539,599 B2 | 9/2013 | Gomez et al. |
| 8,543,498 B2 | 9/2013 | Silbernagel et al. |
| 8,544,091 B2 | 9/2013 | Stibel |
| 8,548,903 B2 | 10/2013 | Becker |
| 8,554,584 B2 | 10/2013 | Hargroder |
| 8,555,357 B1 | 10/2013 | Gauvin |
| 8,560,161 B1 | 10/2013 | Kator et al. |
| 8,560,436 B2 | 10/2013 | Ingram et al. |
| 8,560,438 B2 | 10/2013 | Hankey et al. |
| 8,560,444 B2 | 10/2013 | Rosenblatt et al. |
| 8,560,447 B1 | 10/2013 | Hinghole et al. |
| 8,566,187 B2 | 10/2013 | Keld et al. |
| 8,572,083 B1 | 10/2013 | Snell et al. |
| 8,578,036 B1 | 11/2013 | Holfelder et al. |
| 8,578,496 B1 | 11/2013 | Krishnappa |
| 8,600,768 B2 | 12/2013 | Stibel et al. |
| 8,600,886 B2 | 12/2013 | Ramavarjula et al. |
| 8,601,602 B1 | 12/2013 | Zheng |
| 8,606,694 B2 | 12/2013 | Campbell et al. |
| 8,606,869 B2 | 12/2013 | Stibel et al. |
| 8,626,137 B1 | 1/2014 | Devitt et al. |
| 8,626,637 B1 | 1/2014 | Gooch et al. |
| 8,630,893 B2 | 1/2014 | Stibel et al. |
| 8,630,938 B2 | 1/2014 | Cheng et al. |
| 8,639,930 B2 | 1/2014 | Stibel et al. |
| 8,646,051 B2 | 2/2014 | Paden et al. |
| 8,650,189 B2 | 2/2014 | Fertik et al. |
| 8,660,541 B1 | 2/2014 | Beresniewicz et al. |
| 8,660,919 B2 | 2/2014 | Kasower |
| 8,671,115 B2 | 3/2014 | Skurtovich, Jr. et al. |
| 8,676,684 B2 | 3/2014 | Newman et al. |
| 8,688,543 B2 | 4/2014 | Dominguez |
| 8,689,001 B1 | 4/2014 | Satish |
| 8,694,420 B1 | 4/2014 | Oliai |
| 8,705,718 B2 | 4/2014 | Baniak et al. |
| 8,706,599 B1 | 4/2014 | Koenig et al. |
| 8,706,616 B1 | 4/2014 | Flynn |
| 8,712,789 B2 | 4/2014 | Stibel et al. |
| 8,712,907 B1 | 4/2014 | Stibel et al. |
| 8,713,651 B1 | 4/2014 | Stibel |
| 8,725,605 B1 | 5/2014 | Plunkett |
| 8,725,613 B1 | 5/2014 | Celka et al. |
| 8,732,004 B1 | 5/2014 | Ramos et al. |
| 8,732,803 B2 | 5/2014 | Stibel et al. |
| 8,738,449 B1 | 5/2014 | Cupps et al. |
| 8,738,516 B1 | 5/2014 | Dean et al. |

(56) References Cited

U.S. PATENT DOCUMENTS

| | | |
|---|---|---|
| 8,745,698 B1 | 6/2014 | Ashfield et al. |
| 8,751,378 B2 | 6/2014 | Dornhelm et al. |
| 8,768,914 B2 | 7/2014 | Scriffignano et al. |
| 8,781,951 B2 | 7/2014 | Lewis et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,819,789 B2 | 8/2014 | Orttung et al. |
| 8,825,544 B2 | 9/2014 | Imrey et al. |
| 8,856,894 B1 | 10/2014 | Dean et al. |
| 8,856,945 B2 | 10/2014 | Carter et al. |
| 8,860,763 B2 | 10/2014 | Privault et al. |
| 8,868,914 B2 | 10/2014 | Teppler |
| 8,882,509 B1 | 11/2014 | Nunamaker |
| 8,930,251 B2 | 1/2015 | DeBie |
| 8,930,263 B1 | 1/2015 | Mahacek et al. |
| 8,938,399 B1 | 1/2015 | Herman |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,002,753 B2 | 4/2015 | Anschutz et al. |
| 9,058,627 B1 | 6/2015 | Wasser et al. |
| 9,092,616 B2 | 7/2015 | Kumar et al. |
| 9,106,691 B1 | 8/2015 | Burger et al. |
| 9,111,281 B2 | 8/2015 | Stibel et al. |
| 9,118,614 B1 | 8/2015 | Rogers et al. |
| 9,147,042 B1 | 9/2015 | Haller et al. |
| 9,218,481 B2 | 10/2015 | Belisario |
| 9,183,377 B1 | 11/2015 | Sobel et al. |
| 9,202,200 B2 | 12/2015 | Stibel et al. |
| 9,225,704 B1 | 12/2015 | Johansson et al. |
| 9,230,283 B1 | 1/2016 | Taylor et al. |
| 9,256,624 B2 | 2/2016 | Skurtovich, Jr. et al. |
| 9,256,904 B1 | 2/2016 | Haller et al. |
| 9,324,080 B2 | 4/2016 | Shafron et al. |
| 9,349,145 B2 | 5/2016 | Rozman et al. |
| 9,400,589 B1 | 7/2016 | Wasser et al. |
| 9,406,085 B1 | 8/2016 | Hunt, III et al. |
| 9,418,213 B1 | 8/2016 | Roth et al. |
| 9,443,268 B1 | 9/2016 | Kapczynski et al. |
| 9,449,346 B1 | 9/2016 | Hockey et al. |
| 9,477,737 B1 | 10/2016 | Charyk et al. |
| 9,479,471 B2 | 10/2016 | Schoenrock |
| 9,483,606 B1 | 11/2016 | Dean et al. |
| 9,501,583 B2 | 11/2016 | Nordstrom et al. |
| 9,536,238 B2 | 1/2017 | Garrett et al. |
| 9,536,263 B1 | 1/2017 | Dean et al. |
| 9,542,553 B1 | 1/2017 | Burger et al. |
| 9,542,682 B1 | 1/2017 | Taylor et al. |
| 9,569,797 B1 | 2/2017 | Rohn et al. |
| 9,589,266 B2 | 3/2017 | Pourgallah et al. |
| 9,595,023 B1 | 3/2017 | Hockey et al. |
| 9,613,382 B1 | 4/2017 | Newstadt et al. |
| 9,619,751 B2 | 4/2017 | Woon et al. |
| 9,654,541 B1 | 5/2017 | Kapczynski et al. |
| 9,665,854 B1 | 5/2017 | Burger et al. |
| 9,697,568 B1 | 7/2017 | Hunt, III |
| 9,704,107 B1 | 7/2017 | Baker, IV et al. |
| 9,710,523 B2 | 7/2017 | Skurtovich, Jr. et al. |
| 9,710,852 B1 | 7/2017 | Olson et al. |
| 9,767,513 B1 | 9/2017 | Taylor et al. |
| 9,824,199 B2 | 11/2017 | Kshirsagar et al. |
| 9,830,646 B1 | 11/2017 | Wasser et al. |
| 9,853,959 B1 | 12/2017 | Kapczynski et al. |
| 9,870,589 B1 | 1/2018 | Arnold et al. |
| 9,892,457 B1 | 2/2018 | Kapczynski |
| 9,916,621 B1 | 3/2018 | Wasser et al. |
| 9,972,048 B1 | 5/2018 | Dean et al. |
| 9,990,674 B1 | 6/2018 | Taylor et al. |
| 10,002,075 B1 | 6/2018 | O'Leary et al. |
| 10,003,591 B2 | 6/2018 | Hockey et al. |
| 10,025,842 B1 | 7/2018 | Charyk et al. |
| 10,043,214 B1 | 8/2018 | Hunt, III |
| 10,061,936 B1 | 8/2018 | Burger et al. |
| 10,075,446 B2 | 9/2018 | McMillan et al. |
| 10,102,570 B1 | 10/2018 | Kapczynski et al. |
| 10,104,059 B2 | 10/2018 | Hockey et al. |
| 10,176,233 B1 | 1/2019 | Dean et al. |
| 10,187,341 B2 | 1/2019 | Schoenrock |
| 10,255,598 B1 | 4/2019 | Dean et al. |
| 10,262,364 B2 | 4/2019 | Taylor et al. |
| 10,269,065 B1 | 4/2019 | Kapczynski et al. |
| 10,277,659 B1 | 4/2019 | Kapczynski et al. |
| D847,840 S | 5/2019 | Poschel et al. |
| D851,126 S | 6/2019 | Tauban |
| D851,127 S | 6/2019 | Tauban |
| D851,128 S | 6/2019 | Tauban |
| 10,319,029 B1 | 6/2019 | Hockey et al. |
| 10,325,314 B1 | 6/2019 | Kapczynski et al. |
| 10,366,450 B1 | 7/2019 | Mahacek et al. |
| 10,482,532 B1 | 11/2019 | Kapczynski |
| 10,523,653 B2 | 12/2019 | Hockey et al. |
| 10,530,761 B2 | 1/2020 | Hockey et al. |
| 10,614,463 B1 | 4/2020 | Hockey et al. |
| 10,614,519 B2 | 4/2020 | Taylor et al. |
| 10,621,657 B2 | 4/2020 | Kasower |
| 10,628,448 B1 | 4/2020 | Charyk et al. |
| 10,642,999 B2 | 5/2020 | Burger et al. |
| 10,671,749 B2 | 6/2020 | Felice-Steele et al. |
| 10,685,398 B1 | 6/2020 | Olson et al. |
| 10,686,773 B2 | 6/2020 | Britti et al. |
| 10,706,453 B1 | 7/2020 | Morin et al. |
| 10,726,491 B1 | 7/2020 | Hockey et al. |
| 10,798,113 B2 | 10/2020 | Muddu et al. |
| 10,798,197 B2 | 10/2020 | Dean et al. |
| 10,839,446 B1 | 11/2020 | Mupkala et al. |
| 10,878,499 B2 | 12/2020 | Taylor et al. |
| 10,880,313 B2 | 12/2020 | Manna et al. |
| 10,891,691 B2 | 1/2021 | Courbage et al. |
| 10,929,925 B1 | 2/2021 | Hunt, III |
| 10,949,428 B2 | 3/2021 | Poirel et al. |
| 10,963,959 B2 | 3/2021 | Wasser et al. |
| 11,012,491 B1 | 5/2021 | Kapczynski et al. |
| 11,025,629 B2 | 6/2021 | Chasman et al. |
| 11,025,638 B2 | 6/2021 | Ford et al. |
| 11,050,767 B2 | 6/2021 | Black et al. |
| 11,087,022 B2 | 8/2021 | Burger et al. |
| 11,113,759 B1 | 9/2021 | Kapczynski et al. |
| 11,132,742 B1 | 9/2021 | Wasser et al. |
| 11,157,872 B2 | 10/2021 | McMillan et al. |
| 11,200,620 B2 | 12/2021 | Dean et al. |
| 11,238,656 B1 | 2/2022 | Lin et al. |
| 11,265,324 B2 | 3/2022 | Felice-Steele et al. |
| 11,308,551 B1 | 4/2022 | Mahacek et al. |
| 11,315,179 B1 | 4/2022 | Rehder et al. |
| 11,356,430 B1 | 6/2022 | Kapczynski et al. |
| 11,373,109 B2 | 6/2022 | Zoldi et al. |
| 11,379,916 B1 | 7/2022 | Taylor et al. |
| 11,399,029 B2 | 7/2022 | Manna et al. |
| 11,425,144 B2 | 8/2022 | Bondugula et al. |
| 11,436,626 B2 | 9/2022 | Lawrence et al. |
| 11,461,364 B1 | 10/2022 | Charyk et al. |
| 11,489,834 B1 | 11/2022 | Carroll et al. |
| 11,514,519 B1 | 11/2022 | Hunt, III |
| 11,580,598 B1 | 2/2023 | Rehder et al. |
| 2001/0014878 A1 | 8/2001 | Mitra et al. |
| 2001/0029470 A1 | 10/2001 | Schultz et al. |
| 2001/0029482 A1 | 10/2001 | Tealdi et al. |
| 2001/0032181 A1 | 10/2001 | Jakstadt et al. |
| 2001/0034631 A1 | 10/2001 | Kiselik |
| 2001/0037204 A1* | 11/2001 | Horn ............... G06Q 30/02 705/309 |
| 2001/0037289 A1 | 11/2001 | Mayr et al. |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0044764 A1 | 11/2001 | Arnold |
| 2001/0047332 A1* | 11/2001 | Gonen-Friedman ... G06Q 30/04 705/40 |
| 2001/0049274 A1 | 12/2001 | Degraeve |
| 2001/0053989 A1 | 12/2001 | Keller et al. |
| 2002/0010616 A1 | 1/2002 | Itzaki |

(56) References Cited

U.S. PATENT DOCUMENTS

| | | |
|---|---|---|
| 2002/0010635 A1 | 1/2002 | Tokiwa |
| 2002/0013827 A1 | 1/2002 | Edstrom et al. |
| 2002/0013899 A1 | 1/2002 | Faul |
| 2002/0023108 A1 | 2/2002 | Daswani et al. |
| 2002/0029192 A1* | 3/2002 | Nakagawa ............ G06Q 20/10 |
| | | 705/36 R |
| 2002/0032635 A1 | 3/2002 | Harris et al. |
| 2002/0033846 A1 | 3/2002 | Balasubramanian et al. |
| 2002/0035480 A1* | 3/2002 | Gordon ................. G06Q 30/02 |
| | | 705/309 |
| 2002/0035520 A1 | 3/2002 | Weiss |
| 2002/0045154 A1 | 4/2002 | Wood et al. |
| 2002/0049624 A1 | 4/2002 | Raveis, Jr. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0062249 A1 | 5/2002 | Iannacci |
| 2002/0069122 A1 | 6/2002 | Yun et al. |
| 2002/0069182 A1* | 6/2002 | Dwyer ................... G06Q 10/10 |
| | | 705/80 |
| 2002/0072927 A1 | 6/2002 | Phelan et al. |
| 2002/0073017 A1 | 6/2002 | Robertson |
| 2002/0077964 A1 | 6/2002 | Brody et al. |
| 2002/0087460 A1 | 7/2002 | Hornung |
| 2002/0091635 A1 | 7/2002 | Dilip et al. |
| 2002/0099635 A1 | 7/2002 | Guiragosian |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0116247 A1 | 8/2002 | Tucker et al. |
| 2002/0116331 A1 | 8/2002 | Cataline et al. |
| 2002/0120537 A1 | 8/2002 | Morea et al. |
| 2002/0120757 A1 | 8/2002 | Sutherland et al. |
| 2002/0120846 A1 | 8/2002 | Stewart et al. |
| 2002/0126449 A1 | 9/2002 | Casebolt |
| 2002/0128917 A1 | 9/2002 | Grounds |
| 2002/0128962 A1 | 9/2002 | Kasower |
| 2002/0130894 A1 | 9/2002 | Young et al. |
| 2002/0133365 A1 | 9/2002 | Grey et al. |
| 2002/0133462 A1 | 9/2002 | Shteyn |
| 2002/0133504 A1 | 9/2002 | Vlahos et al. |
| 2002/0138409 A1 | 9/2002 | Bass |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0149794 A1 | 10/2002 | Yoshioka et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173994 A1 | 11/2002 | Ferguson, III |
| 2002/0174010 A1 | 11/2002 | Rice |
| 2002/0174016 A1 | 11/2002 | Cuervo |
| 2002/0174048 A1 | 11/2002 | Dheer et al. |
| 2002/0174061 A1 | 11/2002 | Srinivasan et al. |
| 2002/0188511 A1 | 12/2002 | Johnson et al. |
| 2002/0194120 A1 | 12/2002 | Russell et al. |
| 2002/0194140 A1 | 12/2002 | Makuck |
| 2002/0198800 A1 | 12/2002 | Shamrakov |
| 2002/0198806 A1 | 12/2002 | Blagg et al. |
| 2002/0198822 A1 | 12/2002 | Munoz et al. |
| 2002/0198824 A1 | 12/2002 | Cook |
| 2002/0198830 A1* | 12/2002 | Randell ................. G06Q 30/04 |
| | | 705/40 |
| 2003/0002671 A1 | 1/2003 | Inchalik et al. |
| 2003/0004853 A1 | 1/2003 | Ram et al. |
| 2003/0004855 A1 | 1/2003 | Dutta et al. |
| 2003/0004922 A1 | 1/2003 | Schmidt et al. |
| 2003/0007283 A1* | 1/2003 | Ostwald ................. G11B 15/68 |
| | | 360/92.1 |
| 2003/0009411 A1 | 1/2003 | Ram et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0023531 A1 | 1/2003 | Fergusson |
| 2003/0028466 A1 | 2/2003 | Jenson et al. |
| 2003/0028477 A1 | 2/2003 | Stevenson et al. |
| 2003/0028529 A1 | 2/2003 | Cheung |
| 2003/0036952 A1 | 2/2003 | Panttaja et al. |
| 2003/0036995 A1 | 2/2003 | Lazerson |
| 2003/0041019 A1 | 2/2003 | Vagim, III et al. |
| 2003/0041031 A1 | 2/2003 | Hedy |
| 2003/0046311 A1 | 3/2003 | Baidya et al. |
| 2003/0048294 A1 | 3/2003 | Arnold |
| 2003/0050929 A1 | 3/2003 | Bookman et al. |
| 2003/0061104 A1 | 3/2003 | Thomson et al. |
| 2003/0061155 A1 | 3/2003 | Chin |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0078897 A1 | 4/2003 | Florance et al. |
| 2003/0078926 A1 | 4/2003 | Uthe et al. |
| 2003/0088472 A1 | 5/2003 | Offutt et al. |
| 2003/0090586 A1 | 5/2003 | Jan et al. |
| 2003/0093289 A1 | 5/2003 | Thornley et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105646 A1 | 6/2003 | Siepser |
| 2003/0105710 A1 | 6/2003 | Barbara et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0154162 A1 | 8/2003 | Danaher et al. |
| 2003/0158960 A1 | 8/2003 | Engberg |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0186200 A1 | 10/2003 | Selix |
| 2003/0187768 A1 | 10/2003 | Ryan et al. |
| 2003/0187837 A1 | 10/2003 | Culliss |
| 2003/0191711 A1 | 10/2003 | Jamison et al. |
| 2003/0191731 A1 | 10/2003 | Stewart et al. |
| 2003/0195805 A1 | 10/2003 | Storey |
| 2003/0195859 A1 | 10/2003 | Lawrence |
| 2003/0200142 A1 | 10/2003 | Hicks et al. |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212745 A1 | 11/2003 | Caughey |
| 2003/0212909 A1 | 11/2003 | Chandrashekhar |
| 2003/0214775 A1 | 11/2003 | Fukuta et al. |
| 2003/0219709 A1 | 11/2003 | Olenick et al. |
| 2003/0220858 A1 | 11/2003 | Lam et al. |
| 2003/0225742 A1 | 12/2003 | Tenner et al. |
| 2003/0229504 A1 | 12/2003 | Hollister |
| 2003/0229580 A1 | 12/2003 | Gass et al. |
| 2003/0233292 A1* | 12/2003 | Richey ................... G06Q 40/12 |
| | | 705/28 |
| 2003/0236701 A1 | 12/2003 | Rowney et al. |
| 2004/0001565 A1 | 1/2004 | Jones et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019549 A1 | 1/2004 | Gulbrandsen |
| 2004/0019799 A1 | 1/2004 | Vering et al. |
| 2004/0024671 A1 | 2/2004 | Freund |
| 2004/0024709 A1 | 2/2004 | Yu et al. |
| 2004/0030574 A1 | 2/2004 | DiCostanzo et al. |
| 2004/0030649 A1 | 2/2004 | Nelson et al. |
| 2004/0039586 A1 | 2/2004 | Garvey et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0045028 A1 | 3/2004 | Harris |

(56) References Cited

U.S. PATENT DOCUMENTS

| | | |
|---|---|---|
| 2004/0046033 A1 | 3/2004 | Kolodziej et al. |
| 2004/0059786 A1 | 3/2004 | Caughey |
| 2004/0062213 A1 | 4/2004 | Koss |
| 2004/0064347 A1 | 4/2004 | VanOrman |
| 2004/0083159 A1 | 4/2004 | Crosby et al. |
| 2004/0083230 A1 | 4/2004 | Caughey |
| 2004/0088237 A1 | 5/2004 | Moenickheim et al. |
| 2004/0088255 A1 | 5/2004 | Zielke et al. |
| 2004/0093278 A1* | 5/2004 | Burchetta .......... G06Q 30/0601 705/80 |
| 2004/0098418 A1 | 5/2004 | Hein |
| 2004/0098546 A1 | 5/2004 | Bashant et al. |
| 2004/0102197 A1 | 5/2004 | Dietz |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0128150 A1 | 7/2004 | Lundegren |
| 2004/0128156 A1 | 7/2004 | Beringer et al. |
| 2004/0128215 A1 | 7/2004 | Florance et al. |
| 2004/0133440 A1 | 7/2004 | Carolan et al. |
| 2004/0133493 A1 | 7/2004 | Ford et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138997 A1 | 7/2004 | DeFrancesco et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0148200 A1 | 7/2004 | Hodges |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0172360 A1 | 9/2004 | Mabrey et al. |
| 2004/0177035 A1 | 9/2004 | Silva |
| 2004/0186807 A1 | 9/2004 | Nathans et al. |
| 2004/0193538 A1 | 9/2004 | Raines |
| 2004/0193891 A1 | 9/2004 | Ollila |
| 2004/0198386 A1 | 10/2004 | Dupray |
| 2004/0199789 A1 | 10/2004 | Shaw et al. |
| 2004/0210661 A1 | 10/2004 | Thompson |
| 2004/0215584 A1 | 10/2004 | Yao |
| 2004/0215673 A1 | 10/2004 | Furukawa et al. |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225609 A1 | 11/2004 | Greene |
| 2004/0225643 A1 | 11/2004 | Alpha et al. |
| 2004/0230499 A1 | 11/2004 | Stack |
| 2004/0230527 A1 | 11/2004 | Hansen et al. |
| 2004/0236688 A1 | 11/2004 | Bozeman |
| 2004/0243450 A1 | 12/2004 | Bernard, Jr. et al. |
| 2004/0243508 A1 | 12/2004 | Samson et al. |
| 2004/0243588 A1 | 12/2004 | Tanner et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0004864 A1 | 1/2005 | Lent et al. |
| 2005/0010494 A1 | 1/2005 | Mourad et al. |
| 2005/0010513 A1 | 1/2005 | Duckworth et al. |
| 2005/0015273 A1 | 1/2005 | Iyer |
| 2005/0021457 A1 | 1/2005 | Johnson et al. |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027817 A1 | 2/2005 | Novik et al. |
| 2005/0027983 A1 | 2/2005 | Klawon |
| 2005/0033660 A1 | 2/2005 | Solomon |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060244 A1 | 3/2005 | Goolkasian et al. |
| 2005/0060332 A1 | 3/2005 | Bernstein et al. |
| 2005/0071328 A1 | 3/2005 | Lawrence |
| 2005/0080716 A1 | 4/2005 | Belyi et al. |
| 2005/0080723 A1* | 4/2005 | Burchetta .............. G06Q 40/08 705/39 |
| 2005/0080796 A1 | 4/2005 | Midgley |
| 2005/0086126 A1 | 4/2005 | Patterson |
| 2005/0086261 A1 | 4/2005 | Mammone |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102209 A1 | 5/2005 | Sagrillo et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144143 A1 | 6/2005 | Freiberg |
| 2005/0144452 A1 | 6/2005 | Lynch et al. |
| 2005/0154664 A1* | 7/2005 | Guy ...................... G06Q 40/02 705/35 |
| 2005/0154665 A1 | 7/2005 | Kerr |
| 2005/0154769 A1 | 7/2005 | Eckart et al. |
| 2005/0160051 A1 | 7/2005 | Johnson |
| 2005/0160280 A1 | 7/2005 | Caslin et al. |
| 2005/0171884 A1 | 8/2005 | Arnott |
| 2005/0198377 A1 | 9/2005 | Ferguson et al. |
| 2005/0203768 A1 | 9/2005 | Florance |
| 2005/0203844 A1 | 9/2005 | Ferguson et al. |
| 2005/0203864 A1 | 9/2005 | Schmidt et al. |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216953 A1 | 9/2005 | Ellingson |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0251474 A1 | 11/2005 | Shinn et al. |
| 2005/0256766 A1 | 11/2005 | Garcia et al. |
| 2005/0267840 A1 | 12/2005 | Holm-Blagg et al. |
| 2005/0273431 A1 | 12/2005 | Abel et al. |
| 2005/0283415 A1 | 12/2005 | Studnitzer et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0031158 A1 | 2/2006 | Orman |
| 2006/0031177 A1* | 2/2006 | Rule ................... G06Q 50/182 705/309 |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041464 A1 | 2/2006 | Powers et al. |
| 2006/0041670 A1 | 2/2006 | Musseleck et al. |
| 2006/0047605 A1 | 3/2006 | Ahmad |
| 2006/0059062 A1 | 3/2006 | Wood et al. |
| 2006/0059083 A1 | 3/2006 | Friesen et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080210 A1 | 4/2006 | Mourad et al. |
| 2006/0080216 A1 | 4/2006 | Hausman et al. |
| 2006/0080230 A1 | 4/2006 | Freiberg |

(56) References Cited

U.S. PATENT DOCUMENTS

| | | |
|---|---|---|
| 2006/0080235 A1 | 4/2006 | Fukuda et al. |
| 2006/0080251 A1 | 4/2006 | Fried et al. |
| 2006/0080263 A1 | 4/2006 | Willis et al. |
| 2006/0080274 A1 | 4/2006 | Mourad |
| 2006/0085334 A1 | 4/2006 | Murphy |
| 2006/0085361 A1 | 4/2006 | Hoerle et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0116931 A1 | 6/2006 | Storey |
| 2006/0116932 A1 | 6/2006 | Storey |
| 2006/0129419 A1 | 6/2006 | Flaxer et al. |
| 2006/0129472 A1 | 6/2006 | Harrington |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136524 A1 | 6/2006 | Wohlers et al. |
| 2006/0136595 A1 | 6/2006 | Satyavolu |
| 2006/0155780 A1 | 7/2006 | Sakairi et al. |
| 2006/0161435 A1 | 7/2006 | Atef et al. |
| 2006/0161478 A1 | 7/2006 | Turner et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0190394 A1 | 8/2006 | Fraser et al. |
| 2006/0195351 A1 | 8/2006 | Bayburtian |
| 2006/0200583 A1 | 9/2006 | Le Lann et al. |
| 2006/0202012 A1 | 9/2006 | Grano et al. |
| 2006/0212407 A1 | 9/2006 | Lyon |
| 2006/0212486 A1 | 9/2006 | Kennis et al. |
| 2006/0213985 A1 | 9/2006 | Walker et al. |
| 2006/0218407 A1 | 9/2006 | Toms |
| 2006/0223043 A1 | 10/2006 | Dancy-Edwards et al. |
| 2006/0224498 A1 | 10/2006 | Chin |
| 2006/0229943 A1 | 10/2006 | Mathias et al. |
| 2006/0229961 A1 | 10/2006 | Lyftogt et al. |
| 2006/0230343 A1 | 10/2006 | Armandpour et al. |
| 2006/0235935 A1 | 10/2006 | Ng |
| 2006/0239512 A1 | 10/2006 | Petrillo |
| 2006/0245731 A1 | 11/2006 | Lai |
| 2006/0248021 A1 | 11/2006 | Jain et al. |
| 2006/0248048 A1 | 11/2006 | Jain et al. |
| 2006/0248525 A1 | 11/2006 | Hopkins |
| 2006/0253358 A1 | 11/2006 | Delgrosso et al. |
| 2006/0253463 A1 | 11/2006 | Wu et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0277102 A1 | 12/2006 | Agliozzo |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0282886 A1 | 12/2006 | Gaug |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0016500 A1 | 1/2007 | Chatterji et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0039049 A1 | 2/2007 | Kupferman et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0050777 A1 | 3/2007 | Hutchinson et al. |
| 2007/0055621 A1 | 3/2007 | Tischler et al. |
| 2007/0057947 A1 | 3/2007 | Yokoyama |
| 2007/0061260 A1 | 3/2007 | deGroeve et al. |
| 2007/0067235 A1 | 3/2007 | Nathans et al. |
| 2007/0067297 A1 | 3/2007 | Kublickis |
| 2007/0072190 A1 | 3/2007 | Aggarwal |
| 2007/0073577 A1 | 3/2007 | Krause |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0078990 A1 | 4/2007 | Hopkins |
| 2007/0080826 A1 | 4/2007 | Chang |
| 2007/0083460 A1 | 4/2007 | Bachenheimer |
| 2007/0083463 A1 | 4/2007 | Kraft |
| 2007/0088821 A1 | 4/2007 | Sankuratripati et al. |
| 2007/0093234 A1 | 4/2007 | Willis et al. |
| 2007/0094230 A1 | 4/2007 | Subramaniam et al. |
| 2007/0094241 A1 | 4/2007 | M. Blackwell et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0130347 A1 | 6/2007 | Rangan et al. |
| 2007/0131755 A1 | 6/2007 | Chang |
| 2007/0136109 A1 | 6/2007 | Yager et al. |
| 2007/0143123 A1 | 6/2007 | Goldberg et al. |
| 2007/0149184 A1 | 6/2007 | Viegers et al. |
| 2007/0152068 A1 | 7/2007 | Kurita |
| 2007/0153085 A1 | 7/2007 | Chang |
| 2007/0153710 A1 | 7/2007 | Hopkins |
| 2007/0156554 A1 | 7/2007 | Nikoley et al. |
| 2007/0156581 A1 | 7/2007 | Imrey et al. |
| 2007/0156692 A1 | 7/2007 | Rosewarne |
| 2007/0157107 A1 | 7/2007 | Bishop |
| 2007/0160458 A1 | 7/2007 | Yen |
| 2007/0162369 A1 | 7/2007 | Hardison |
| 2007/0162458 A1 | 7/2007 | Fasciano |
| 2007/0174166 A1 | 7/2007 | Jones |
| 2007/0174186 A1 | 7/2007 | Hokland |
| 2007/0174448 A1 | 7/2007 | Ahuja et al. |
| 2007/0174903 A1 | 7/2007 | Greff |
| 2007/0180380 A1 | 8/2007 | Khavari et al. |
| 2007/0192167 A1 | 8/2007 | Lei et al. |
| 2007/0198432 A1 | 8/2007 | Pitroda et al. |
| 2007/0203954 A1 | 8/2007 | Vargas et al. |
| 2007/0204033 A1 | 8/2007 | Bookbinder et al. |
| 2007/0204212 A1 | 8/2007 | Chamberlain et al. |
| 2007/0204338 A1 | 8/2007 | Aiello et al. |
| 2007/0205266 A1 | 9/2007 | Carr et al. |
| 2007/0206917 A1 | 9/2007 | Ono et al. |
| 2007/0208640 A1 | 9/2007 | Banasiak et al. |
| 2007/0219966 A1 | 9/2007 | Baylis et al. |
| 2007/0220003 A1 | 9/2007 | Chern et al. |
| 2007/0220092 A1 | 9/2007 | Heitzeberg et al. |
| 2007/0220275 A1 | 9/2007 | Heitzeberg et al. |
| 2007/0220581 A1 | 9/2007 | Chang |
| 2007/0226047 A1 | 9/2007 | Ward |
| 2007/0226122 A1 | 9/2007 | Burrell et al. |
| 2007/0233591 A1 | 10/2007 | Newton |
| 2007/0236562 A1 | 10/2007 | Chang |
| 2007/0239493 A1 | 10/2007 | Sweetland et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0262140 A1 | 11/2007 | Long, Sr. |
| 2007/0266439 A1 | 11/2007 | Kraft |
| 2007/0273558 A1 | 11/2007 | Smith |
| 2007/0276780 A1 | 11/2007 | Iriyama et al. |
| 2007/0282743 A1 | 12/2007 | Lovelett |
| 2007/0287415 A1 | 12/2007 | Yamada |
| 2007/0288355 A1 | 12/2007 | Roland et al. |

(56) References Cited

U.S. PATENT DOCUMENTS

| | | |
|---|---|---|
| 2007/0288360 A1 | 12/2007 | Seeklus |
| 2007/0294195 A1 | 12/2007 | Curry et al. |
| 2007/0299770 A1 | 12/2007 | Delinsky |
| 2007/0299772 A1 | 12/2007 | Mastie et al. |
| 2008/0004957 A1 | 1/2008 | Hildreth et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0015919 A1 | 1/2008 | Busse et al. |
| 2008/0015979 A1 | 1/2008 | Bentley |
| 2008/0021802 A1 | 1/2008 | Pendleton |
| 2008/0021816 A1 | 1/2008 | Lent et al. |
| 2008/0027859 A1 | 1/2008 | Nathans et al. |
| 2008/0028435 A1 | 1/2008 | Strickland et al. |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0040475 A1 | 2/2008 | Bosworth et al. |
| 2008/0040610 A1 | 2/2008 | Fergusson |
| 2008/0047017 A1 | 2/2008 | Renaud |
| 2008/0052170 A1 | 2/2008 | Storey |
| 2008/0052182 A1 | 2/2008 | Marshall |
| 2008/0052244 A1 | 2/2008 | Tsuei et al. |
| 2008/0059352 A1 | 3/2008 | Chandran |
| 2008/0059364 A1 | 3/2008 | Tidwell et al. |
| 2008/0059447 A1 | 3/2008 | Winner et al. |
| 2008/0060054 A1 | 3/2008 | Srivastava |
| 2008/0065569 A1 | 3/2008 | Dutt et al. |
| 2008/0065774 A1 | 3/2008 | Keeler |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0079809 A1 | 4/2008 | Chang |
| 2008/0082536 A1 | 4/2008 | Schwabe et al. |
| 2008/0083021 A1 | 4/2008 | Doane et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0091530 A1 | 4/2008 | Egnatios et al. |
| 2008/0097822 A1 | 4/2008 | Schigel et al. |
| 2008/0103798 A1 | 5/2008 | Domenikos et al. |
| 2008/0103799 A1 | 5/2008 | Domenikos et al. |
| 2008/0103800 A1 | 5/2008 | Domenikos et al. |
| 2008/0103972 A1 | 5/2008 | Lanc |
| 2008/0109308 A1 | 5/2008 | Storey |
| 2008/0109422 A1 | 5/2008 | Dedhia |
| 2008/0109740 A1 | 5/2008 | Prinsen et al. |
| 2008/0110973 A1 | 5/2008 | Nathans et al. |
| 2008/0114670 A1 | 5/2008 | Friesen |
| 2008/0114855 A1 | 5/2008 | Welingkar et al. |
| 2008/0115226 A1 | 5/2008 | Welingkar et al. |
| 2008/0120155 A1 | 5/2008 | Pliha |
| 2008/0120204 A1 | 5/2008 | Conner et al. |
| 2008/0120416 A1 | 5/2008 | Hopkins et al. |
| 2008/0120569 A1 | 5/2008 | Mann et al. |
| 2008/0120716 A1 | 5/2008 | Hall et al. |
| 2008/0122920 A1 | 5/2008 | Chang |
| 2008/0126233 A1 | 5/2008 | Hogan |
| 2008/0133273 A1 | 6/2008 | Marshall |
| 2008/0133278 A1 | 6/2008 | Stanfield |
| 2008/0133657 A1 | 6/2008 | Pennington |
| 2008/0140476 A1 | 6/2008 | Anand et al. |
| 2008/0140576 A1 | 6/2008 | Lewis et al. |
| 2008/0140734 A1 | 6/2008 | Wagner |
| 2008/0140780 A1 | 6/2008 | Hopkins et al. |
| 2008/0141346 A1 | 6/2008 | Kay et al. |
| 2008/0147523 A1 | 6/2008 | Mulry et al. |
| 2008/0148368 A1 | 6/2008 | Zurko et al. |
| 2008/0148392 A1 | 6/2008 | Akens |
| 2008/0154758 A1 | 6/2008 | Schattmaier et al. |
| 2008/0154766 A1 | 6/2008 | Lewis et al. |
| 2008/0162236 A1 | 7/2008 | Sommerer |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0172304 A1 | 7/2008 | Berkowitz |
| 2008/0175360 A1 | 7/2008 | Schwarz et al. |
| 2008/0177655 A1 | 7/2008 | Zalik |
| 2008/0183480 A1 | 7/2008 | Carlson et al. |
| 2008/0183585 A1 | 7/2008 | Vianello |
| 2008/0184351 A1 | 7/2008 | Gephart |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0208548 A1 | 8/2008 | Metzger et al. |
| 2008/0208726 A1 | 8/2008 | Tsantes et al. |
| 2008/0208735 A1 | 8/2008 | Balet et al. |
| 2008/0212845 A1 | 9/2008 | Lund |
| 2008/0215640 A1 | 9/2008 | Hartz et al. |
| 2008/0216156 A1 | 9/2008 | Kosaka |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228775 A1 | 9/2008 | Abhyanker et al. |
| 2008/0229415 A1 | 9/2008 | Kapoor et al. |
| 2008/0249869 A1 | 10/2008 | Angell et al. |
| 2008/0249925 A1 | 10/2008 | Nazari et al. |
| 2008/0255992 A1 | 10/2008 | Lin |
| 2008/0263013 A1 | 10/2008 | Hopkins |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270292 A1 | 10/2008 | Ghosh et al. |
| 2008/0270294 A1 | 10/2008 | Lent et al. |
| 2008/0270295 A1 | 10/2008 | Lent et al. |
| 2008/0275816 A1 | 11/2008 | Hazlehurst |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0284586 A1 | 11/2008 | Chang |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0297602 A1 | 12/2008 | Chang |
| 2008/0301016 A1 | 12/2008 | Durvasula et al. |
| 2008/0306846 A1 | 12/2008 | Ferguson |
| 2008/0307063 A1 | 12/2008 | Caughey |
| 2008/0316010 A1 | 12/2008 | Chang |
| 2008/0319861 A1 | 12/2008 | Hopkins |
| 2008/0319889 A1 | 12/2008 | Hammad |
| 2008/0319896 A1 | 12/2008 | Carlson et al. |
| 2009/0006230 A1 | 1/2009 | Lyda et al. |
| 2009/0006582 A1 | 1/2009 | Daswani et al. |
| 2009/0018986 A1 | 1/2009 | Alcorn et al. |
| 2009/0024462 A1 | 1/2009 | Lin |
| 2009/0024484 A1 | 1/2009 | Walker et al. |
| 2009/0024485 A1 | 1/2009 | Haugen et al. |
| 2009/0030776 A1 | 1/2009 | Walker et al. |
| 2009/0037279 A1 | 2/2009 | Chockalingam et al. |
| 2009/0037323 A1 | 2/2009 | Feinstein et al. |
| 2009/0037332 A1 | 2/2009 | Cheung et al. |
| 2009/0043691 A1 | 2/2009 | Kasower |
| 2009/0048957 A1 | 2/2009 | Celano |
| 2009/0048999 A1 | 2/2009 | Gupta et al. |
| 2009/0055287 A1 | 2/2009 | Chin |
| 2009/0055312 A1 | 2/2009 | Chin |
| 2009/0055322 A1 | 2/2009 | Bykov et al. |
| 2009/0055404 A1 | 2/2009 | Heiden et al. |
| 2009/0064297 A1 | 3/2009 | Selgas et al. |
| 2009/0070148 A1 | 3/2009 | Skocic |
| 2009/0076950 A1 | 3/2009 | Chang et al. |
| 2009/0076966 A1 | 3/2009 | Bishop et al. |
| 2009/0089190 A1 | 4/2009 | Girulat |
| 2009/0089193 A1 | 4/2009 | Palantin |
| 2009/0089869 A1 | 4/2009 | Varghese |
| 2009/0094237 A1 | 4/2009 | Churi et al. |
| 2009/0094675 A1 | 4/2009 | Powers |
| 2009/0099941 A1 | 4/2009 | Berkowitz |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |

(56) References Cited

U.S. PATENT DOCUMENTS

| | | |
|---|---|---|
| 2009/0119116 A1 | 5/2009 | Steen |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0132347 A1 | 5/2009 | Anderson et al. |
| 2009/0132813 A1 | 5/2009 | Schibuk |
| 2009/0146879 A1 | 6/2009 | Chang |
| 2009/0147774 A1 | 6/2009 | Caughey |
| 2009/0157564 A1 | 6/2009 | Cross |
| 2009/0157693 A1 | 6/2009 | Palahnuk |
| 2009/0158030 A1 | 6/2009 | Rasti |
| 2009/0164380 A1 | 6/2009 | Brown |
| 2009/0164582 A1 | 6/2009 | Dasgupta et al. |
| 2009/0164929 A1 | 6/2009 | Chen et al. |
| 2009/0171723 A1 | 7/2009 | Jenkins |
| 2009/0172788 A1 | 7/2009 | Veldula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0195377 A1 | 8/2009 | Chang |
| 2009/0198557 A1 | 8/2009 | Wang et al. |
| 2009/0198602 A1 | 8/2009 | Wang et al. |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0222364 A1 | 9/2009 | McGlynn et al. |
| 2009/0222449 A1 | 9/2009 | Hom et al. |
| 2009/0222527 A1 | 9/2009 | Arconati et al. |
| 2009/0228295 A1 | 9/2009 | Lowy |
| 2009/0228392 A1 | 9/2009 | Pinson, III |
| 2009/0228918 A1 | 9/2009 | Rolff et al. |
| 2009/0228990 A1 | 9/2009 | Chen et al. |
| 2009/0233579 A1 | 9/2009 | Castell et al. |
| 2009/0234665 A1 | 9/2009 | Conkel |
| 2009/0234775 A1 | 9/2009 | Whitney et al. |
| 2009/0234814 A1 | 9/2009 | Boerries et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0258334 A1 | 10/2009 | Pyne |
| 2009/0260064 A1 | 10/2009 | Mcdowell et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0281816 A1 | 11/2009 | Houga et al. |
| 2009/0281941 A1 | 11/2009 | Worth |
| 2009/0281951 A1 | 11/2009 | Shakkarwar |
| 2009/0282479 A1 | 11/2009 | Smith et al. |
| 2009/0289110 A1 | 11/2009 | Regen et al. |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0307778 A1 | 12/2009 | Mardikar |
| 2009/0313562 A1 | 12/2009 | Appleyard et al. |
| 2009/0319648 A1 | 12/2009 | Dutta et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2009/0327487 A1 | 12/2009 | Olson et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0010993 A1 | 1/2010 | Hussey, Jr. et al. |
| 2010/0011428 A1 | 1/2010 | Atwood et al. |
| 2010/0023434 A1 | 1/2010 | Bond |
| 2010/0023440 A1 | 1/2010 | Fraser et al. |
| 2010/0023448 A1 | 1/2010 | Eze |
| 2010/0023506 A1 | 1/2010 | Sahni et al. |
| 2010/0025820 A1 | 2/2010 | Suekawa |
| 2010/0030578 A1 | 2/2010 | Siddique et al. |
| 2010/0030649 A1 | 2/2010 | Ubelhor |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0042537 A1 | 2/2010 | Smith et al. |
| 2010/0042542 A1 | 2/2010 | Rose et al. |
| 2010/0042732 A1 | 2/2010 | Hopkins |
| 2010/0043055 A1 | 2/2010 | Baumgart |
| 2010/0049803 A1 | 2/2010 | Ogilvie et al. |
| 2010/0063906 A1 | 3/2010 | Nelsen et al. |
| 2010/0063942 A1 | 3/2010 | Arnott et al. |
| 2010/0063993 A1 | 3/2010 | Higgins et al. |
| 2010/0076833 A1 | 3/2010 | Nelsen |
| 2010/0076966 A1 | 3/2010 | Strutton et al. |
| 2010/0077483 A1 | 3/2010 | Stolfo et al. |
| 2010/0082445 A1 | 4/2010 | Hodge et al. |
| 2010/0082476 A1 | 4/2010 | Bowman |
| 2010/0083371 A1 | 4/2010 | Bennetts et al. |
| 2010/0088188 A1 | 4/2010 | Kumar et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114776 A1 | 5/2010 | Weller et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0145836 A1 | 6/2010 | Baker et al. |
| 2010/0145840 A1 | 6/2010 | Kasower |
| 2010/0153278 A1 | 6/2010 | Farsedakis |
| 2010/0153290 A1 | 6/2010 | Duggan |
| 2010/0161486 A1 | 6/2010 | Liu et al. |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0198636 A1 | 8/2010 | Choudhary et al. |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0214090 A1 | 8/2010 | Sartini et al. |
| 2010/0215270 A1 | 8/2010 | Manohar et al. |
| 2010/0217837 A1 | 8/2010 | Ansari et al. |
| 2010/0223160 A1 | 9/2010 | Brown |
| 2010/0223184 A1 | 9/2010 | Perlman |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0248681 A1 | 9/2010 | Phills |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250416 A1 | 9/2010 | Hazlehurst |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257234 A1 | 10/2010 | Caughey |
| 2010/0257577 A1 | 10/2010 | Grandison et al. |
| 2010/0258623 A1 | 10/2010 | Beemer et al. |
| 2010/0258625 A1 | 10/2010 | Stanfield et al. |
| 2010/0259373 A1 | 10/2010 | Chang |
| 2010/0262339 A1 | 10/2010 | Chang |

(56) References Cited

U.S. PATENT DOCUMENTS

| | | |
|---|---|---|
| 2010/0262535 A1 | 10/2010 | Lent et al. |
| 2010/0262606 A1 | 10/2010 | Bedolla et al. |
| 2010/0262932 A1 | 10/2010 | Pan |
| 2010/0268557 A1 | 10/2010 | Faith et al. |
| 2010/0268768 A1 | 10/2010 | Kurtenbach et al. |
| 2010/0274815 A1 | 10/2010 | Vanasco |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0306834 A1 | 12/2010 | Grandison et al. |
| 2010/0312691 A1 | 12/2010 | Johnson, Jr. |
| 2010/0323446 A1 | 12/2010 | Barnett et al. |
| 2010/0324999 A1 | 12/2010 | Conway et al. |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0023115 A1 | 1/2011 | Wright |
| 2011/0029388 A1 | 2/2011 | Kendall et al. |
| 2011/0029566 A1 | 2/2011 | Grandison et al. |
| 2011/0029660 A1 | 2/2011 | Hopkins |
| 2011/0035305 A1 | 2/2011 | Imrey et al. |
| 2011/0035315 A1 | 2/2011 | Langley |
| 2011/0035452 A1 | 2/2011 | Gittleman |
| 2011/0035788 A1 | 2/2011 | White et al. |
| 2011/0040629 A1 | 2/2011 | Chiu et al. |
| 2011/0047086 A1 | 2/2011 | Heisterkamp et al. |
| 2011/0047606 A1 | 2/2011 | Blomquist |
| 2011/0066495 A1 | 3/2011 | Ayloo et al. |
| 2011/0066618 A1 | 3/2011 | Sigurbjornsson et al. |
| 2011/0066695 A1 | 3/2011 | Hopkins |
| 2011/0071950 A1 | 3/2011 | Ivanovic |
| 2011/0078073 A1 | 3/2011 | Annappindi et al. |
| 2011/0083181 A1 | 4/2011 | Nazarov |
| 2011/0107265 A1 | 5/2011 | Buchanan et al. |
| 2011/0107400 A1 | 5/2011 | Shankaranarayanan et al. |
| 2011/0112899 A1 | 5/2011 | Strutton et al. |
| 2011/0113084 A1 | 5/2011 | Ramnani |
| 2011/0113086 A1 | 5/2011 | Long et al. |
| 2011/0113096 A1 | 5/2011 | Long et al. |
| 2011/0119169 A1 | 5/2011 | Passero et al. |
| 2011/0119765 A1 | 5/2011 | Hering et al. |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137765 A1* | 6/2011 | Nonaka .................. G07F 9/001 705/30 |
| 2011/0142213 A1 | 6/2011 | Baniak et al. |
| 2011/0143711 A1 | 6/2011 | Hirson et al. |
| 2011/0145064 A1 | 6/2011 | Anderson et al. |
| 2011/0145899 A1 | 6/2011 | Cao et al. |
| 2011/0148625 A1 | 6/2011 | Velusamy |
| 2011/0161155 A1 | 6/2011 | Wilhem et al. |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0178899 A1 | 7/2011 | Huszar |
| 2011/0179139 A1 | 7/2011 | Starkenburg et al. |
| 2011/0184780 A1 | 7/2011 | Alderson et al. |
| 2011/0193704 A1 | 8/2011 | Harper et al. |
| 2011/0196791 A1 | 8/2011 | Dominguez |
| 2011/0211445 A1 | 9/2011 | Chen |
| 2011/0213670 A1 | 9/2011 | Strutton et al. |
| 2011/0214187 A1 | 9/2011 | Wittenstein et al. |
| 2011/0243406 A1 | 10/2011 | Chandler |
| 2011/0252071 A1 | 10/2011 | Cidon |
| 2011/0264531 A1 | 10/2011 | Bhatia et al. |
| 2011/0264566 A1 | 10/2011 | Brown |
| 2011/0264581 A1 | 10/2011 | Clyne |
| 2011/0270618 A1 | 11/2011 | Banerjee et al. |
| 2011/0270754 A1 | 11/2011 | Kelly et al. |
| 2011/0271329 A1 | 11/2011 | Hulten et al. |
| 2011/0276382 A1 | 11/2011 | Ramchandani et al. |
| 2011/0276396 A1 | 11/2011 | Rathod |
| 2011/0276604 A1 | 11/2011 | Hom et al. |
| 2011/0282711 A1 | 11/2011 | Freishtat et al. |
| 2011/0282783 A1 | 11/2011 | Ferguson et al. |
| 2011/0282943 A1 | 11/2011 | Anderson et al. |
| 2011/0289151 A1 | 11/2011 | Hopkins |
| 2011/0289209 A1 | 11/2011 | Hopkins |
| 2011/0296003 A1 | 12/2011 | McCann et al. |
| 2011/0302083 A1 | 12/2011 | Bhinder |
| 2011/0302653 A1 | 12/2011 | Frantz et al. |
| 2011/0307397 A1 | 12/2011 | Benmbarek |
| 2011/0307434 A1 | 12/2011 | Rostampour et al. |
| 2011/0307474 A1 | 12/2011 | Hom et al. |
| 2011/0307494 A1 | 12/2011 | Snow |
| 2011/0307938 A1 | 12/2011 | Reeves, Jr. et al. |
| 2011/0307957 A1 | 12/2011 | Barcelo et al. |
| 2011/0313915 A1 | 12/2011 | Tang |
| 2011/0314100 A1 | 12/2011 | Hopkins |
| 2011/0314383 A1 | 12/2011 | Abdo et al. |
| 2011/0320582 A1 | 12/2011 | Lewis |
| 2011/0321137 A1 | 12/2011 | Iida et al. |
| 2012/0005070 A1 | 1/2012 | McFall et al. |
| 2012/0005221 A1 | 1/2012 | Ickman et al. |
| 2012/0005542 A1 | 1/2012 | Petersen et al. |
| 2012/0010927 A1 | 1/2012 | Attenberg et al. |
| 2012/0011063 A1 | 1/2012 | Killian et al. |
| 2012/0011158 A1 | 1/2012 | Avner et al. |
| 2012/0011432 A1 | 1/2012 | Strutton |
| 2012/0015717 A1 | 1/2012 | Mosites et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0036053 A1 | 2/2012 | Miller |
| 2012/0036065 A1 | 2/2012 | Orttung et al. |
| 2012/0036127 A1 | 2/2012 | Work et al. |
| 2012/0036565 A1 | 2/2012 | Gamez et al. |
| 2012/0042237 A1 | 2/2012 | Armandpour et al. |
| 2012/0047174 A1 | 2/2012 | Avner et al. |
| 2012/0047219 A1 | 2/2012 | Feng et al. |
| 2012/0054088 A1 | 3/2012 | Edrington et al. |
| 2012/0054592 A1 | 3/2012 | Jaffe et al. |
| 2012/0060105 A1 | 3/2012 | Brown et al. |
| 2012/0066044 A1 | 3/2012 | Honnef et al. |
| 2012/0066106 A1 | 3/2012 | Papadimitriou |
| 2012/0072382 A1 | 3/2012 | Pearson et al. |
| 2012/0078766 A1 | 3/2012 | Rose et al. |
| 2012/0078932 A1 | 3/2012 | Skurtovich, Jr. et al. |
| 2012/0079598 A1 | 3/2012 | Brock et al. |
| 2012/0084866 A1 | 4/2012 | Stolfo |
| 2012/0089438 A1 | 4/2012 | Tavares et al. |
| 2012/0101938 A1 | 4/2012 | Kasower |
| 2012/0101939 A1 | 4/2012 | Kasower |
| 2012/0109752 A1 | 5/2012 | Strutton et al. |
| 2012/0110467 A1 | 5/2012 | Blake et al. |
| 2012/0110677 A1 | 5/2012 | Abendroth et al. |
| 2012/0116913 A1 | 5/2012 | Goolkasian |
| 2012/0116969 A1 | 5/2012 | Kumar et al. |
| 2012/0124033 A1 | 5/2012 | Gabriel et al. |
| 2012/0124498 A1 | 5/2012 | Santoro et al. |
| 2012/0131009 A1 | 5/2012 | Nath et al. |
| 2012/0131656 A1 | 5/2012 | Slaton et al. |
| 2012/0135705 A1 | 5/2012 | Thaker |
| 2012/0136763 A1 | 5/2012 | Megdal et al. |
| 2012/0136768 A1 | 5/2012 | DeBie |
| 2012/0136774 A1 | 5/2012 | Imrey et al. |
| 2012/0144461 A1 | 6/2012 | Rathbun |
| 2012/0151045 A1 | 6/2012 | Anakata et al. |
| 2012/0151046 A1 | 6/2012 | Weiss et al. |
| 2012/0158562 A1 | 6/2012 | Kassir |
| 2012/0158654 A1 | 6/2012 | Behren et al. |
| 2012/0173339 A1 | 7/2012 | Flynt et al. |
| 2012/0173417 A1 | 7/2012 | Lohman et al. |
| 2012/0185515 A1 | 7/2012 | Ferrel et al. |
| 2012/0191596 A1 | 7/2012 | Kremen et al. |
| 2012/0191693 A1 | 7/2012 | Alexander |
| 2012/0195412 A1 | 8/2012 | Smith |
| 2012/0198556 A1 | 8/2012 | Patel et al. |
| 2012/0203733 A1 | 8/2012 | Zhang |
| 2012/0215682 A1 | 8/2012 | Lent et al. |
| 2012/0215719 A1 | 8/2012 | Verlander |

(56) References Cited

U.S. PATENT DOCUMENTS

| | | |
|---|---|---|
| 2012/0216125 A1 | 8/2012 | Pierce |
| 2012/0221467 A1 | 8/2012 | Hamzeh |
| 2012/0235897 A1 | 9/2012 | Hirota |
| 2012/0239417 A1 | 9/2012 | Pourfallah et al. |
| 2012/0239497 A1 | 9/2012 | Nuzzi |
| 2012/0239583 A1 | 9/2012 | Dobrowolski |
| 2012/0240223 A1 | 9/2012 | Tu |
| 2012/0242473 A1 | 9/2012 | Choi |
| 2012/0246060 A1 | 9/2012 | Conyack, Jr. et al. |
| 2012/0246092 A1 | 9/2012 | Stibel et al. |
| 2012/0246093 A1 | 9/2012 | Stibel et al. |
| 2012/0253852 A1 | 10/2012 | Pourfallah et al. |
| 2012/0262386 A1 | 10/2012 | Kwon et al. |
| 2012/0262472 A1 | 10/2012 | Garr et al. |
| 2012/0271660 A1 | 10/2012 | Harris et al. |
| 2012/0271712 A1 | 10/2012 | Katzin et al. |
| 2012/0278217 A1 | 11/2012 | Sui et al. |
| 2012/0278226 A1 | 11/2012 | Kolo |
| 2012/0278767 A1 | 11/2012 | Stibel et al. |
| 2012/0284280 A1 | 11/2012 | Kumar |
| 2012/0290486 A1 | 11/2012 | Dobrowolski et al. |
| 2012/0290660 A1 | 11/2012 | Rao et al. |
| 2012/0290740 A1 | 11/2012 | Tewari et al. |
| 2012/0296804 A1 | 11/2012 | Stibel et al. |
| 2012/0297484 A1 | 11/2012 | Srivastava |
| 2012/0317013 A1 | 12/2012 | Luk et al. |
| 2012/0317014 A1 | 12/2012 | Cerise et al. |
| 2012/0321202 A1 | 12/2012 | Fertik et al. |
| 2012/0323695 A1 | 12/2012 | Stibel |
| 2012/0324388 A1 | 12/2012 | Rao et al. |
| 2012/0330689 A1 | 12/2012 | McLaughlin et al. |
| 2013/0006843 A1 | 1/2013 | Tralvex |
| 2013/0006844 A1 | 1/2013 | Kremen |
| 2013/0007012 A1 | 1/2013 | Selkowe Fertik et al. |
| 2013/0007014 A1 | 1/2013 | Fertik et al. |
| 2013/0007891 A1 | 1/2013 | Mogaki |
| 2013/0013513 A1 | 1/2013 | Ledbetter et al. |
| 2013/0013553 A1 | 1/2013 | Stibel et al. |
| 2013/0018798 A1 | 1/2013 | Scipioni |
| 2013/0018811 A1 | 1/2013 | Britti et al. |
| 2013/0018838 A1 | 1/2013 | Parnaby et al. |
| 2013/0018877 A1 | 1/2013 | Gabriel et al. |
| 2013/0018892 A1 | 1/2013 | Castellanos et al. |
| 2013/0018957 A1 | 1/2013 | Parnaby et al. |
| 2013/0024367 A1 | 1/2013 | Bellefeuille et al. |
| 2013/0024520 A1 | 1/2013 | Siminoff |
| 2013/0024813 A1 | 1/2013 | Schnorr et al. |
| 2013/0030826 A1 | 1/2013 | Blom |
| 2013/0031105 A1 | 1/2013 | Stibel et al. |
| 2013/0031109 A1 | 1/2013 | Roulson et al. |
| 2013/0031624 A1 | 1/2013 | Britti et al. |
| 2013/0036466 A1 | 2/2013 | Penta et al. |
| 2013/0040619 A1 | 2/2013 | Grube et al. |
| 2013/0041798 A1 | 2/2013 | Unger |
| 2013/0041810 A1 | 2/2013 | Murrell et al. |
| 2013/0041949 A1 | 2/2013 | Biesecker et al. |
| 2013/0054357 A1 | 2/2013 | Mager et al. |
| 2013/0061335 A1 | 3/2013 | Schwabe |
| 2013/0066716 A1 | 3/2013 | Chen et al. |
| 2013/0066775 A1 | 3/2013 | Milam |
| 2013/0066884 A1 | 3/2013 | Kast et al. |
| 2013/0066922 A1 | 3/2013 | Jang et al. |
| 2013/0067582 A1 | 3/2013 | Donovan et al. |
| 2013/0073366 A1 | 3/2013 | Heath |
| 2013/0080322 A1 | 3/2013 | Adolphe |
| 2013/0080467 A1 | 3/2013 | Carson et al. |
| 2013/0085804 A1 | 4/2013 | Leff et al. |
| 2013/0085894 A1 | 4/2013 | Chan et al. |
| 2013/0085939 A1 | 4/2013 | Colak et al. |
| 2013/0085953 A1 | 4/2013 | Bhola et al. |
| 2013/0086075 A1 | 4/2013 | Scott et al. |
| 2013/0090982 A1 | 4/2013 | Ross |
| 2013/0103464 A1 | 4/2013 | Kuznetsov |
| 2013/0103571 A1 | 4/2013 | Chung et al. |
| 2013/0104216 A1 | 4/2013 | Dennis et al. |
| 2013/0110557 A1 | 5/2013 | Kasower |
| 2013/0110565 A1 | 5/2013 | Means et al. |
| 2013/0110585 A1 | 5/2013 | Nesbitt et al. |
| 2013/0111436 A1 | 5/2013 | Phan et al. |
| 2013/0117072 A1 | 5/2013 | Nish |
| 2013/0117087 A1 | 5/2013 | Coppinger |
| 2013/0124855 A1 | 5/2013 | Varadarajan et al. |
| 2013/0125010 A1 | 5/2013 | Strandell |
| 2013/0132151 A1 | 5/2013 | Stibel et al. |
| 2013/0159411 A1 | 6/2013 | Bowen |
| 2013/0173447 A1 | 7/2013 | Rothschild |
| 2013/0173449 A1 | 7/2013 | Ng et al. |
| 2013/0173451 A1 | 7/2013 | Kornegay et al. |
| 2013/0179338 A1 | 7/2013 | Evans |
| 2013/0185210 A1 | 7/2013 | Dodson et al. |
| 2013/0185293 A1 | 7/2013 | Boback |
| 2013/0187923 A1 | 7/2013 | Yoshimoto et al. |
| 2013/0204762 A1 | 8/2013 | Harris et al. |
| 2013/0205135 A1 | 8/2013 | Lutz |
| 2013/0211986 A1 | 8/2013 | Debie et al. |
| 2013/0212187 A1 | 8/2013 | Mortazavi et al. |
| 2013/0238387 A1 | 9/2013 | Stibel et al. |
| 2013/0262226 A1 | 10/2013 | LaChapelle et al. |
| 2013/0267171 A1 | 10/2013 | Sarkar et al. |
| 2013/0278515 A1 | 10/2013 | Kikuchi |
| 2013/0279676 A1 | 10/2013 | Baniak et al. |
| 2013/0282819 A1 | 10/2013 | Mehta et al. |
| 2013/0290164 A1 | 10/2013 | Salm |
| 2013/0293363 A1 | 11/2013 | Plymouth |
| 2013/0297499 A1 | 11/2013 | Mukherjee |
| 2013/0298238 A1 | 11/2013 | Shah et al. |
| 2013/0332341 A1 | 12/2013 | Papadimitriou |
| 2013/0332342 A1 | 12/2013 | Kasower |
| 2013/0332352 A1 | 12/2013 | Imrey et al. |
| 2013/0339141 A1 | 12/2013 | Stibel et al. |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012737 A1 | 1/2014 | Evans |
| 2014/0019348 A1 | 1/2014 | Daley |
| 2014/0025562 A1 | 1/2014 | Rothrock et al. |
| 2014/0032300 A1 | 1/2014 | Zhang et al. |
| 2014/0032723 A1 | 1/2014 | Nema |
| 2014/0046872 A1 | 2/2014 | Arnott et al. |
| 2014/0052732 A1 | 2/2014 | Softky |
| 2014/0061302 A1 | 3/2014 | Hammad |
| 2014/0074689 A1 | 3/2014 | Lund et al. |
| 2014/0089166 A1 | 3/2014 | Padawer |
| 2014/0089167 A1 | 3/2014 | Kasower |
| 2014/0089191 A1 | 3/2014 | Brown |
| 2014/0095640 A1 | 4/2014 | Stibel et al. |
| 2014/0096249 A1 | 4/2014 | Dupont et al. |
| 2014/0098142 A1 | 4/2014 | Lee et al. |
| 2014/0098229 A1 | 4/2014 | Lu et al. |
| 2014/0110477 A1 | 4/2014 | Hammad |
| 2014/0114735 A1 | 4/2014 | Isaacson et al. |
| 2014/0122354 A1 | 5/2014 | Stibel et al. |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |
| 2014/0164398 A1 | 6/2014 | Smith et al. |
| 2014/0164519 A1 | 6/2014 | Shah |
| 2014/0172681 A1 | 6/2014 | Lamp et al. |
| 2014/0173732 A1 | 6/2014 | Stibel |
| 2014/0180919 A1 | 6/2014 | Brown |
| 2014/0181285 A1 | 6/2014 | Stevens et al. |
| 2014/0237377 A1 | 8/2014 | Meissner |
| 2014/0258083 A1 | 9/2014 | Achanta et al. |
| 2014/0258084 A1 | 9/2014 | Padawer et al. |
| 2014/0279329 A1 | 9/2014 | Dancel |
| 2014/0279382 A1 | 9/2014 | Drakeley et al. |
| 2014/0279391 A1 | 9/2014 | Gallo et al. |
| 2014/0282977 A1 | 9/2014 | Madhu et al. |
| 2014/0298485 A1 | 10/2014 | Gardner |
| 2014/0310151 A1 | 10/2014 | Shishkov et al. |
| 2014/0317023 A1 | 10/2014 | Kim |
| 2014/0372367 A1 | 12/2014 | McLean et al. |

(56) References Cited

U.S. PATENT DOCUMENTS

| | | |
|---|---|---|
| 2014/0379554 A1 | 12/2014 | Grossman et al. |
| 2015/0026060 A1 | 1/2015 | Krietzman et al. |
| 2015/0127490 A1 | 5/2015 | Puertas |
| 2015/0134506 A1 | 5/2015 | King et al. |
| 2015/0135305 A1 | 5/2015 | Cabrera et al. |
| 2015/0142639 A1 | 5/2015 | Padawer |
| 2015/0161738 A1 | 6/2015 | Stempora |
| 2015/0178829 A1 | 6/2015 | Weiss |
| 2015/0199757 A1 | 7/2015 | Lindholme et al. |
| 2015/0200948 A1 | 7/2015 | Cairns et al. |
| 2015/0262249 A1 | 9/2015 | Wical |
| 2015/0278277 A1 | 10/2015 | Agrawal et al. |
| 2015/0302521 A1 | 10/2015 | Bartmann |
| 2015/0310543 A1 | 10/2015 | DeBie |
| 2015/0324920 A1 | 11/2015 | Wilson et al. |
| 2015/0326580 A1 | 11/2015 | McMillan et al. |
| 2016/0154859 A1 | 6/2016 | Skurtovich, Jr. et al. |
| 2016/0232546 A1 | 8/2016 | Ranft et al. |
| 2016/0232605 A1 | 8/2016 | Zhang |
| 2017/0132700 A1 | 5/2017 | Kazerani et al. |
| 2017/0161486 A1 | 6/2017 | Jeon et al. |
| 2017/0200223 A1 | 7/2017 | Kasower |
| 2017/0221121 A1 | 8/2017 | Davis et al. |
| 2017/0262821 A1 | 9/2017 | Imrey et al. |
| 2017/0352014 A1 | 12/2017 | Smith et al. |
| 2017/0352186 A1 | 12/2017 | Dauphiny et al. |
| 2018/0040063 A1 | 2/2018 | Buechler et al. |
| 2018/0082372 A1 | 3/2018 | Diana |
| 2018/0164877 A1 | 6/2018 | Miller et al. |
| 2018/0176267 A1 | 6/2018 | Malatesha et al. |
| 2018/0204279 A1 | 7/2018 | Painter et al. |
| 2018/0218448 A1 | 8/2018 | Thomas et al. |
| 2018/0225756 A1 | 8/2018 | Wasser et al. |
| 2018/0343265 A1 | 11/2018 | McMillan et al. |
| 2018/0349992 A1 | 12/2018 | Dean et al. |
| 2018/0365445 A1 | 12/2018 | Burger et al. |
| 2019/0019185 A1 | 1/2019 | Chitalia et al. |
| 2019/0034625 A1 | 1/2019 | Ford et al. |
| 2019/0051305 A1 | 2/2019 | Liddell et al. |
| 2019/0066203 A1 | 2/2019 | Smith et al. |
| 2019/0102438 A1 | 4/2019 | Murray et al. |
| 2019/0147366 A1 | 5/2019 | Sankaran et al. |
| 2019/0188717 A1 | 6/2019 | Putnam et al. |
| 2019/0188781 A1 | 6/2019 | O'Brien et al. |
| 2019/0197528 A1 | 6/2019 | Dean et al. |
| 2019/0197618 A1 | 6/2019 | Taylor et al. |
| 2019/0258818 A1 | 8/2019 | Yu et al. |
| 2019/0260843 A1 | 8/2019 | Dean et al. |
| 2019/0295165 A1 | 9/2019 | Kapczynski et al. |
| 2019/0296804 A1 | 9/2019 | Eitan et al. |
| 2019/0318122 A1 | 10/2019 | Hockey et al. |
| 2019/0332400 A1 | 10/2019 | Spoor et al. |
| 2019/0355362 A1 | 11/2019 | Brown et al. |
| 2020/0034927 A1 | 1/2020 | Smith et al. |
| 2020/0051115 A1 | 2/2020 | Lawrence et al. |
| 2020/0051527 A1 | 2/2020 | Ngo |
| 2020/0074100 A1 | 3/2020 | Raneri et al. |
| 2020/0074541 A1 | 3/2020 | Finneran et al. |
| 2020/0074542 A1 | 3/2020 | Manna et al. |
| 2020/0074745 A1 | 3/2020 | Lyren |
| 2020/0076813 A1 | 3/2020 | Felice-Steele et al. |
| 2020/0090265 A1 | 3/2020 | Quinn et al. |
| 2020/0106764 A1 | 4/2020 | Hockey et al. |
| 2020/0106765 A1 | 4/2020 | Hockey et al. |
| 2020/0126126 A1 | 4/2020 | Briancon et al. |
| 2020/0137110 A1 | 4/2020 | Tyler et al. |
| 2020/0143384 A1 | 5/2020 | Koontz et al. |
| 2020/0160372 A1 | 5/2020 | Andrick |
| 2020/0174010 A1 | 6/2020 | Pfeiffer et al. |
| 2020/0193413 A1 | 6/2020 | Jangama et al. |
| 2020/0193423 A1 | 6/2020 | Jangama et al. |
| 2020/0201878 A1 | 6/2020 | Putnam et al. |
| 2020/0202425 A1 | 6/2020 | Taylor-Shoff et al. |
| 2020/0211099 A1 | 7/2020 | Smith et al. |
| 2020/0213206 A1 | 7/2020 | Bracken et al. |
| 2020/0311168 A1 | 10/2020 | Rokos |
| 2020/0342039 A1 | 10/2020 | Bakir et al. |
| 2020/0342527 A1 | 10/2020 | Kasower |
| 2020/0364785 A1 | 11/2020 | Olson et al. |
| 2020/0372173 A1 | 11/2020 | Burger et al. |
| 2020/0380599 A1 | 12/2020 | Wasser et al. |
| 2020/0389461 A1 | 12/2020 | Felice-Steele et al. |
| 2020/0402159 A1 | 12/2020 | Arnold et al. |
| 2021/0004703 A1 | 1/2021 | Zoldi et al. |
| 2021/0027357 A1 | 1/2021 | Bonfigli et al. |
| 2021/0152567 A1 | 5/2021 | Huston, III et al. |
| 2021/0194885 A1 | 6/2021 | Manna |
| 2021/0234869 A1 | 7/2021 | Bondugula et al. |
| 2022/0027853 A1 | 1/2022 | McMillan et al. |
| 2022/0217146 A1 | 7/2022 | Felice-Steele et al. |
| 2022/0374744 A1 | 11/2022 | Zoldi et al. |
| 2023/0007007 A1 | 1/2023 | Manna |
| 2023/0054085 A1 | 2/2023 | Bondugula et al. |

FOREIGN PATENT DOCUMENTS

| | | |
|---|---|---|
| EP | 1 239 378 | 9/2002 |
| EP | 1 301 887 | 4/2003 |
| EP | 1 591 931 | 11/2005 |
| EP | 1 850 278 | 10/2007 |
| EP | 2 088 743 | 8/2009 |
| EP | 2 151 793 | 2/2010 |
| EP | 2 472 423 | 7/2012 |
| GB | 2 102 606 | 2/1983 |
| JP | 2005-208945 | 8/2005 |
| KR | 10-2000-0063313 | 11/2000 |
| KR | 10-2002-0039203 | 5/2002 |
| KR | 10-2007-0081504 | 8/2007 |
| TW | I256569 | 6/2006 |
| WO | WO 91/16691 | 10/1991 |
| WO | WO 00/051052 | 8/2000 |
| WO | WO 00/055778 | 9/2000 |
| WO | WO 01/009752 | 2/2001 |
| WO | WO 01/009792 | 2/2001 |
| WO | WO 01/046889 | 6/2001 |
| WO | WO 01/084281 | 11/2001 |
| WO | WO 02/029636 | 4/2002 |
| WO | WO 2004/031986 | 4/2004 |
| WO | WO 2005/010683 | 2/2005 |
| WO | WO 2005/033979 | 4/2005 |
| WO | WO 2005/098630 | 10/2005 |
| WO | WO 2006/050278 | 5/2006 |
| WO | WO 2006/069199 | 6/2006 |
| WO | WO 2007/084555 | 7/2007 |
| WO | WO 2007/103203 | 9/2007 |
| WO | WO 2008/021104 | 2/2008 |
| WO | WO 2008/042614 | 4/2008 |
| WO | WO 2009/064694 | 5/2009 |
| WO | WO 2009/064840 | 5/2009 |
| WO | WO 2009/102391 | 8/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2011/109576 | 9/2011 |
| WO | WO 2012/097171 | 7/2012 |
| WO | WO 2013/015746 | 1/2013 |
| WO | WO 2019/089439 | 5/2019 |
| WO | WO 2020/051154 | 3/2020 |
| WO | WO 2020/072239 | 4/2020 |

OTHER PUBLICATIONS

Factors Affecting Online Purchase Behavior: Implications to Improve the Existing Credit Rating System; 2009 International Conference on Management and Service Science (pp. 1-4); Hui Peng, Zhao Yang; Sep. 20, 2009. (Year: 2009).*

U.S. Appl. No. 12/705,489, filed Feb. 12, 2010, Bargoli et al.

U.S. Appl. No. 12/705,511, filed Feb. 12, 2010, Bargoli et al.

"12 Mag: How Debt Settlement is Helpful in Improving the Credit Score", Weblog post. Newstex Trade & Industry Blogs, Newstex, Oct. 8, 2017, pp. 2.

(56) References Cited

OTHER PUBLICATIONS

Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"Arizona Company Has Found Key in Stopping ID Theft," PR Newswire, New York, Aug. 10, 2005 http://proquest.umi.com/pqdweb?did=880104711&SID=1&Fmt=3&clientld=19649&RQT=309&Vname=PQD.
ABC News Now:Money Matters, as broadcasted Nov. 15, 2005 with guest Todd Davis (CEO of Lifelock), pp. 6.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Awoonor-Williams, Princess Josephine, Ph.D. "Gender and Credit: An Analysis of Women's Experience in the Credit Market", ProQuest Dissertations and Theses, May 2004, pp. 148.
"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
Caldeiira et al., "Characterizing and Preventing Chargebacks in Next Generation Web Payments Services", 2012 Fourth International Conference on Computational Aspects of Social Networks (CASoN), 2012 IEEE, pp. 333-338.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
Comlounge.net, "plonesocial.auth.rpx" http://web.archive.org/web/20101026041841/http://comlounge.net/rpx as captured Oct. 26, 2010 in 9 pages.
Creditkarma, http://www.creditkarma.com printed Feb. 8, 2013 in 2 pages.
Creditsesame, http://www.creditsesame.com/how-it-works/our-technology/ printed Feb. 5, 2013 in 2 pages.
Collins, Michael J., "Exploring the Design of Financial Counseling for Mortgage Borrowers in Default," Journal of Family and Economic Issues, Springer Science+Business Media, Mar. 13, 2007, pp. 207-226.
Consumer Financial Protection Bureau (CFPB), "Analysis of Difference between Consumer- and Creditor-Purchased Credit Scores", Sep. 2012, pp. 42.
"Consumers Gain Immediate and Full Access to Credit Score Used by Majority of U.S. Lenders", PR Newswire, ProQuest Copy, Mar. 19, 2001, p. 1.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning: Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumers%20in%20cross-border%20disputes..pdf.
Elangovan, A.R., "Managerial Third-Party Dispute Intervention: A Prescriptive Model of Strategy Selection", Academy of Management, Oct. 1, 1995, vol. 20, No. 4, pp. 800-830.
Elliehausen et al., The Impact of Credit Counseling on Subsequent Borrower Behavior, The Journal of Consumer Affairs, Summer 2007, vol. 41, No. 1, pp. 1-28.
Equifax, "Business Status Alerts: User Guide", Jul. 2009, pp. 1-21.
Equifax Consumer Credit Report http://www.equifax.com/home/, as retrieved on Sep. 17, 2008.
Equifax; "Equifax Credit Watch"; https://web.archive.org/web/20070627135447/https://www.econsumer.equifax.co.uk/consumer/uk/sitepage.ehtml?forward=gb_esn_detail, dated Jun. 27, 2007 on www.archive.org in 2 pages.
"Equifax: Debt Wise™ Credit Monitoring Service," Product Review, http://www.mdmproofing.com/iym/reviews/equifax/debt-wise/, Jan. 2010, pp. 11.
Equifax; "Places", http://web.archive.org/web/20111111113930/http://www.equifax.com/places as archived Nov. 11, 2011 in 1 page.
Equifax; "Places", http://www.equifax.com/places/ as printed Nov. 16, 2015 in 1 page.
Equifax; "Welcome to Equifax Mobile", http://www.equifax.com/mobile/ as printed Mar. 18, 2011 in 2 pages.
Ettorre, "Paul Kahn on Exceptional Marketing," Management Review, vol. 83, No. 11, Nov. 1994, pp. 48-51.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
Fisher, Greg, "Credit Score Distribution and Practical Range Statistics", Feb. 23, 2010, The Credit Scoring Site, pp. 2.
Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
"Fraud Alert | Learn How". Fight Identity Theft. http://www.fightidentitytheft.com/flag.html, accessed on Nov. 5, 2009.

(56) References Cited

OTHER PUBLICATIONS

"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
Gramazio, Connor C., "Colorgorical: Creating Discriminable and Preferable Color Palettes for Information Visualization", IEEE Transactions on Visualization and Computer Graphics, Jan. 2017, vol. 23, No. 1, pp. 521-530.
"Guide to Benefits, MasterCard® Cardholder Smart Shopper Benefits", May 2005, pp. 10.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your No. Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&SID=1&Fmt=3&clientld=19649&RQT=309&Vname=PQD.
Ideon, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.
"Judging Credit: Consumers Need Better Finance Tools", News Journal, Daytona Beach, FL, Dec. 28, 2002.
Kaushik, Nishant, "The Epic Hacking of Mat Honan and Our Identity Challenge," Aug. 7, 2012, http://blog.talkingidentity.com/2012/08/the-epic-hacking-of-mat-honan-and-our-identity-challenge.html.
Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.
Koka et al., "Online Review Analysis by Visual Feature Selection", 2017 IEEE 15th Intl Conf on Dependable, Autonomic and Secure Computing, 15th Intl Conf on Pervasive Intelligence and Computing, 3rd Intl Conf on Big Data Intelligence and Computing and Cyber Science and Technology Congress (DASC/PiCom/DataCom/CyberSciTech), 2017, pp. 1084-1091.
Lan, Joe, "The Top Portfolio Management Software," http://www.aaii.com/computerizedinvesting/article/the-top-portfolio-management-software, Includes Discussion thread, Fourth Quarter 2011, pp. 17.
Lang et al., "A Collaborative Web-Based Help-System", Proceedings of the 2nd international conference on web intelligence, mining and semantics, Jun. 13-15, 2012, pp. 5.
Lang et al., "An Avatar-Based Help System for Web-Portals", International Conference on Human-Computer Interaction, Springer, Berlin, Heidelberg, 2011, pp. 10.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lauwers et al., "Five Hundred Years of Bookkeeping: A Portrait of Luca Pacioli", Tijdschrift voor Economie en Management, 1994, vol. 39. No. 3, pp. 289-304.
Lee, W.A.; "Experian, on Deal Hunt, Nets Identity Theft Insurer", American Banker: The Financial Services Daily, Jun. 4, 2003, New York, NY, 1 page.
Leskovec, Jure, "Social Media Analytics: Tracking, Modeling and Predicting the Flow of Information through Networks", WWW 2011-Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, http://web.archive.org/web/20110724011010/http://www.lifelock.com/? as archived Jul. 24, 2011 in 1 page.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, Jan. 9, 2007, pp. 49.
Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Lund, Graham, "Credit Bureau Data: Maximizing the Benefits," Credit Management, May 2004, ProQuest Central, pp. 44-45.

(56) References Cited

OTHER PUBLICATIONS

Magid, Lawrence, J., Business Tools: When Selecting an ASP Ensure Data Mobility, Los Angeles Times, Los Angeles, CA, Feb. 26, 2001, vol. C, Issue 4, pp. 3.
"Managing Debt?" Federal Trade Commission: Consumer Information, http://www.consumer.ftc.gov/articles/0158-managing-debt, printed Mar. 22, 2013 in 4 pages.
Manilla, http://www.manilla.com/how-it-works/ printed Feb. 5, 2014 in 1 page.
Mannan et al., "Mercury: Recovering Forgotten Passwords Using Personal Devices*", Dec. 17, 2011, Pre-Proceedings of Financial Cryptography and Data Security 2011, pp. 1-16.
Meyers et al., "Using Your Social Networking Accounts To Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/ printed Sep. 18, 2008 in 2 pages.
Mint.com, http://www.mint.com/how-it-works/ printed Feb. 5, 2013 in 2 pages.
MS Money Software by Microsoft http://www.microsoft.com/Money/default.mspx as retrieved on Sep. 17, 2008 in 1 page.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyRatePlan.com, "Cell Phone Buying Guide", http://web.archive.org/web/20061116103256/http://myrateplan.com/cell_phone_buying_guide/family_plans/, as archived Nov. 16, 2006 in 2 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directory.westlaw.com/scope/default.asp?db=NA-ALL&RS=W... &VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New for Investors: Asset Allocation, Seasoned Returns and More," Prosper, http://blog.prosper.com/2011/10/27/new-for-investors-asset-allocation-seasoned-returns-and-more/, Oct. 27, 2011, pp. 4.
Next Card: About US, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Oracle: Recommendations for Leveraging the Critical Patch Update and Maintaining a Proper Security Posture, Nov. 2010, An Oracle White Paper, pp. 1-30.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
Peltier, Jon, "Conditional Formatting of Excel Charts", Peltier Tech Blog, as posted Feb. 13, 2012, http://peltiertech.com/conditional-formatting-of-excel-charts/, pp. 1-5.
Peng et al., "Factors Affecting Online Purchase Behavior: Implications to Improve the Existing Credit Rating System", 2009 International Conference on Management and Service Science, 2009 IEEE, pp. 1-4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web,"printed Nov. 16, 2010 in 2 pages.
PersonalCapital.com, http://www.personalcapital.com/how-it-works printed Feb. 5, 2014 in 5 pages.
Phinisee, Tamarind, "Banks, FTC Step Up Efforts to Address Identity Theft", San Antonio Business Journal; San Antonio, Jul. 5, 2002, vol. 16, No. 24, pp. 5.
Pinola, Melanie, "How Can I Protect Against Social Engineering Hacks?" Aug. 9, 2012, http://lifehacker.com/5933296/how-can-i-protect-against-hackers-who-use-sneaky-social-engineering-techniques-to-get-into-my-accounts, pp. 6.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
PrivacyGuard, http://web.archive.org/web/20110728114049/http://www.privacyguard.com/ as archived Jul. 28, 2011 in 1 page.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying For Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Repici et al., "The Comma Separated Value (CSV) File Format", http://creativyst.com/Doc/Articles/CSV/CSV01.htm, Creativyst, Inc., 2002, pp. 10.
Reppler.com, "Learn More: Basic Information about how TrustedID Reppler Works For You," www.reppler.com/learn/ printed Oct. 24, 2012 in 2 pages.
"Resolve Debt for Less: With Help from Freedom Financial"Jan. 9, 2013 in 6 pages.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.

(56) References Cited

OTHER PUBLICATIONS

Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Schmidt et al., "A Set of Multi-Touch Graph Interaction Techniques", ITS '10, Nov. 7-10, 2010, Saarbrucken, Germany, pp. 1-4.
Scholastic Inc.: Parent's Request for Information http://web.archive.org/web/20070210091055/http://www.scholastic.com/inforequest/index.htm as archived Feb. 10, 2007 in 1 page.
Scholastic Inc.: Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
Sealey, Geraldine, "Child ID Theft Can Go Unnoticed for Years", http://abcnews.go.com/US/story?id=90257, Sep. 12, 2003 in 9 pages.
"Settling Your Debts—Part 1 in Our Debt Settlement Series", http://www.creditinfocenter.com/debt/settle_debts.shtml printed Jan. 9, 2013 in 6 pages.
Shibata et al., "3D Retrieval System Based on Cognitive Level—Human Interface for 3D Building Database", Proceedings of the 2004 International Conference on Cyberworlds (CW'04), 2004, pp. 6.
Shin, Laura, "See an Error on your Credit Report? Credit Karma Now Makes it Easy to Dispute", Nov. 12, 2015, http://www.forbes.com/sites/laurashin/2015/11/12/see-an-error-on-your-credit-report-credit-karma-now-makes-it-easy-to-dispute/, pp. 4.
ShoeBoxed, https://www.shoeboxed.com/sbx-home/ printed Oct. 16, 2012 in 4 pages.
Simpson, Glyn, "Microsoft (MS) Money, MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color of Money, Oct. 4, 2007.
Solapurkar, Prajakta, "Building Secure Healthcare Services Using OAuth 2.0 and JSON Web Token in IOT Cloud Scenario", IEEE, 2nd International Conference on Contemporary Computing and Informatics (ic3i), 2016, pp. 99-104.
Srinivasa et al., "Augmented Reality Adaptive Web Content", 2016 13th IEEE Annual w Consumer Communications & Networking Conference (CCNC), pp. 4.
Stauffer et al., "Using HTML 3.2," Second Edition, 1996, Que Publishing, pp. 192-193.
Tajik, S., "Conditional Plotting, Changing Color of Line Based on Value", MathWorks®, MATLAB Answers™, Question Posted Feb. 10, 2011 https://www.mathworks.com/matlabcentral/answers/1156-conditional-plotting-changing-color-of-line-based-on-value?requestedDomain=www.mathworks.com, pp. 8.
TheMorningCall.Com, "Cheap Ways to Foil Identity Theft," www.mcall.com/business/columnists/all-karp.5920748jul01,0 . . . , published Jul. 1, 2007.
Thompson, Herbert H., "How I Stole Someone's Identity", https://www.scientificamerican.com/article/anatomy-of-a-social-hack/#, Aug. 18, 2008, pp. 5.
Todorova, Aleksandra, "Protecting Your Child's Identity", Smart Money, Published Aug. 2, 2007, pp. 1-5.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/us/US-00708-LTR.htm printed Sep. 4, 2007 in 2 pages.
"Use of Alternative Data to Enhance Credit Reporting to Enable Access to Digital Financial Services by Individuals and SMEs Operating in the Informal Economy", Guidance Note, International Committee on Credit Reporting (ICCR), Jun. 28, 2018, pp. 35.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wesabe.com http://www.wesabe.com/, as retrieved on Sep. 17, 2008.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need A Budget, http://www.youneedabudget.com/features printed Feb. 5, 2014 in 3 pages.
Application as filed in U.S. Appl. No. 09/411,683, dated Oct. 4, 1999.
International Search Report and Written Opinion for Application No. PCT/US2019/049377, dated Dec. 20, 2019.

* cited by examiner

SYSTEM AND METHODS FOR CREDIT DISPUTE PROCESSING, RESOLUTION, AND REPORTING

RELATED APPLICATIONS

This application is a continuation of U.S. patent application Ser. No. 17/151,013, which was filed on Jan. 15, 2021, which is a continuation of U.S. patent application Ser. No. 16/025,334, which was filed on Jul. 2, 2018, which is a continuation of U.S. patent application Ser. No. 15/610,913, which was filed on Jun. 1, 2017, which is a continuation of U.S. patent application Ser. No. 15/195,823, which was filed on Jun. 28, 2016, which is a continuation of U.S. patent application Ser. No. 13/831,341, which was filed on Mar. 14, 2013, the entirety of which is hereby incorporated herein by reference.

LIMITED COPYRIGHT AUTHORIZATION

A portion of disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND

Credit disputes may arise when a consumer does not agree with a creditor regarding charges, timeliness of payments, fraudulent activities, and so forth. Credit disputes may also arise if a consumer believes that information submitted by a creditor to a credit bureau is inaccurate or does not reflect the most current status of a credit situation.

A common type of credit dispute happens when a consumer's identity, including credit information, is stolen and used to make purchases or apply for credit lines. The consumer may inform a creditor that such charges are results of fraudulent activities, and as such the consumer should not be held responsible for them.

SUMMARY

Among other things, this disclosure describes systems and methods for tracking statuses of credit disputes, informing the status of credit dispute resolution to consumers, and informing consumers of whether a creditor has responded to a credit dispute resolution request within a regulatory response period.

As discussed herein, aspects of the present disclosure include a credit dispute resolution computer system. The computer system may include one or more computer processors and a tangible storage device which stores a credit dispute resolution module configured for execution by the one or more computer processors. The credit dispute resolution module may be configured to receive a credit dispute resolution request from a consumer. In response to the request from the consumer for information regarding resolution status of the credit dispute, the credit dispute resolution module may generate user interface code configured for execution on a computing device of the consumer in order to render a user interface. The user interface may include a status interface including indicators of a plurality of required actions associated with resolution of the received credit dispute. The plurality of required actions may include at least: credit dispute request received, credit dispute case sent to credit bureau, credit dispute case acknowledged by creditor and creditor replies to credit dispute request. The user interface may also include a current status indicator indicating which of the required action is in process at a time the request for the resolution status is received.

As described herein, aspects of the present disclosure include a credit dispute resolution computer system that includes one or more computer processors, a data storage configured to store a plurality of records which includes credit disputes from respective consumers, and a tracking and reporting module. The tracking and reporting module may be configured to receive a request to resolve a credit dispute between a consumer and a creditor and check the credit dispute for accuracy of information in the credit dispute. The information may include one or more of the consumer's name, address, social security number, one or more accounts with the creditor, and/or payment information. The tracking and reporting module may also send a credit dispute request to a credit bureau, receive one or more case status updates from the credit bureau regarding the credit dispute resolution request, determine a resolution status of a plurality of resolution statuses that applies to the credit dispute of the consumer based on the received case status. The credit dispute resolution computer system may also include an alert module configured to notify the consumer of the determined resolution status, notify the consumer of an average response time by the creditor and/or a regulatory response time requirement, and in response to determining that no response has been received from the creditor within the regulatory response time, provide the consumer with information to help the consumer obtain a response from the creditor.

Aspects of the present disclosure include a computer-implemented method for credit dispute resolution. The computer-implemented method may include receiving a credit dispute request from a consumer. Furthermore, in response to a request from the consumer for information regarding resolution status of the credit dispute, the computer-implemented method may determine a current status indicating which of a plurality of required action is in process at a time the request for the resolution restates is received. The plurality of required actions may include at least: credit dispute request received, credit dispute case sent to a credit bureau, credit dispute case acknowledged by creditor, and creditor replies to credit dispute request. The computer-implemented method may also include determining an average response time for the creditor based on one or more actual response times for the creditor in credit dispute requests of other consumers and a regulatory response time for the creditor to respond to the credit dispute case once received by the creditor. The computer-implemented method may also include determining whether the creditor has responded to the credit dispute request within the regulatory response time.

Aspects of the present disclosure include a non-transitory computer-readable storage medium, which includes computer-executable instructions that direct a computing system to receive a credit dispute request from a consumer. In response to a request from the consumer for information regarding resolution status of the credit dispute, the computer-executable instructions may generate user interface code configured for execution on a computing device of the consumer in order to render a user interface. The user interface may include a status interface including indicators of a plurality of required actions associated with resolution of the received credit dispute. The plurality of required actions may include at least: credit dispute request received, credit dispute case sent to credit bureau, credit dispute case acknowledged by creditor and creditor replies to credit dispute request. The user interface may also include a current status indicator indicating which of the required actions is in process at a time the request for the resolution status is received.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Various embodiments of systems, methods, processes, and data structures will now be described with reference to the drawings. Variations to the systems, methods, processes, and data structures which represent other embodiments will also be described. Certain aspects, advantages, and novel features of the systems, methods, processes, and data structures are described herein. It is to be understood that not necessarily all such advantages may be achieved in accordance with any particular embodiment. Accordingly, the systems, methods, processes, and/or data structures may be embodied or carried out in a manner that achieves one advantage or group of advantages as taught herein without necessarily achieving other advantages as may be taught or suggested herein.

Credit disputes may arise when a consumer does not agree with a creditor regarding charges, timeliness of payments, fraudulent activities, and so forth. Credit disputes may also arise if a consumer believes that information submitted by a creditor to a credit bureau is inaccurate or does not reflect the most current status of a credit situation.

A common type of credit dispute happens when a consumer's identity, including credit information, is stolen and used to make purchases or apply for credit lines. The consumer may inform a creditor that such charges are results of fraudulent activities, and as such the consumer should not be held responsible for them.

Other common credit disputes include whether payments are late, how much fees and other charges are owed, whether merchants have overcharged, whether an interest rate is correct, and so forth.

Example Credit Reporting Environment and Data Flow

Figure 1:
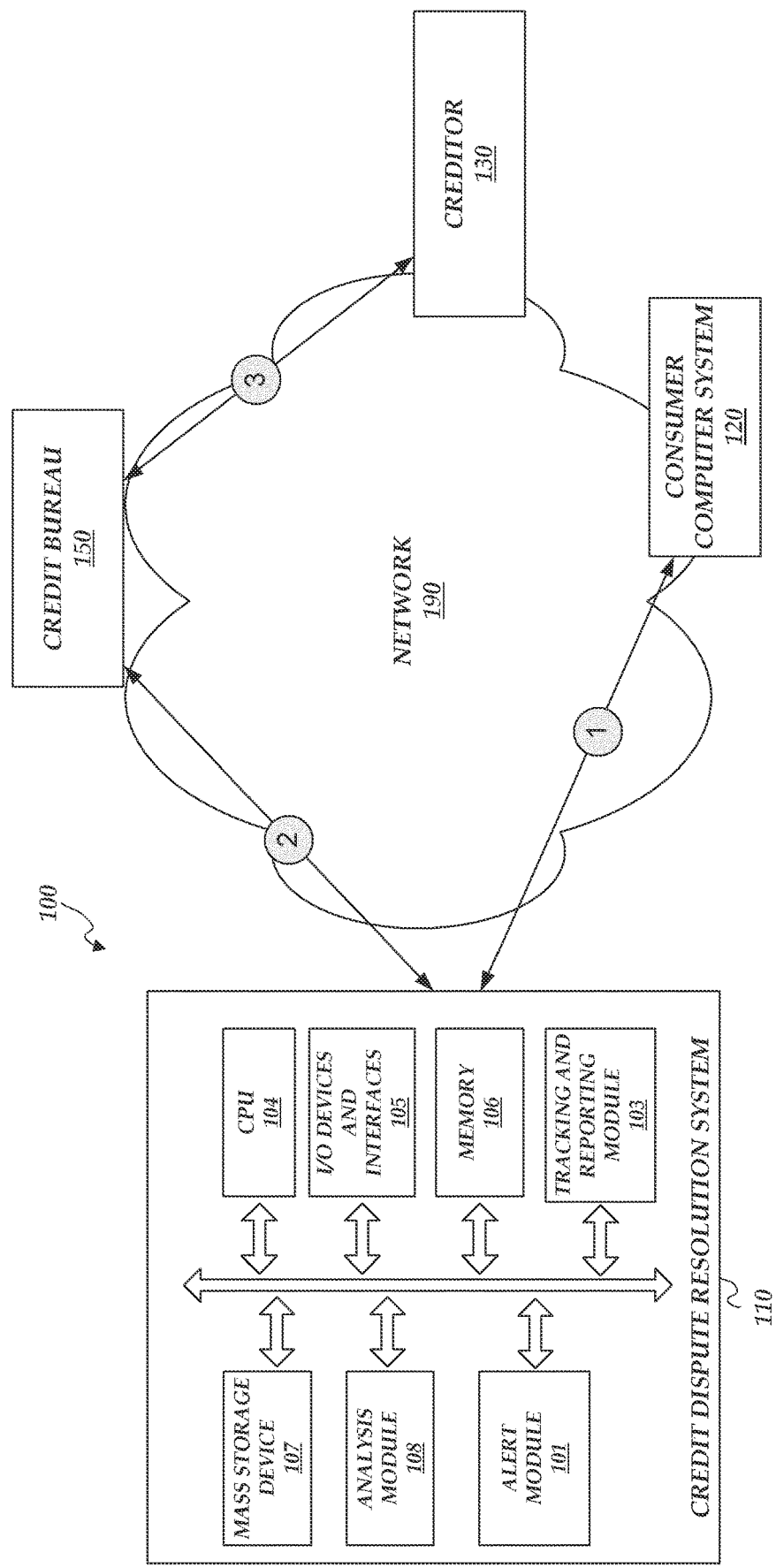
FIG. 1 is a flow diagram illustrating one embodiment of an illustrative operating environment for receiving, processing, monitoring, and reporting credit disputes and resolution of the credit disputes.

FIG. 1 is a flow diagram illustrating one embodiment of an illustrative operating environment 100 for receiving, processing, monitoring, and reporting credit disputes and resolution of the credit disputes. In the example of FIG. 1, circled numerals illustrate the order in which data flows between the various components according to one embodiment. In other embodiments, the processes associated with the circled numerals may be performed in a different order, and the method may include fewer or additional processes.

Consumer computer system 120 may include computer systems of individual consumers who have individual credit accounts, businesses that have business credit accounts, homeowners who have taken out loans or home equity lines of credits, and/or consumers or businesses that have purchased vehicles with loans, and so forth. As illustrated, the consumer computer system 120 is in contact with the credit dispute resolution system 110 via a network 190.

In step 1 of FIG. 1, the credit dispute resolution system 110 receives information related to a consumer's credit dispute from the consumer computer system 120. For example, a consumer fills out a credit dispute form provided by the credit dispute resolution system, such as a form that may be accessible via an online credit report of the consumer. The credit dispute resolution system 110 may also receive receipts, payment stubs, proof of purchase, and/or other types of documents from the consumer computer system 120.

In the embodiment of FIG. 1, the credit dispute resolution system 120 is in contact with a credit bureau 150 and/or other provider of credit data. In some embodiments, the credit dispute resolution system 120 may be in contact with more than one credit bureaus 150 and/or credit dispute resolution services. In step 2 of FIG. 1, the credit dispute resolution system 120 sends information regarding the credit dispute to the credit bureau 150. In some embodiments, the credit dispute information may include the received credit dispute from consumer computer system 120, receipts, payment stubs, proof of purchase, and/or a standardized inquiry incorporating information related to the credit dispute formatted by the credit dispute resolution system. The information may also include a request for the credit bureau 150 to send status updates, status updates regarding the credit dispute, and result of credit dispute resolution, an/or other updates. Furthermore, in some embodiments, the information may include user preferences for delivery of status updates and/or alerts regarding the credit dispute.

The tracking and reporting module 103 may keep track of when credit dispute information is submitted to a credit bureau 150. The tracking and reporting module 103 may also receive, process, and/or store status updates regarding the submitted credit dispute. The tracking and reporting module 103 may also receive, process, and/or record how many days have passed since a creditor has received a credit dispute resolution request.

In some embodiments, the alert module 101 generates alerts that may be sent to the consumer. The alert module 101 may be in communication with the tracking and reporting module 103. Based on the information and/or reports provided by the tracking and reporting module 103, the alert module 101 may inform the consumer computer system 120 of the recent updates to the credit dispute. The alert module 101 may also send messages and/or emails and letters to the consumer. The alert module 101 may also communicate with the I/O devices and interfaces 105 to generate one or more graphical interfaces in order to provide various statuses and alerts to the consumer, some of which are discussed in more details below.

In some embodiments, the credit dispute resolution system 110 also calculates an average response time for respective creditors. For example, the analysis module 108 may collect information regarding the creditor 130, such as credit information associated with a plurality of consumers that each have filed disputes with the creditor, and calculate the average number of days that that the particular creditor 130 typically takes to respond to a credit dispute. Thus, the analysis module 108 may determine average response times for individual creditors based on actual resolutions of (or failure to resolve) disputes with multiple consumers. In some embodiments, the analysis module 108 may perform a more detailed calculation, such as the average response time based on the type of dispute (e.g., late payment, identity dispute, and so forth) or the average response time based on the type of credit involved (e.g., individual or business, interest rate categories).

In the embodiment of FIG. 1, the credit bureau 150 is in contact with the creditor 130 that is related to the credit dispute. In some embodiments, the credit bureau may be in contact with one or more creditors that are related to the credit dispute. In some embodiments, the credit bureau 150 may send the credit dispute to the creditor 130 along with a request that the creditor responds to the credit dispute within a regulatory response time frame. In some embodiments, the credit bureau may verify the identity of the consumer and the past credit history of the consumer specifically regarding the disputed credit account before sending the credit dispute to the creditor.

In the embodiment of FIG. 1, the creditor 130 sends information regarding the credit dispute to the credit bureau 150 and the credit bureau passes on some or all of the information to the credit dispute resolution system. In some embodiments, the credit dispute resolution system 110 is under the control or and/or owed by the credit bureau 150.

Status messages provided by the creditor to the credit bureau may include any combination of information regarding the dispute. For example, in some situations, the creditor 130 may inform the credit bureau 150 that it has tried to resolve the credit dispute but it cannot resolve it successfully after investigation. The creditor 130 may inform the credit bureau that a partial solution to the credit dispute may be found but there could be other requirements from the creditor to the consumer. In some situations, the credit dispute may be successfully resolved without further actions. In some situations, the creditor 130 may inform the credit bureau 150 that more information or documents are needed in order to further investigate the dispute. In some situations, the creditor 130 may not respond to the credit bureau 150 within the regulatory time frame, and the credit bureau 150 may inform the credit dispute resolution system 110 of the creditor's non-compliance with the regulatory time frame. The credit dispute resolution system 110 may inform the consumer of the non-compliance, and in some embodiments, may also direct the consumer to take further actions, as discussed in more details below.

Example Methods Related to Incoming Credit Disputes

Figure 2:
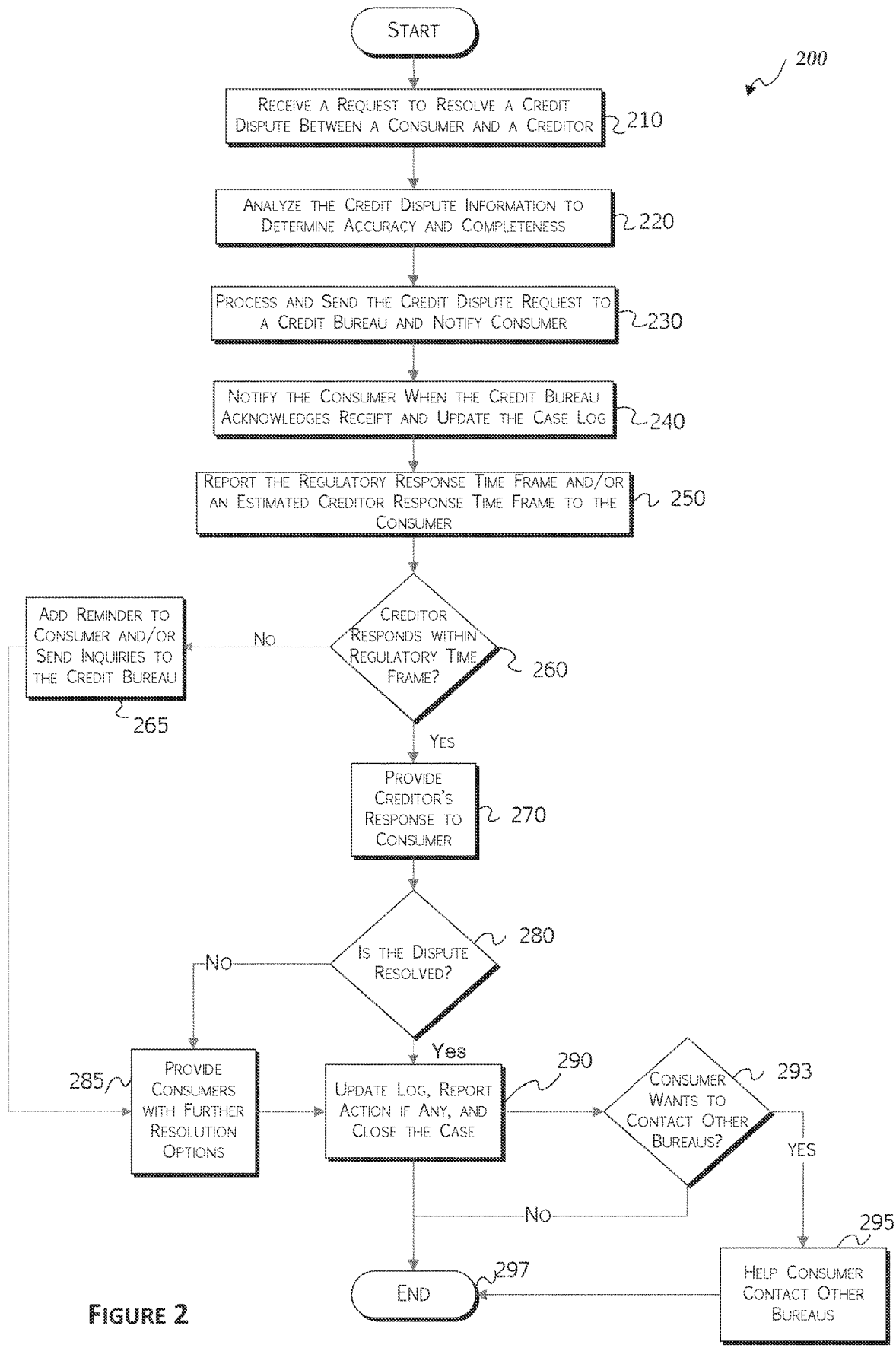
FIG. 2 is a flowchart that illustrates one embodiment of a method of sending a credit dispute to a credit bureau and reporting the status updates of credit dispute resolution to a consumer.

FIG. 2 is a flowchart illustrating one embodiment of a method of sending a credit dispute to a credit bureau 150 and reporting the status updates regarding credit dispute resolution to a consumer. The method of FIG. 2 may be performed by the credit dispute resolution system 110, certain modules of the system 110, and/or any other suitable computing system. Depending on the embodiment, the method of FIG. 2 may include fewer or additional blocks and the blocks may be performed in an order that is different than illustrated.

The method 200 begins at block 210, where the credit dispute resolution system 110 receives a request to resolve a credit dispute between a consumer and a creditor 130. As discussed above, the received credit dispute may include consumer credit data, business data, account history, financial statements, public records, vehicle loan records, property information, mortgage information, and/or other types of data. The received data may include, for example, credit card payment history of a consumer or a business, merchandise purchase information at a store, payment information regarding a home equity line of credit, and so forth. In some embodiments, the data may include data that the credit dispute resolution system 110 specifically requests from the consumer computer system 120, such as proof of payment, proof of purchase, and so forth. The data may also include non-credit data which can be directly or indirectly linked or tied to a consumer and/or business.

The method 200 proceeds to block 220, where the credit dispute resolution system 110 processes the received credit dispute information. In some embodiments, the credit dispute resolution system 110 may check the request for accuracy and completeness. For example, the credit dispute resolution system 110 may determine if the customer's name, address, and social security number match the one or more accounts the customer has with the creditor. In some embodiments, the credit dispute resolution system 110 may correct mistakes in the submitted information. For example, if the consumer has misspelled the name of the creditor, the credit dispute resolution system 110 may correct the mistake and/or ask the consumer to correct the mistake. In some embodiments, the analysis module 108 may determine, based on the submitted credit dispute, the category that the dispute falls into. For example, the analysis module 108 may generally categorize the submitted credit dispute into disputes regarding incorrect identity-related information, identity theft, late or missed payments, interest rate disputes, fee/charge disputes, and so forth. In some embodiments, the category information may be part of the credit dispute information received from the consumer.

In some embodiments, if some key information, for example, the account number of credit account in dispute, is missing or incorrect, the credit dispute resolution system may ask the consumer to provide more information in order to complete the credit dispute resolution request. In some embodiments, if the missing or incorrect information may be completed or corrected by the analysis module 108 based on the information stored in the mass storage device 107, then the analysis module 108 may also automatically correct or complete the missing information.

The method 200 proceeds to block 230, where the credit dispute resolution system 110 processes the received credit dispute information into a credit dispute resolution request, and send the request to a credit bureau 150 (or multiple credit bureaus). The consumer may be notified when the request is sent to the credit bureau. In some embodiments, the credit dispute resolution system 110 may format the received credit dispute information into a credit dispute resolution request. The formatting involved may include gathering the received credit dispute information, extract data fields that involve the identifying information about the consumer, dates of events, details of the dispute, and so forth. The extracted data may be different depending on the type of credit dispute.

In some embodiments, the formatted credit dispute resolution request may be in the form of a letter to the credit bureau. In some cases, the formatted credit dispute resolution request may be in the form of a series of data fields that may be loaded into a database or other data structure. In some other cases, the credit formatted credit dispute resolution request may be a pre-determined format, such as XML, Excel, etc.

The method 200 proceeds to block 240, where the credit dispute resolution system 110 notifies the consumer when the credit bureau acknowledges receipt of the credit dispute resolution request. The credit dispute resolution 110 may also update a case log, which is configured to reflect the updates to the credit dispute resolution request. The alert module 108 may notify the consumer by a text message, an email, or by a message or a graphical indicator displayed to the consumer when the consumer logs onto a portal provided by the dispute resolution system for tracking status of the submitted dispute.

The method 200 proceeds to block 250, where the credit dispute resolution system 100 may report a regulatory response time frame and an estimated creditor response time frame to the consumer. In some embodiments, a regulatory response time frame is the number of days within which the creditor is required to respond to an inquiry by law. In some embodiments, analysis module 108 may determine the average creditor response time frame to the consumer based on information stored in the credit dispute resolution system 110 (such as in the mass storage device 107). In some embodiments, the regulatory response time frame may be determined based on relevant state and Federal laws, such as Fair credit Reporting Act (FCRA). In some embodiments, the regulatory response time frame may be 30 days.

The method 200 proceeds to decision block 260, where the credit dispute resolution system 110 determines whether the creditor has responded within the regulatory time frame. For example, if the regulatory response time frame is 30 days, then the credit dispute resolution system 110 makes a determination whether the creditor has responded to the credit dispute resolution request within 30 days. In some embodiments, in order to satisfy the regulatory response time frame, the response may be an initial response or acknowledgement with some stated further planed action from the creditor.

If the answer to the decision block 260 is no and the creditor has not responded within the regulatory response time frame, then the credit dispute resolution system 110 proceed to bock 265. The credit dispute resolution system 110 may send a message to the consumer that the creditor has not responded within the regulatory time frame, and/or send further inquiries to the credit bureau. In some embodiments, the credit bureau may notify the creditor that a response should be submitted within the regulatory time frame. In a user interface provided to the consumer, which will be described in detail later, a status message or a status bar may also be shown to the consumer and let the consumer know that the creditor has not responded within the regulatory time frame.

If the creditor has responded within the regulatory time frame, the method 200 proceeds to decision block 270, where the credit dispute resolution system 110 provides the creditor's response to the consumer. The response from the creditor may be provided by the consumer via the alert module 101. In some embodiments, the response may be provided by one or more of text messages, emails, letters, and/or phone calls. In a user interface provided to the consumer, which will be described in detail later, a status message or a status bar may also be shown to the consumer and let the consumer know that the creditor has responded within the regulatory time frame. Moreover, the response from the creditor may also be displayed in the user interface.

In some embodiments the method includes blocks similar to blocks 260, 265, and 270, but with reference to an expected time frame for the particular creditor. For example, if a particular creditor is expected to respond within 14 days (e.g., based on a 14-day average response time in hundreds or thousands of previous disputes), the dispute resolution system may notify the consumer when the time period has lapsed without a response and/or communicate with the creditor in an attempt to expedite the process.

The method 200 proceeds to decision block 280, where it is determined whether the dispute has been resolved. In some embodiments, the analysis module 108 may analyze the received response from the creditor and determines whether the dispute has been resolved. In some other embodiments, information regarding whether the dispute has been resolved may be received from either the creditor or the credit bureau. In other embodiments, the dispute is not considered resolved until input from the consumer indicates that the dispute has been resolved (e.g., regardless of whether information from the creditor indicates that the dispute is resolved.

If the answer is no at block 280 in view of the dispute not being resolved successfully, the method 200 proceeds to block 285, and provides consumers further resolution options. In some embodiments, the credit dispute resolution system 110 provides the consumers with direct contact information of the creditor and/or the credit bureau, such as phone numbers and/or email addresses. In some embodiments, the credit dispute resolution system 110 provides the consumers with a list of options or alternatives to try. In some embodiments, the credit dispute resolution system 110 may inform the consumer to send more information to the creditor or credit bureau.

The method 200 then proceeds to block 290, either after a determination of successful resolution in block 280 or providing options to the consumer at block 285. The credit dispute resolution system 110 may update the case status log to reflect the resolution status (e.g., successful or unsuccessful resolution and/or details regarding the dispute). The credit dispute resolution system 110 may also report the resolution to the consumer. In some embodiments, the credit dispute resolution system 110 closes the credit dispute resolution request after receiving the indication of successful resolution form the creditor.

In the embodiment of FIG. 2, the method 200 proceeds to decision block 293, where it is determined if the consumer would like to contact other credit bureaus or credit dispute resolution services. If the answer is yes, then the method 200 proceeds to block 295, and the credit dispute resolution system 110 may help the consumer contact other credit bureaus. In some embodiments, the credit dispute resolution system 110 may send information to other credit bureaus and/or credit dispute resolution services that may be useful to resolve other potential discrepancies in the consumer's financial data maintained by those other entities. The transmitted information may include, for example, the consumer's credit dispute resolution request, the consumer's ID data, the consumer's other necessary credit data, the results of the resolution, and/or any other details regarding the dispute.

After the credit dispute resolution system 110 has finished performing any actions in block 295, or if the answer to the question in decision block 293 is no (that the consumer does not what to contact other credit bureaus or services), then the method 200 may proceed to block 297 and ends the process.

Example User Interfaces and Status Blocks

Figure 3:
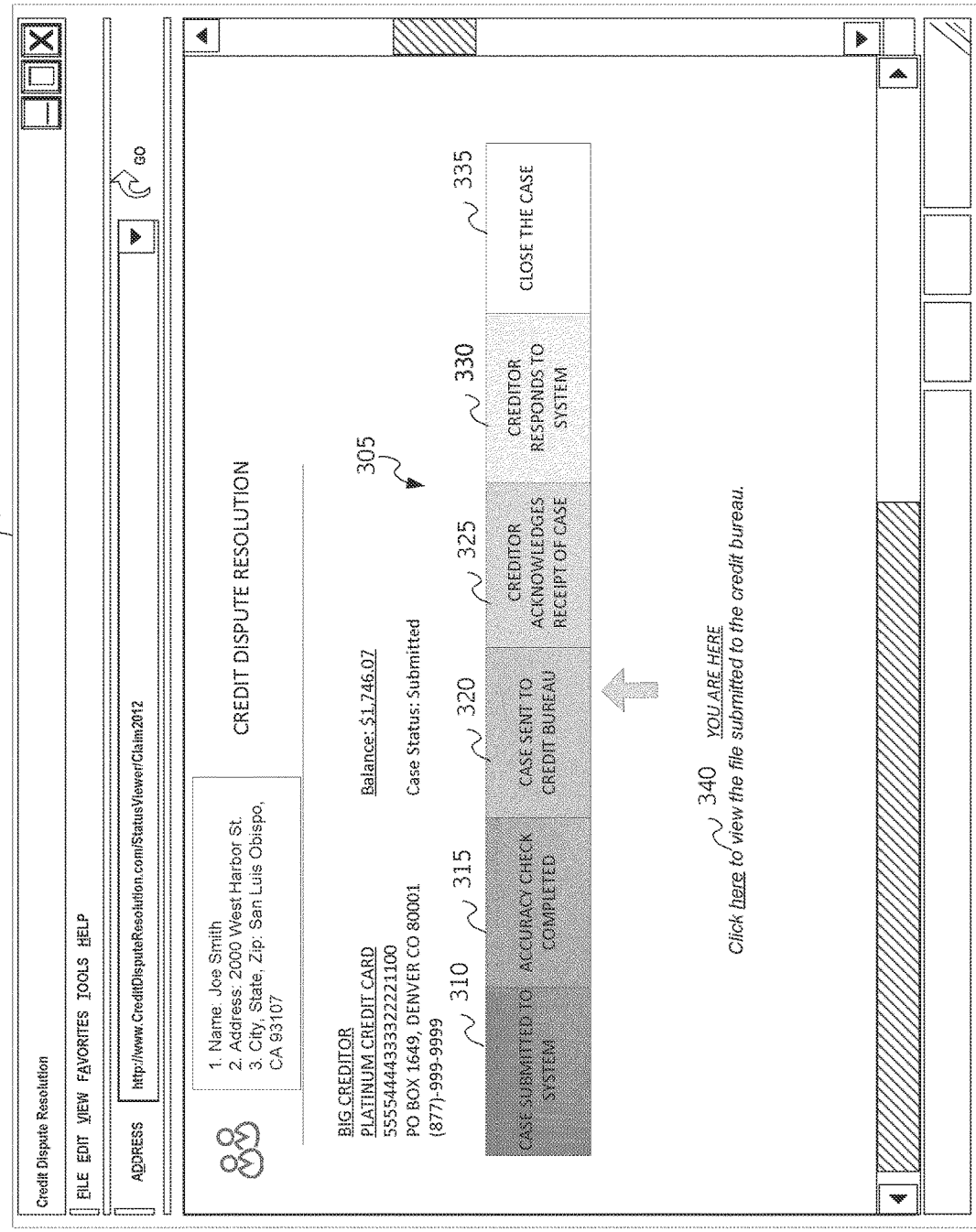
FIG. 3 is an illustrative user interface that may be generated and presented to a consumer, which includes a credit dispute resolution status monitoring interface indicating that a case has been sent to a credit bureau.

FIG. 3 is an illustrative user interface that may be generated and presented to a consumer, which includes a credit dispute resolution status monitoring interface 300 indicating a case has been sent to a credit bureau.

The interface 300 may display the consumer's identification information. In this particular example, the consumer's name and address are displayed. In other embodiments, the consumer's phone number, birth date, and/or the last few digits of the consumer's social security number may also be displayed.

The interface 300 may also display the complete or partial account number of the account that is involved in this credit dispute. In some embodiments, the balance of the account, and the contact information of the creditor may also be displayed.

The interface 300 may display the status of the credit dispute resolution request. For example, in FIG. 3, the case status is shown as "submitted." More details about the status may be displayed in the status bar 305 below. Several blocks representing the process of dispute resolution may be arranged to display the case status to the consumer. For example, in the interface 300, an arrow points to the block 320 of the status bar 305, which shows that the case has been sent to the credit bureau. The arrow with the words "You are here" may be used to point to the block most closely associated with a current status of the consumer's credit dispute. In the interface 300, block 310 indicates that the case has been submitted to the credit dispute resolution system, block 315 indicates that an accuracy check of the submitted credit dispute has been completed, block 325 indicates that the creditor has acknowledged receipt of the dispute, block 330 indicates that the creditor should be responding to the system, and block 335 shows that the dispute has been closed. In other embodiments, fewer and/or additional blocks may be included to illustrate fewer and/or additional status associated with a credit dispute resolution process. Advantageously, the consumer not only sees the current status of their credit dispute resolution process, which may be updated in realtime, the consumer also sees the steps that have already been completely and knows what additional steps are required before the case is close. With reference to the example of FIG. 3, the consumer can see that a couple of actions (those associated with blocks 325 and 33) remain before the case is closes at block 335.

In some embodiments, a link 340 may be provided in the interface 300. In FIG. 3, for example, if the consumer follows the link 340, the consumer may view the file summarizing the credit dispute, such as documents that were submitted to the credit bureau and/or documents sent to/from the creditor.

Figure 4:
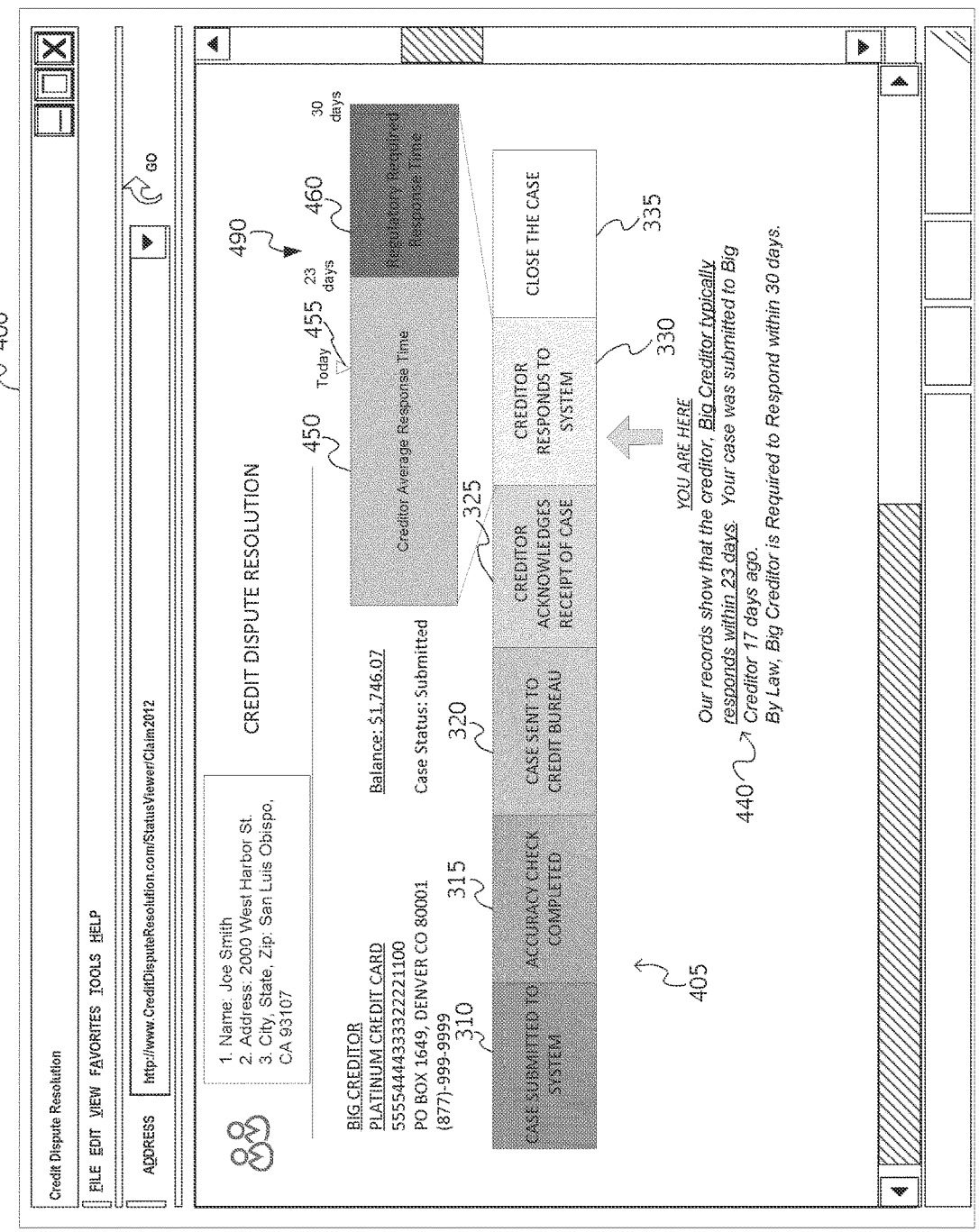
FIG. 4 is an illustrative user interface that may be generated and presented to a consumer, which includes an indication of creditor average response times and regulatory creditor response times.

FIG. 4 is an illustrative user interface 400 that may be generated and presented to a consumer, which includes an indication of creditor average response times and regulatory creditor response times. Similar to the illustrative interface in FIG. 3, the interface 400 may display the consumer's identification information.

In FIG. 4, the case status is shown as "submitted." More details about the status may be displayed in the status bar 405 below. For example, in the interface 400, a status arrow points to block 330 of the status bar 405, which shows that the case has been acknowledged by the creditor and the creditor should be responding to the system. In this embodiment, the status is determined based on the location of the status arrow below the status bar 405 (labeled "YOU ARE HERE"), which generally indicates that tasks to the left of the arrow have been completed and the task that the arrow is pointing to is in process. In this example, a message is shown next to "You are here," which indicates when a creditor usually responds to a credit dispute resolution request, how long the request has been submitted to the creditor, and the regulatory response timeline. In other embodiments, less or additional information may be displayed. For example, dates when be displayed next to each task to indicate when it was started, completed, and/or expected to be completed. In this example, the displayed message indicates that Big Creditor typically responds to credit disputes within 23 days, the particular consumer case was submitted to Big Creditor 17 days ago, and, by law, Big Creditor is required to respond within 30 days.

In some embodiments of FIG. 4, a second status bar 490 with additional blocks can be displayed to provide additional details regarding one or more blocks of the status bar 405. In this example, the second status bar 490 may include a block 450 indicating a creditor's average response time and a block 460 indicating an additional time (beyond the creditor's average response time) until a regulatory response deadline is reached. An indicator 455 may indicate where today is in view of the creditor's average response time 450 and the regulatory response time 460.

In some embodiments, a link 440 may be provided in the interface 400. In FIG. 4, for example, if the consumer follows the link 440, the consumer may view information regarding Big Creditor's response time, such as a message, a file, and/or a webpage of statistics of a creditor's average response time. The creditor's average response time and historical average response time may be displayed as a graph and/or a chart. The amount of time that has passed since the creditor has received a current credit dispute resolution request may also be compared to the creditor's average response time and historical average response time. In some embodiments, probabilities of whether a creditor may respond within some number of days may also be provided. In other embodiments, fewer and/or additional blocks may be included to illustrate fewer and/or additional status associated with a credit dispute resolution process.

Figure 5:
FIG. 5 is an illustrative user interface that may be generated and presented to a consumer, which includes an indication that a case has been successfully resolved and providing an option to provide resolution information to other credit bureaus and/or credit dispute services.

FIG. 5 is an illustrative user interface 500 that may be generated and presented to a consumer, which includes an indication that a case has been successfully resolved and providing an option to provide resolution information to the credit bureaus and/or credit dispute services.

In FIG. 5, the case status is shown as "resolved." In this example, the status arrow (below the status bar 505) points to the end of block 330 and the beginning of block 535 of the status bar 505, indicating that a creditor has already responded to the credit bureaus regarding the dispute, and the next step may be to send the resolved dispute to other credit bureaus and close the case.

As with FIG. 4, the status arrow with the words "You are here" may be used to point to the block most closely associated with a current status of the consumer's credit dispute. In this example, the message shown next to the status arrow indicates that the case "has been successfully resolved as of today." Moreover, the user interface 500 may provide a link 540, which would allow the consumer to submit the resolved request to other credit bureaus, should the consumer choose to.

In some embodiments of FIG. 5, a second status bar 590 with additional blocks can be displayed around a particular block. In this example, the second status bar 590 may include a block 450 indicating Big Creditor's average response time and a block 460 indicating regulatory response time 460 (beyond Big Creditor's average response time). An indicator 455 may indicate where today is in view of Big Creditor's average response time 450 and the regulatory response time 460. In this example, indicator 455 shows that Big Creditor in this example has taken longer than its average response time to respond to this credit dispute resolution request but the time Big Creditor has taken is still within the regulatory required response time. In other embodiments, fewer and/or additional blocks may be included to illustrate fewer and/or additional status associated with a credit dispute resolution process.

Figure 6:
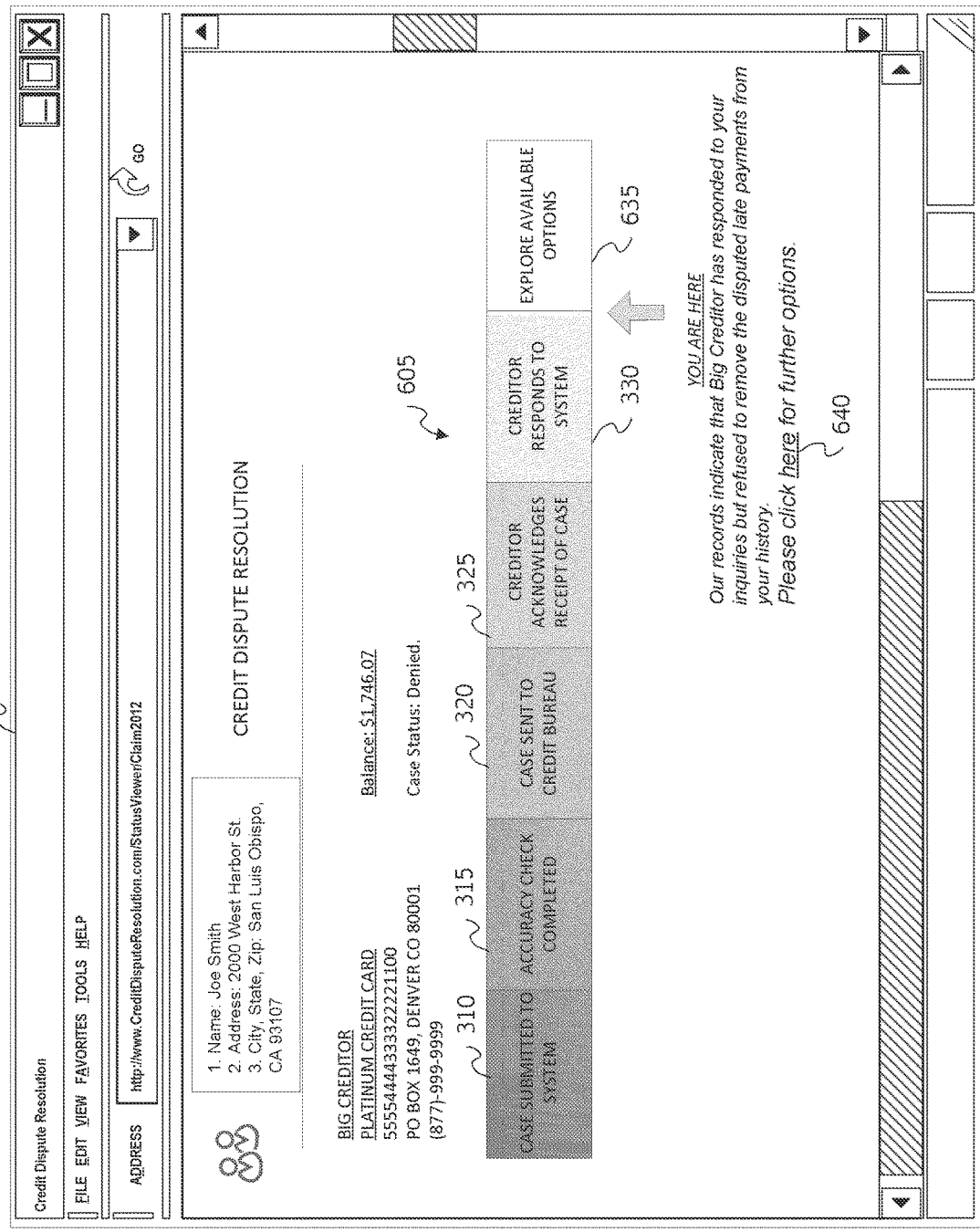
FIG. 6 is an illustrative user interface that may be generated and presented to a consumer, which includes an indication that a case has not been successfully resolved and providing options for potentially resolving the dispute.

FIG. 6 is an illustrative user interface 600 that may be generated and presented to a consumer, which includes an indication that a case has not been successfully resolved and providing options for potentially resolving the dispute.

In FIG. 6, the case status is shown as "denied." In this example, the status arrow points to the end of block 330 and the beginning of block 635 of the status bar 605, showing that Big Creditor has already responded to the system but the credit dispute resolution request was denied. In this example, the next step may be to explore available options, if any, as shown in block 635.

In this example, the message shown next to the status arrow indicates that Big Creditor has responded to the consumer's inquiries but refused to remove the disputed late payments from the consumer's credit history. Moreover, the user interface 600 may provide a link 640, which would allow the consumer to explore further options, if available.

The further options may include, for example, identifying the reason (if any) a creditor has refused to resolve the dispute, identifying any additional support documents that were not presented in order to help resolve the dispute, providing contact information of credit dispute resolution services, placing phone calls on the consumer's behalf, and so forth. The credit dispute resolution system 110 may identify possible additional support documents that were not presented by comparing the list of documents submitted by a consumer whose dispute resolution request was denied against typical documents submitted by consumers who had similar but successfully resolved requests. For example, typical documents submitted by consumers who had similar but successfully resolved requests may include proof of income, proof of employment, proof of payment, proof of other sources of income, and so forth.

In other embodiments, fewer and/or additional blocks may be included to illustrate fewer and/or additional status associated with a credit dispute resolution process.

Figure 7:
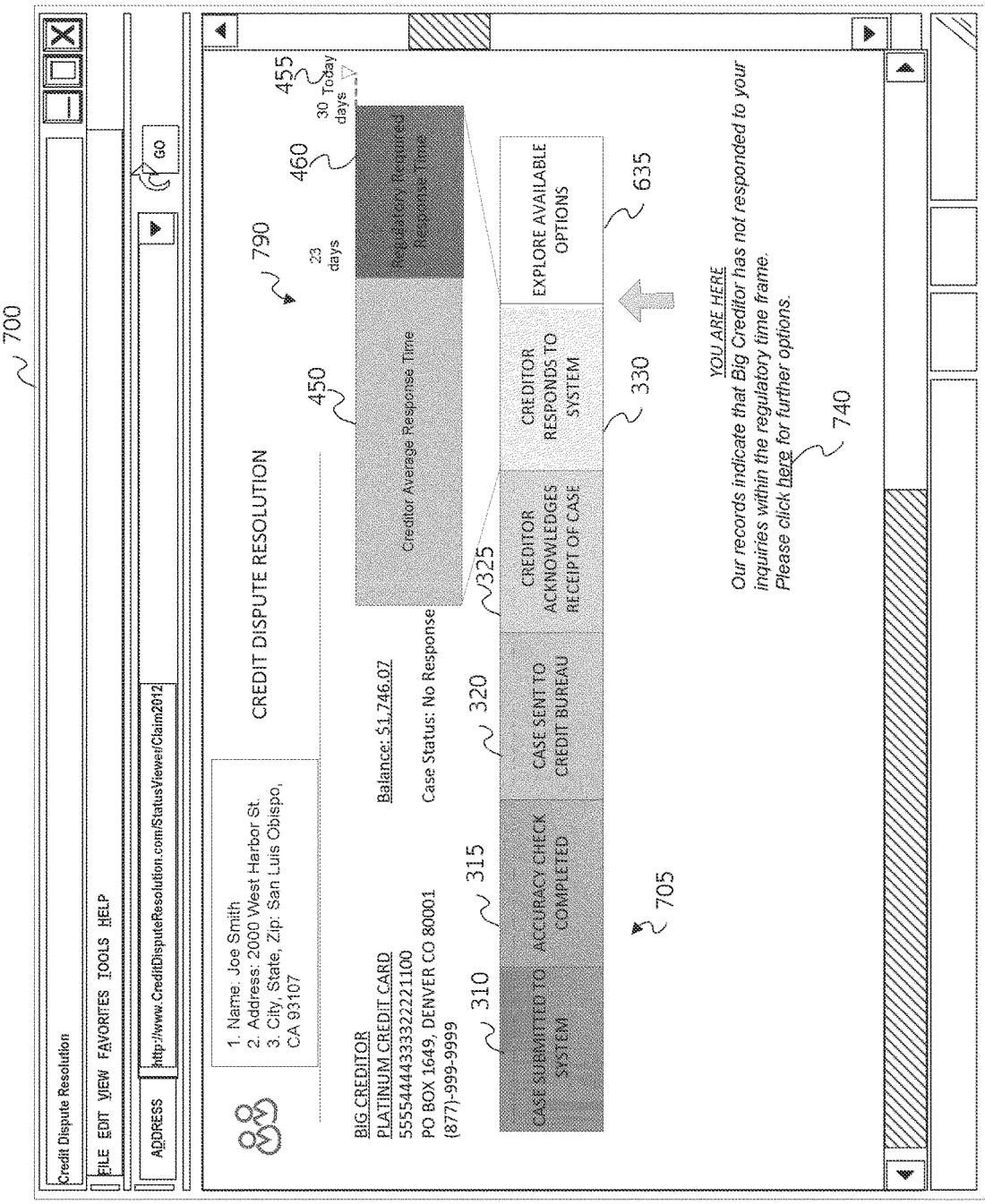
FIG. 7 is an illustrative user interface that may be generated and presented to a consumer, which includes an indication that that a creditor has not responded to the dispute within regulatory time frame and providing options for taking further actions.

FIG. 7 is an illustrative user interface 700 that may be generated and presented to a consumer, which includes an indication that a creditor has not responded to the dispute within regulatory time frame and providing options for taking further actions.

In FIG. 7, the case status is shown as "no response." In this example, the status arrow points to the end of block 330 and the beginning of block 635 of the status block 705, indicating that Big Creditor has not responded to the system within the regulatory response time. The next step may be to explore further options.

A second status bar 790 with additional blocks can be displayed around a particular block. In this example, the second status bar 790 may include a block 450 indicating Big Creditor's average response time and a block 460 indicating regulatory response time (beyond Big Creditor's average response time).

An indicator 455 may indicate where today (e.g., the day the consumer accesses the user interface 700) is in view of the creditor's average response time 450 and the regulatory response time 460. In this example, indicator 455 shows that Big Creditor has taken longer than its average response time to respond to this credit dispute resolution request. Moreover, indicator 455 also shows that Big Creditor has not responded within the regulatory required response time.

In this example, the message shown next to the status arrow indicates that Big Creditor has not responded to the consumer's inquiries within the regulatory required response time. Moreover, the user interface 700 may provide a link 740, which would allow the consumer to explore further options, if available. The options available may include, for example, documents, links, and contact information related to federal, state, and/or other regulations of consumer credit disputes, and so forth. The options may also include an automatic form letter generation tool that enables the consumer to generate a letter. The letter may include the credit dispute, the consumer's information, account information, the history of consumer's credit dispute resolution request, and/or other relevant information. In other embodiments, fewer and/or additional blocks may be included to illustrate fewer and/or additional status associated with a credit dispute resolution process.

Figure 8:
FIG. 8 is an illustrative user interface that may be generated and presented to a consumer, which allows the consumer to submit a successfully resolved dispute to other credit bureaus and/or credit dispute services.

FIG. 8 is an illustrative user interface 800 that may be generated and presented to a consumer, which allows the consumer to submit a successfully resolved dispute to other credit bureaus and/or credit dispute services.

The example user interface 800 lists two credit bureaus, 805 and 810, which represents Credit Bureau 1 and Credit Bureau 2, respectively, are presented to a consumer. By choosing the credit bureaus and/or credit dispute services, the consumer's credit dispute resolution request and/or other relevant information may be submitted to the chosen credit bureaus and/or credit dispute services. In other embodiments, fewer and/or additional credit bureaus and/or credit dispute services may be included. In one embodiment, the credit dispute resolution system automatically transmits the dispute resolution information directly to the selected credit bureaus, without further involvement from the consumer. In other embodiments, the credit dispute resolution system provides template letters and/or other documents that may be sent (by mail, fax, email, etc.) by the consumer to the other credit bureaus. Advantageously, such documents may be used to simplify the process of updating information regarding the dispute at the other credit bureaus. In other embodiments, the credit dispute resolution system interfaces directly with multiple credit bureau such that transmission of credit dispute resolution information is seamlessly provided to the multiple credit bureaus.

All of the user interfaces discussed above, such as those in FIGS. 4-8, may also be modified for display on mobile devices, such as smart phones or tablets. For example, the user interface of FIG. 4 may be parsed into multiple screens for better display on a smaller screen. However, the same and/or similar functionality that is discussed above may also be included in applications and/or websites for display on mobile devices.

Figure 9A:
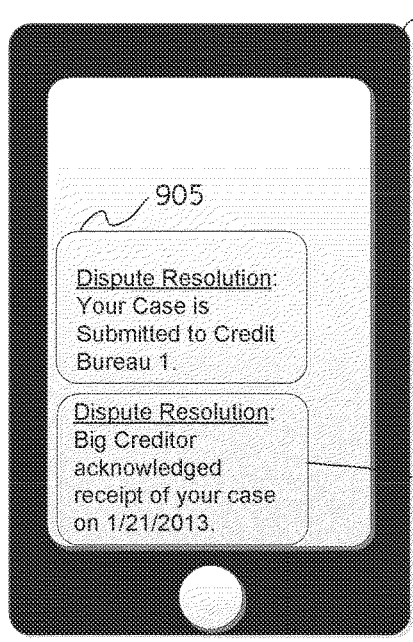
FIG. 9A-9C are illustrative user interfaces that include alerts and/or messages that may be generated and presented to a consumer.
Figure 9B:
Figure 9C:
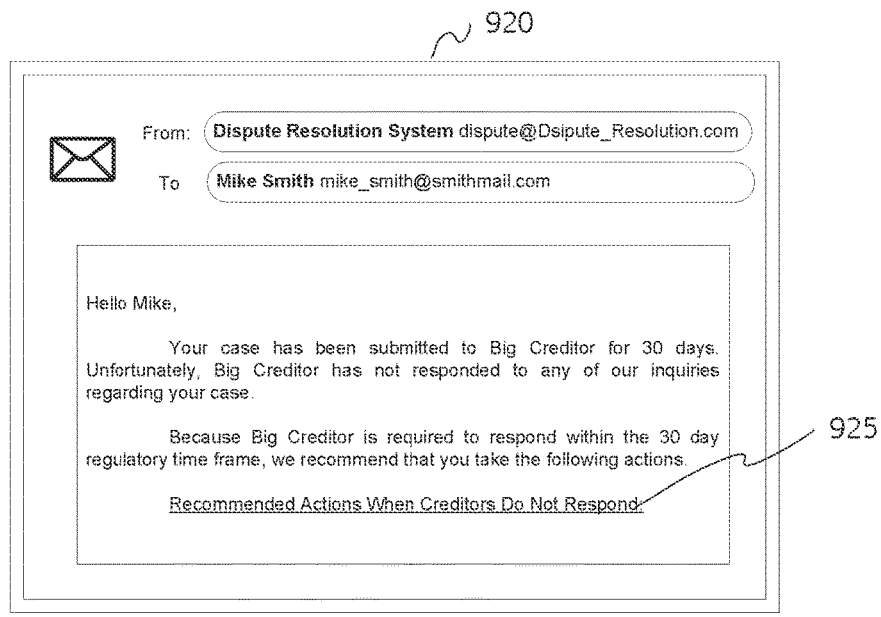

FIGS. 9A-9C include alerts and/or messages that may be generated and presented to a consumer. In FIG. 9A, a mobile user interface 903 is shown. The mobile user interface 903 in this example includes two messages/alerts. Message/alert 905 informs a consumer that the consumer's case has been submitted to Credit Bureau 1. The mobile user interface 910 informs a consumer that Big Creditor acknowledged receipt of the consumer's case on Jan. 21, 2013.

Depending on the embodiment, the user may have options to specify that alerts are sent when the consumer's dispute resolution case has moved from one of block to another (e.g. the blocks in the status bars of FIGS. 5-8). Alternatively, the consumer may wish to receive alerts only when certain activities have occurred, such as when the dispute has been submitted to the credit Bureau and/or when the creditor has not responded to a submitted dispute within the expected timeframe and/or the regulatory time frame.

Depending on the embodiment, the consumer may set preferences for delivery of alerts any available manner, such as via text messages, email, telephone call, smart phone application, etc. In some embodiments, alerts may include links to further information regarding the consumer's dispute. For example, in embodiment of FIG. 9A the consumer may click on the dispute resolution link in either messages 905 or 910 in order to navigate to a webpage that displays the credit dispute timeline, such as is illustrated in FIGS. 4-8.

In FIG. 9B, a mobile user interface 912 is shown. The mobile user interface 915 in this example includes a message/alert 915, which shows that Big Creditor has asked for proof of a consumer's payment. The message/alert also asks the consumer to submit a copy of his or her payment on Dec. 4, 2012 to the credit dispute resolution system's website. In this embodiment, the user interface 912 may include a link that takes the consumer directly to a form that may be filled out in order to provide big creditor with the requested proof of payment. Links to other related information may also be included.

In FIG. 9C, a user interface 920 is shown. In this embodiment, the user interface 920 includes an e-mail sent from the credit dispute resolution system to a consumer. The e-mail in this example informs the consumer that his case has been submitted to Big Creditor for 30 days. However, Big Creditor has not responded. Because Big Creditor is required, in this particular example, to respond within a 30-day regulatory required time frame, the consumer is recommended to take some following actions.

In some embodiments, a link 925 may be provided to a consumer which includes information regarding recommended actions when creditors do not respond. In some cases, such information may be included in the e-mail. The recommended actions when creditors do not respond may include, for example, re-submitting the credit dispute resolution request, and/or providing statistics on how often the creditor may respond when contacted again after not responding at first, and so forth.

Other Embodiments

Although the foregoing systems and methods have been described in terms of certain embodiments, other embodiments will be apparent to those of ordinary skill in the art from the disclosure herein. Additionally, other combinations, omissions, substitutions and modifications will be apparent to the skilled artisan in view of the disclosure herein. While some embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature, aspect, method, property, characteristic, quality, attribute, element, or the like in connection with an embodiment can be used in all other embodiments set forth herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

What is claimed is:

1. A computing system comprising:
    a computer readable storage medium having executable instructions stored thereon; aid one or more processors configured to execute the executable instructions to cause the computing system to:
    determine a status for a credit dispute request, wherein the credit dispute request is a request to dispute an item on a credit report of a user;
    generate a first user interface for display to the user, wherein the first user interface includes (a) a visual timeline indicating a chronological order of a plurality of stages associated with the credit dispute request, and (b) a graphical status indicator identifying a current position on the timeline that is based at least in part on the status for the credit dispute request;
    subsequent to display of the first user interface, receive a response related to the credit dispute request from a system associated with a creditor; determine, based at least in part on the response, that the credit dispute request has been successfully resolved;
in response to determining that the credit dispute request has been successfully resolved, update, in an electronic data store, status information associated with the credit dispute request; and
based on a determination that when the user, from a user computing device, logs into a portal provided by the computing system, generate and cause the user computing device to display a second user interface, wherein the second user interface includes at least:
a graphical indicator indicating status of the credit dispute request as resolved; and
a selectable option to submit indication of resolution of the credit dispute request to at least one credit bureau.

2. The computing system of claim 1, wherein the one or more processors are further configured to, in response to user selection of one of the at least one selectable option, send indication of the resolution of the credit dispute request to a first credit bureau, wherein the indication includes identification of the item on the credit report of the user.

3. The computing system of claim 2, wherein the second user interface includes at least two selectable options each configured to cause submission of indication of resolution of the credit dispute request to a different credit bureau, such that the second user interface enables the user to cause submission of indication of resolution of the credit dispute request to two different credit bureaus.

4. The computing system of claim 1, wherein the second user interface is generated based in part on a user preference for receiving an alert associated with the credit dispute request.

5. The computing system of claim 1, wherein the first user interface further indicates an average response time for the creditor related to the dispute.

6. The computing system of claim 5, wherein the first user interface further indicates a regulatory response deadline for the creditor related to the dispute.

7. The computing system of claim 6, wherein the current position on the timeline is shown with a position determined relative to at least one of the average response time or the regulatory response deadline indicated in the first user interface.

8. The computing system of claim 1, wherein the plurality of stages associated with the credit dispute request as identified in the first user interface include indication of at least two of: the credit dispute case is sent to a credit bureau, the credit dispute case is acknowledged by the creditor, or the creditor replies to the credit dispute request.

9. A computer-implemented method comprising:
determining a status for a credit dispute request, wherein the credit dispute request is a request to dispute an item on a credit report of a user;
generating a first user interface for display to the user, wherein the first user interface includes (a) a visual timeline indicating a chronological order of a plurality of stages associated with the credit dispute request, and (b) a graphical status indicator identifying a current position on the timeline that is based at least in part on the status for the credit dispute request;
subsequent to display of the first user interface, receiving a response related to the credit dispute request from a system associated with the creditor; determining, based at least in part on the response, that the credit dispute request has been successfully resolved;
in response to determining that the credit dispute request has been successfully resolved, updating, in an electronic data store, status information associated with the credit dispute request; and
based on a determination that a user, using a user computing device, has logged into an account portal, generating and causing the user computing device to display a second user interface, wherein the second user interface includes at least:
a graphical indicator indicating status of the credit dispute request as resolved; and
a selectable option to submit indication of resolution of the credit dispute request to at least one credit bureau.

10. The computer-implemented method of claim 9 further comprising, in response to user selection of one of the at least one selectable option, sending indication of the resolution of the credit dispute request to a first credit bureau, wherein the indication includes identification of the item on the credit report of the user.

11. The computer-implemented method of claim 9, wherein the second user interface includes at least two selectable options each configured to cause submission of indication of resolution of the credit dispute request to a different credit bureau, such that the second user interface enables the user to cause submission of indication of resolution of the credit dispute request to two different credit bureaus.

12. The computer-implemented method of claim 9, wherein the second user interface is generated based in part on a user preference for receiving an alert associated with the credit dispute request.

13. The computer-implemented method of claim 9, further comprising determining an average response time for the creditor based on thousands of previous credit disputes involving the creditor, wherein the first user interface further indicates the average response time for the creditor.

14. The computer-implemented method of claim 9, wherein the first user interface further indicates a regulatory response deadline for the creditor related to the dispute.

15. The computer-implemented method of claim 9, wherein the current position on the timeline is shown with a position determined relative to each of an average response time and a regulatory response deadline indicated in the first user interface.

16. The computer-implemented method of claim 9, wherein the plurality of stages associated with the credit dispute request as identified in the first user interface include indication of at least two of: the credit dispute case is sent to a credit bureau, the credit dispute case is acknowledged by the creditor, or the creditor replies to the credit dispute request.

17. A non-transitory computer storage medium storing executable code, the executable code causing a computing device to perform operations that comprise at least:
determining a status for a credit dispute request, wherein the credit dispute request is a request to dispute an item on a credit report of a user; generating a first user interface for display to the user, wherein the first user interface includes (a) a visual timeline indicating a chronological order of a plurality of stages associated with the credit dispute request, and (b) a graphical status indicator identifying a current position on the timeline that is based at least in part on the status for the credit dispute request;
subsequent to display of the first user interface, receiving a response related to the credit dispute request from a creditor; determining, based at least in part on the response, that the credit dispute request has been successfully resolved;

in response to determining that the credit dispute request has been successfully resolved, updating, in an electronic data store, status information associated with the credit dispute request; and based on a determination that a user, using a user computing device, has logged into an account portal, generating and causing the user computing device to display a second user interface, wherein the second user interface includes at least:

a graphical indicator indicating status of the credit dispute request as resolved; and a selectable option to submit indication of resolution of the credit dispute request to at least one credit bureau.

18. The non-transitory computer storage medium of claim 17, wherein the operations further comprise, in response to user selection of one of the at least one selectable option, sending indication of the resolution of the credit dispute request to a first credit bureau, wherein the indication includes identification of the item on the credit report of the user.

19. The non-transitory computer storage medium of claim 17, wherein the second user interface includes at least two selectable options each configured to cause submission of indication of resolution of the credit dispute request to a different credit bureau, such that the second user interface enables the user to cause submission of indication of resolution of the credit dispute request to two different credit bureaus.

* * * * *